(12) United States Patent
Nie et al.

(10) Patent No.: US 12,249,033 B2
(45) Date of Patent: Mar. 11, 2025

(54) USER INTERFACES THAT INCLUDE REPRESENTATIONS OF THE ENVIRONMENT

(71) Applicant: Apple Inc., Cupertino, CA (US)

(72) Inventors: Yiqiang Nie, San Francisco, CA (US); Giovanni Agnoli, San Mateo, CA (US); Devin W. Chalmers, Oakland, CA (US); Allison W. Dryer, Cupertino, CA (US); Thomas G. Salter, Foster City, CA (US); Giancarlo Yerkes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/242,948

(22) Filed: Sep. 6, 2023

(65) Prior Publication Data

US 2024/0104849 A1 Mar. 28, 2024

Related U.S. Application Data

(60) Provisional application No. 63/409,497, filed on Sep. 23, 2022.

(51) Int. Cl.
*G06T 19/00* (2011.01)
*G06F 3/01* (2006.01)

(52) U.S. Cl.
CPC .............. *G06T 19/00* (2013.01); *G06F 3/012* (2013.01); *G06T 2200/24* (2013.01)

(58) Field of Classification Search
CPC ..... G06T 19/00; G06T 2200/24; G06F 3/012; G06F 3/017; G06F 3/011; G06F 3/013
See application file for complete search history.

(56) References Cited

U.S. PATENT DOCUMENTS 11,270,672 B1* 3/2022 Lee .......................... G06F 3/012
2014/0368537 A1* 12/2014 Salter ....................... G06F 3/011
345/633

(Continued)

FOREIGN PATENT DOCUMENTS

EP 3528173 A1 8/2019
WO 2022/093401 A1 5/2022

OTHER PUBLICATIONS

International Search Report and Written Opinion received for PCT Patent Application No. PCT/US2023/023626, mailed on Nov. 9, 2023, 25 pages.

(Continued)

*Primary Examiner* — Antonio Xavier
(74) *Attorney, Agent, or Firm* — DLA Piper LLP (US)

(57) ABSTRACT

In some embodiments, the present disclosure includes techniques and user interfaces for interacting with virtual objects in an extended reality environment. In some embodiments, the techniques and user interfaces are for interacting with virtual objects in an extended reality environment, including repositioning virtual objects relative to the environment. In some embodiments, the techniques and user interfaces are for interacting with virtual objects, in an extended reality environment, including virtual objects that aid a user in navigating within the environment. In some embodiments, the techniques and user interfaces are for interacting with virtual objects, including objects displayed based on changes in a field-of-view of a user, in an extended reality environment, including repositioning virtual objects relative to the environment. In some embodiments, the techniques and user interfaces are for interacting with virtual objects in an extended reality environment, including virtual objects that provide a different perspective on the environment.

39 Claims, 23 Drawing Sheets

(56) References Cited

U.S. PATENT DOCUMENTS

| | | | |
|---|---|---|---|
| 2015/0317831 A1* | 11/2015 | Ebstyne | G06F 3/011 |
| | | | 345/419 |
| 2015/0317832 A1 | 11/2015 | Ebstyne et al. | |
| 2018/0005435 A1* | 1/2018 | Anderson | G06F 3/017 |
| 2018/0314066 A1* | 11/2018 | Bell | G09G 5/10 |
| 2019/0005838 A1* | 1/2019 | Yu | G06F 3/011 |
| 2020/0193976 A1* | 6/2020 | Cartwright | G06F 3/011 |
| 2021/0191600 A1 | 6/2021 | Lemay et al. | |
| 2022/0091663 A1* | 3/2022 | Hashimoto | G06T 11/60 |
| 2022/0229534 A1* | 7/2022 | Terre | G06F 3/04815 |
| 2023/0026638 A1* | 1/2023 | Schoen | G06F 3/04815 |
| 2023/0326144 A1* | 10/2023 | Insley | G06F 3/04842 |
| | | | 345/38 |
| 2024/0020371 A1 | 1/2024 | Dedonato et al. | |

OTHER PUBLICATIONS

International Search Report and Written Opinion received for PCT Patent Application No. PCT/US2023/023627, mailed on Nov. 28, 2023, 25 pages.

International Search Report and Written Opinion received for PCT Patent Application No. PCT/US2023/033208, mailed on Jan. 22, 2024, 15 pages.

Invitation to Pay Additional Fees and Partial International Search Report received for PCT Patent Application No. PCT/US2023/023626, mailed on Sep. 19, 2023, 21 pages.

Invitation to Pay Additional Fees and Partial International Search Report received for PCT Patent Application No. PCT/US2023/023627, mailed on Sep. 21, 2023, 21 pages.

Liebers et al., "Using Gaze Behavior and Head Orientation for Implicit Identification in Virtual Reality", VRST '21: Proceedings of the 27th ACM Symposium on Virtual Reality Software and Technology, Available online at: https://doi.org/10.1145/3489849.3489880, Dec. 8-10, 2021, 9 pages.

Stephenson et al., "SoK: Authentication in Augmented and Virtual Reality", 2022 IEEE Symposium on Security and Privacy (SP), Available online at: https://pages.cs.wisc.edu/~chatterjee/papers/sok-arvr.pdf, 2022, 18 pages.

* cited by examiner

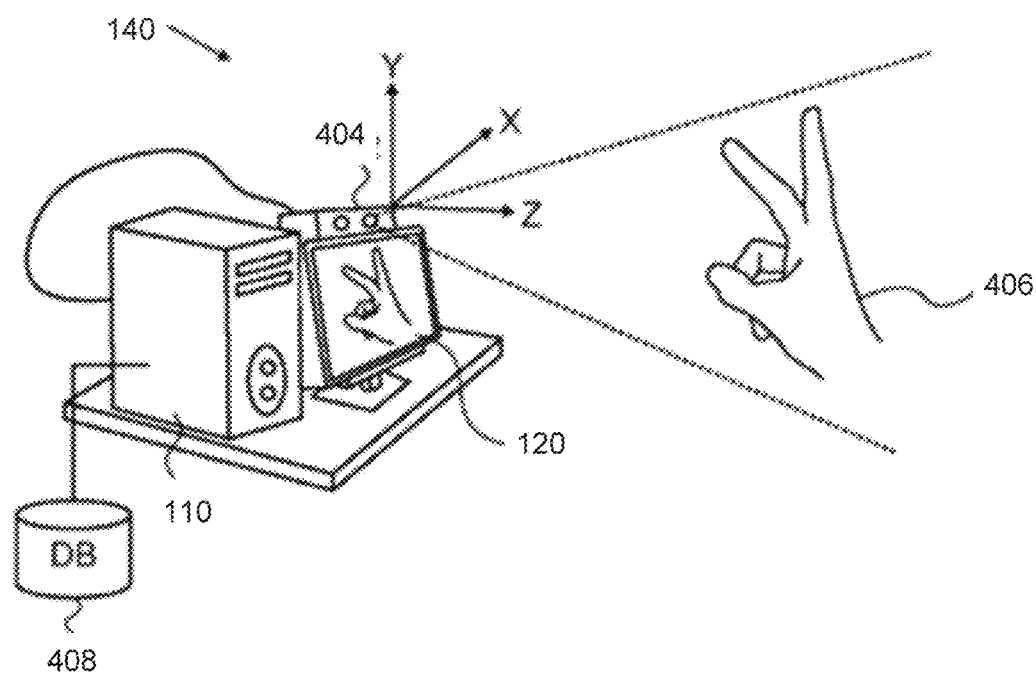
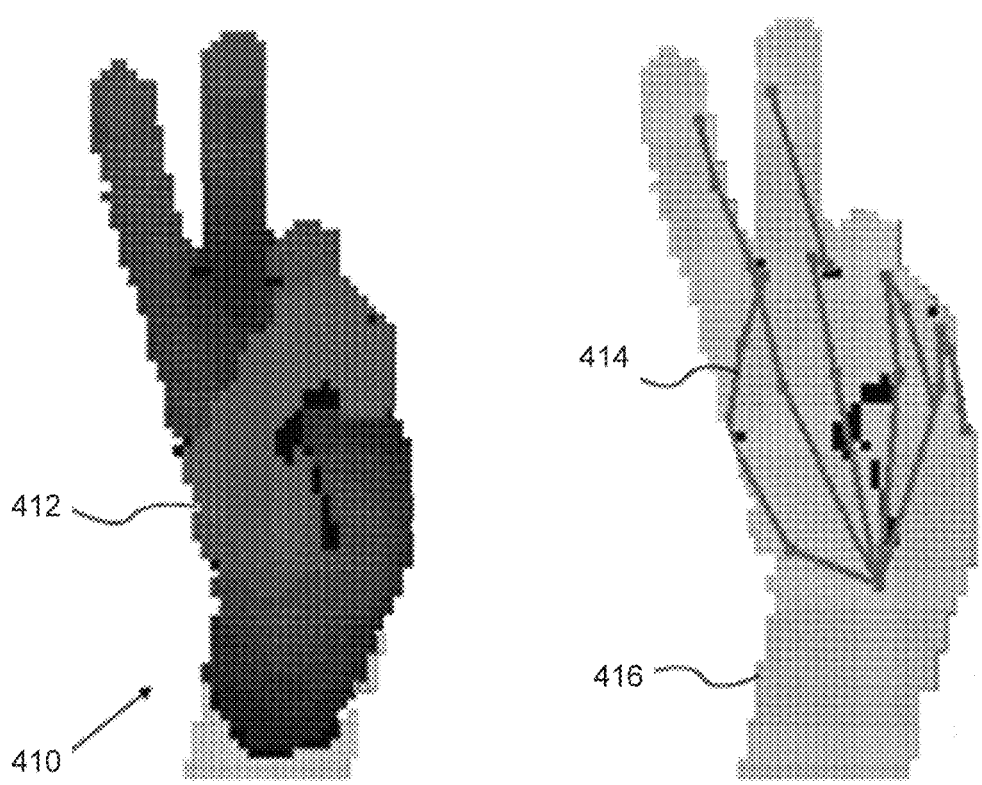
FIG. 4

900 ⇢

902
display, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes:

904
in accordance with a determination that the first location is a location that is within a field-of-view of a user, display the first virtual object as an environment-locked object

906
in accordance with a determination that the first location is a location that is not within the field-of-view of the user, display the first virtual object as a viewpoint-locked object

*FIG. 9*

USER INTERFACES THAT INCLUDE REPRESENTATIONS OF THE ENVIRONMENT

CROSS-REFERENCE TO RELATED APPLICATIONS

This application claims priority to U.S. Patent Application Ser. No. 63/409,497, entitled "USER INTERFACES THAT INCLUDE REPRESENTATIONS OF THE ENVIRONMENT," filed Sep. 23, 2022. The contents of this application is incorporated herein by reference in its entirety.

TECHNICAL FIELD

The present disclosure relates generally to computer systems that are in communication with a display generation component and, optionally, one or more cameras that provide computer-generated experiences, including, but not limited to, electronic devices that provide methods and interfaces for interacting with virtual objects in an extended reality environment.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for interacting with virtual objects (e.g., objects that assist with navigation) in an extended reality environment more efficient and intuitive for a user. Such methods and interfaces optionally complement or replace conventional methods for interacting with virtual objects in an extended reality environment. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with virtual objects in an extended reality environment. Such methods and interfaces may complement or replace conventional methods for interacting with virtual objects in an extended reality environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a method, performed at a computer system that is in communication with a display generation component, is described. The method includes: while a field-of-view of a user is a first field-of-view, displaying, via the display generation component, a first virtual object in a three-dimensional environment, wherein the first virtual object is displayed in a first display mode that includes being environment-locked; while displaying the first virtual object, detecting a change in the field-of-view of the user from the first field-of-view to a second field-of-view; and in response to detecting the change in the field-of-view of the user from the first field-of-view to the second field-of-view: in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met, displaying the first virtual object in a second display mode that includes shifting the displayed position of the first virtual object relative to the three-dimensional environment based on changes of the field-of-view of the user.

In some embodiments, a non-transitory computer-readable storage medium is described. The non-transitory computer-readable storage medium stores one or more programs configured to be executed by one or more processors of a computer system that is in communication with a display generation component, the one or more programs including instructions for: while a field-of-view of a user is a first field-of-view, displaying, via the display generation component, a first virtual object in a three-dimensional environment, wherein the first virtual object is displayed in a first display mode that includes being environment-locked; while displaying the first virtual object, detecting a change in the field-of-view of the user from the first field-of-view to a second field-of-view; and in response to detecting the change in the field-of-view of the user from the first field-of-view to the second field-of-view: in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met, displaying the first virtual object in a second display mode that includes shifting the displayed position of the first virtual object relative to the three-dimensional environment based on changes of the field-of-view of the user.

In some embodiments, a transitory computer-readable storage medium is described. The transitory computer-readable storage medium stores one or more programs configured to be executed by one or more processors of a computer system that is in communication with a display generation component, the one or more programs including instructions for: while a field-of-view of a user is a first field-of-view, displaying, via the display generation component, a first virtual object in a three-dimensional environment, wherein the first virtual object is displayed in a first display mode that includes being environment-locked; while displaying the first virtual object, detecting a change in the field-of-view of the user from the first field-of-view to a second field-of-view; and in response to detecting the change in the field-of-view of the user from the first field-of-view to the second field-of-view: in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met, displaying the first virtual object in a second display mode that includes shifting the displayed position of the first virtual object relative to the three-dimensional environment based on changes of the field-of-view of the user.

In some embodiments, a computer system configured to communicate with a display generation component is described. The computer system includes one or more processors and memory storing one or more programs configured to be executed by the one or more processors, the one or more programs including instructions for: while a field-of-view of a user is a first field-of-view, displaying, via the display generation component, a first virtual object in a three-dimensional environment, wherein the first virtual object is displayed in a first display mode that includes being environment-locked; while displaying the first virtual object, detecting a change in the field-of-view of the user from the first field-of-view to a second field-of-view; and in response to detecting the change in the field-of-view of the user from the first field-of-view to the second field-of-view: in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met, displaying the first virtual object in a second display mode that includes shifting the displayed position of the first virtual object relative to the three-dimensional environment based on changes of the field-of-view of the user.

In some embodiments, a computer system configured to communicate with a display generation component is described. The computer system includes: means, while a field-of-view of a user is a first field-of-view, for displaying, via the display generation component, a first virtual object in a three-dimensional environment, wherein the first virtual object is displayed in a first display mode that includes being environment-locked; means, while displaying the first virtual object, for detecting a change in the field-of-view of the user from the first field-of-view to a second field-of-view; and means, in response to detecting the change in the field-of-view of the user from the first field-of-view to the second field-of-view, for: in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met, displaying the first virtual object in a second display mode that includes shifting the displayed position of the first virtual object relative to the three-dimensional environment based on changes of the field-of-view of the user.

In some embodiments, a computer program product is described. The computer program product includes one or more programs configured to be executed by one or more processors of a computer system that is in communication with a display generation component, the one or more programs including instructions for: while a field-of-view of a user is a first field-of-view, displaying, via the display generation component, a first virtual object in a three-dimensional environment, wherein the first virtual object is displayed in a first display mode that includes being environment-locked; while displaying the first virtual object, detecting a change in the field-of-view of the user from the first field-of-view to a second field-of-view; and in response to detecting the change in the field-of-view of the user from the first field-of-view to the second field-of-view: in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met, displaying the first virtual object in a second display mode that includes shifting the displayed position of the first virtual object relative to the three-dimensional environment based on changes of the field-of-view of the user.

In some embodiments, a method, performed at a computer system that is in communication with a display generation component, is described. The method includes: displaying, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes: in accordance with a determination that the first location is a location that is within a field-of-view of a user, displaying the first virtual object as an environment-locked object; and in accordance with a determination that the first location is a location that is not within the field-of-view of the user, displaying the first virtual object as a viewpoint-locked object.

In some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes: in accordance with a determination that the first location is a location that is within a field-of-view of a user, displaying the first virtual object as an environment-locked object; and in accordance with a determination that the first location is a location that is not within the field-of-view of the user, displaying the first virtual object as a viewpoint-locked object.

In some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes: in accordance with a determination that the first location is a location that is within a field-of-view of a user, displaying the first virtual object as an environment-locked object; and in accordance with a determination that the first location is a location that is not within the field-of-view of the user, displaying the first virtual object as a viewpoint-locked object.

In some embodiments, a computer system configured to communicate with a display generation component is described. The computer system includes one or more processors and memory storing one or more programs configured to be executed by the one or more processors, the one or more programs including instructions for: displaying, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes: in accordance with a determination that the first location is a location that is within a field-of-view of a user, displaying the first virtual object as an environment-locked object; and in accordance with a determination that the first location is a location that is not within the field-of-view of the user, displaying the first virtual object as a viewpoint-locked object.

In some embodiments, a computer system configured to communicate with a display generation component is described. The computer system includes: means for displaying, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes: in accordance with a determination that the first location is a location that is within a field-of-view of a user, displaying the first virtual object as an environment-locked object; and in accordance with a determination that the first location is a location that is not within the field-of-view of the user, displaying the first virtual object as a viewpoint-locked object.

In some embodiments, a computer program product is described. The computer program product includes one or more programs configured to be executed by one or more processors of a computer system that is in communication with a display generation component, the one or more programs including instructions for: displaying, via the display generation component, a first virtual object in a three-dimensional environment, wherein the first virtual object indicates a first element of a route to a destination and wherein the first virtual object corresponds to a first location in the three-dimensional environment, wherein displaying the first virtual object includes: in accordance with a determination that the first location is a location that is within a field-of-view of a user, displaying the first virtual object as an environment-locked object; and in accordance with a determination that the first location is a location that is not within the field-of-view of the user, displaying the first virtual object as a viewpoint-locked object.

In some embodiments, a method, performed at a computer system that is in communication with a display generation component, is described. The method includes: while a field-of-view of a user of the computer system is a first field-of-view and the field-of-view of the user includes a representation of a physical environment that includes a first location within the physical environment, detecting a change in the orientation of the field-of-view of the user from the first field-of-view to a second field-of-view, different from the first field-of-view, that also includes the first location within the physical environment; in response to detecting the change in orientation of the field-of-view of the user from the first field-of-view to the second field-of-view, displaying, via the display generation component, a set of one or more virtual objects with a respective spatial orientation relative to at least a first portion of a body of the user; after displaying the set of one or more virtual objects with the respective spatial orientation relative to at least the first portion of the body of the user, ceasing to display the set of one or more virtual objects; after ceasing to display the set of one or more virtual objects, detecting movement of the user in the physical environment; after detecting movement of the user in the physical environment, detecting a change in orientation of the field-of-view of the user to a second orientation; and in response to detecting the change in orientation of the field-of-view of the user to the second orientation, displaying, via the display generation component, the set of one or more virtual objects with the respective spatial orientation relative to at least the first portion of the body of the user.

In some embodiments, a non-transitory computer-readable storage medium is described. The non-transitory computer-readable storage medium stores one or more programs configured to be executed by one or more processors of a computer system that is in communication with a display generation component, the one or more programs including instructions for: while a field-of-view of a user of the computer system is a first field-of-view and the field-of-view of the user includes a representation of a physical environment that includes a first location within the physical environment, detecting a change in the orientation of the field-of-view of the user from the first field-of-view to a second field-of-view, different from the first field-of-view, that also includes the first location within the physical environment; in response to detecting the change in orientation of the field-of-view of the user from the first field-of-view to the second field-of-view, displaying, via the display generation component, a set of one or more virtual objects with a respective spatial orientation relative to at least a first portion of a body of the user; after displaying the set of one or more virtual objects with the respective spatial orientation relative to at least the first portion of the body of the user, ceasing to display the set of one or more virtual objects; after ceasing to display the set of one or more virtual objects, detecting movement of the user in the physical environment; after detecting movement of the user in the physical environment, detecting a change in orientation of the field-of-view of the user to a second orientation; and in response to detecting the change in orientation of the field-of-view of the user to the second orientation, displaying, via the display generation component, the set of one or more virtual objects with the respective spatial orientation relative to at least the first portion of the body of the user.

In some embodiments, a transitory computer-readable storage medium is described. The transitory computer-readable storage medium stores one or more programs configured to be executed by one or more processors of a computer system that is in communication with a display generation component, the one or more programs including instructions for: while a field-of-view of a user of the computer system is a first field-of-view and the field-of-view of the user includes a representation of a physical environment that includes a first location within the physical environment, detecting a change in the orientation of the field-of-view of the user from the first field-of-view to a second field-of-view, different from the first field-of-view, that also includes the first location within the physical environment; in response to detecting the change in orientation of the field-of-view of the user from the first field-of-view to the second field-of-view, displaying, via the display generation component, a set of one or more virtual objects with a respective spatial orientation relative to at least a first portion of a body of the user; after displaying the set of one or more virtual objects with the respective spatial orientation relative to at least the first portion of the body of the user, ceasing to display the set of one or more virtual objects; after ceasing to display the set of one or more virtual objects, detecting movement of the user in the physical environment; after detecting movement of the user in the physical environment, detecting a change in orientation of the field-of-view of the user to a second orientation; and in response to detecting the change in orientation of the field-of-view of the user to the second orientation, displaying, via the display generation component, the set of one or more virtual objects with the respective spatial orientation relative to at least the first portion of the body of the user.

In some embodiments, a computer system configured to communicate with a display generation component is described. The computer system includes one or more processors and memory storing one or more programs configured to be executed by the one or more processors, the one or more programs including instructions for: while a field-of-view of a user of the computer system is a first field-of-view and the field-of-view of the user includes a representation of a physical environment that includes a first location within the physical environment, detecting a change in the orientation of the field-of-view of the user from the first field-of-view to a second field-of-view, different from the first field-of-view, that also includes the first location within the physical environment; in response to detecting the change in orientation of the field-of-view of the user from the first field-of-view to the second field-of-view, displaying, via the display generation component, a set of one or more virtual objects with a respective spatial orientation relative to at least a first portion of a body of the user; after displaying the set of one or more virtual objects with the respective spatial orientation relative to at least the first portion of the body of the user, ceasing to display the set of one or more virtual objects; after ceasing to display the set of one or more virtual objects, detecting movement of the user in the physical environment; after detecting movement of the user in the physical environment, detecting a change in orientation of the field-of-view of the user to a second orientation; and in response to detecting the change in orientation of the field-of-view of the user to the second orientation, displaying, via the display generation component, the set of one or more virtual objects with the respective spatial orientation relative to at least the first portion of the body of the user.

In some embodiments, a computer system configured to communicate with a display generation component is described. The computer system includes: means, while a field-of-view of a user of the computer system is a first field-of-view and the field-of-view of the user includes a representation of a physical environment that includes a first location within the physical environment, for detecting a change in the orientation of the field-of-view of the user from the first field-of-view to a second field-of-view, different from the first field-of-view, that also includes the first location within the physical environment; means, in response to detecting the change in orientation of the field-of-view of the user from the first field-of-view to the second field-of-view, for displaying, via the display generation component, a set of one or more virtual objects with a respective spatial orientation relative to at least a first portion of a body of the user; means, after displaying the set of one or more virtual objects with the respective spatial orientation relative to at least the first portion of the body of the user, for ceasing to display the set of one or more virtual objects; means, after ceasing to display the set of one or more virtual objects, for detecting movement of the user in the physical environment; means, after detecting movement of the user in the physical environment, for detecting a change in orientation of the field-of-view of the user to a second orientation; and means, in response to detecting the change in orientation of the field-of-view of the user to the second orientation, for displaying, via the display generation component, the set of one or more virtual objects with the respective spatial orientation relative to at least the first portion of the body of the user.

In some embodiments, a computer program product is described. The computer program product includes one or more programs configured to be executed by one or more processors of a computer system that is in communication with a display generation component, the one or more programs including instructions for: while a field-of-view of a user of the computer system is a first field-of-view and the field-of-view of the user includes a representation of a physical environment that includes a first location within the physical environment, detecting a change in the orientation of the field-of-view of the user from the first field-of-view to a second field-of-view, different from the first field-of-view, that also includes the first location within the physical environment; in response to detecting the change in orientation of the field-of-view of the user from the first field-of-view to the second field-of-view, displaying, via the display generation component, a set of one or more virtual objects with a respective spatial orientation relative to at least a first portion of a body of the user; after displaying the set of one or more virtual objects with the respective spatial orientation relative to at least the first portion of the body of the user, ceasing to display the set of one or more virtual objects; after ceasing to display the set of one or more virtual objects, detecting movement of the user in the physical environment; after detecting movement of the user in the physical environment, detecting a change in orientation of the field-of-view of the user to a second orientation; and in response to detecting the change in orientation of the field-of-view of the user to the second orientation, displaying, via the display generation component, the set of one or more virtual objects with the respective spatial orientation relative to at least the first portion of the body of the user.

In some embodiments, a method, performed at a wearable computer system that is in communication with a display generation component and set of one or more cameras that includes a first camera, is described. The method includes: while a user is wearing the wearable computer system and the user has a first field-of-view that includes a first representation of a physical environment at the location of the user from a first perspective, displaying, via the display generation component, a first virtual object that includes a representation of a portion of a field-of-view of the first camera, wherein the representation of the portion of the field-of-view of the first camera includes a second representation of the physical environment at the location of the user from a second perspective that is different from the first perspective.

In some embodiments, a non-transitory computer-readable storage medium is described. The non-transitory computer-readable storage medium stores one or more programs configured to be executed by one or more processors of a wearable computer system that is in communication with a display generation component and a set of one or more cameras that includes a first camera, the one or more programs including instructions for: while a user is wearing the wearable computer system and the user has a first field-of-view that includes a first representation of a physical environment at the location of the user from a first perspective, displaying, via the display generation component, a first virtual object that includes a representation of a portion of a field-of-view of the first camera, wherein the representation of the portion of the field-of-view of the first camera includes a second representation of the physical environment at the location of the user from a second perspective that is different from the first perspective.

In some embodiments, a transitory computer-readable storage medium is described. The transitory computer-readable storage medium stores one or more programs configured to be executed by one or more processors of a wearable computer system that is in communication with a display generation component and a set of one or more cameras that includes a first camera, the one or more programs including instructions for: while a user is wearing the wearable computer system and the user has a first field-of-view that includes a first representation of a physical environment at the location of the user from a first perspective, displaying, via the display generation component, a first virtual object that includes a representation of a portion of a field-of-view of the first camera, wherein the representation of the portion of the field-of-view of the first camera includes a second representation of the physical environment at the location of the user from a second perspective that is different from the first perspective.

In some embodiments, a wearable computer system that is in communication with a display generation component and a set of one or more cameras that includes a first camera is described. The computer system includes one or more processors and memory storing one or more programs configured to be executed by the one or more processors, the one or more programs including instructions for: while a user is wearing the wearable computer system and the user has a first field-of-view that includes a first representation of a physical environment at the location of the user from a first perspective, displaying, via the display generation component, a first virtual object that includes a representation of a portion of a field-of-view of the first camera, wherein the representation of the portion of the field-of-view of the first camera includes a second representation of the physical environment at the location of the user from a second perspective that is different from the first perspective.

In some embodiments, a wearable computer system that is in communication with a display generation component and a set of one or more cameras that includes a first camera is described. The computer system includes: means, while a user is wearing the wearable computer system and the user has a first field-of-view that includes a first representation of a physical environment at the location of the user from a first perspective, for displaying, via the display generation component, a first virtual object that includes a representation of a portion of a field-of-view of the first camera, wherein the representation of the portion of the field-of-view of the first camera includes a second representation of the physical environment at the location of the user from a second perspective that is different from the first perspective.

In some embodiments, a computer program product is described. The computer program product includes one or more programs configured to be executed by one or more processors of a wearable computer system that is in communication with a display generation component and a set of one or more cameras that includes a first camera, the one or more programs including instructions for: while a user is wearing the wearable computer system and the user has a first field-of-view that includes a first representation of a physical environment at the location of the user from a first perspective, displaying, via the display generation component, a first virtual object that includes a representation of a portion of a field-of-view of the first camera, wherein the representation of the portion of the field-of-view of the first camera includes a second representation of the physical environment at the location of the user from a second perspective that is different from the first perspective.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 9 is a flow diagram of a method of interacting with virtual objects, in an extended reality environment, including virtual objects that aid a user in navigating within the environment, in accordance with various embodiments.

DESCRIPTION OF EMBODIMENTS

The present disclosure relates to user interfaces for providing an extended reality (XR) experience to a user, in accordance with some embodiments.

Figure 7A:
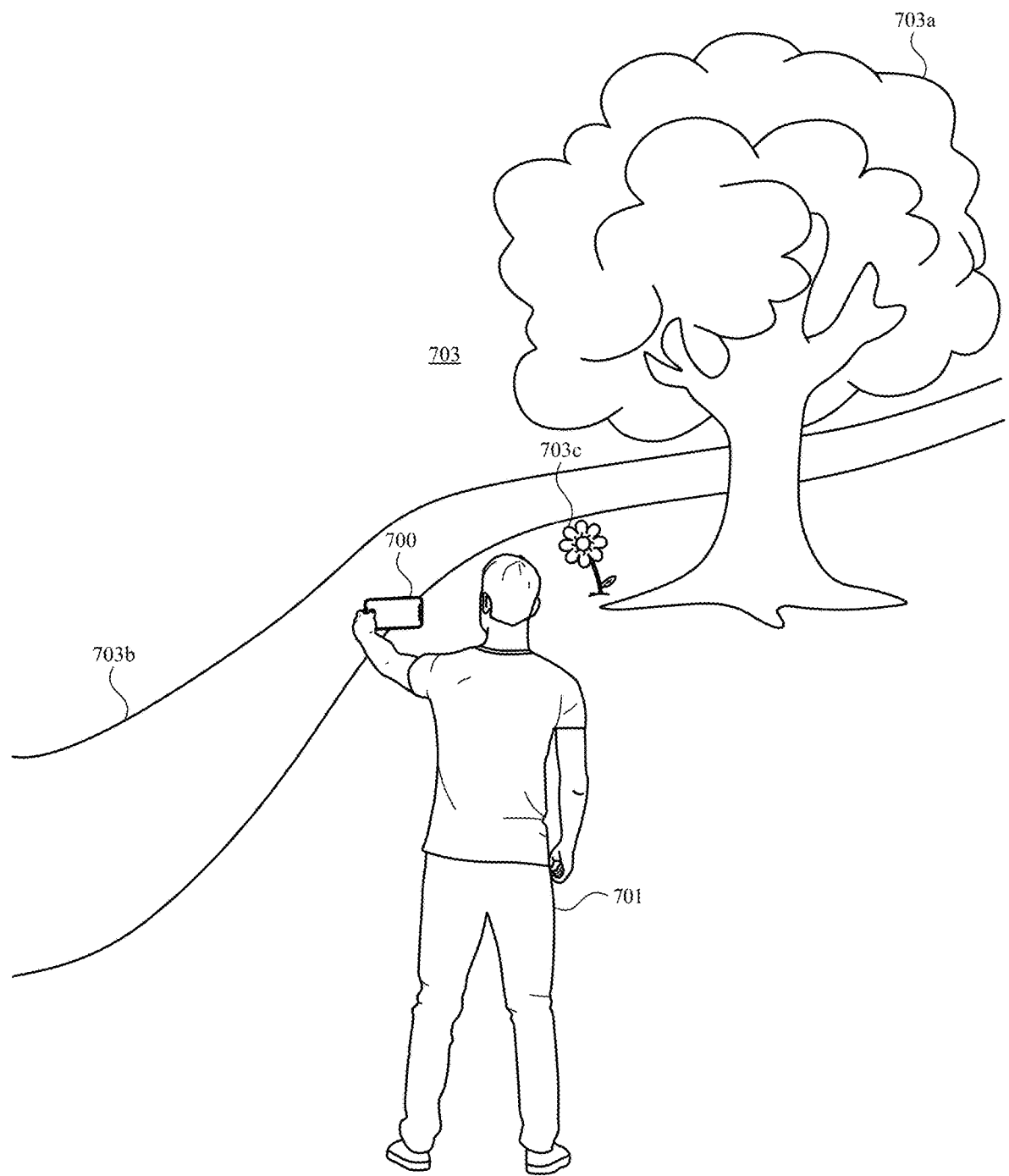
FIGS. 7A-7Y illustrate example techniques for interacting with virtual objects in an extended reality environment, in accordance with some embodiments.
Figure 7Y:
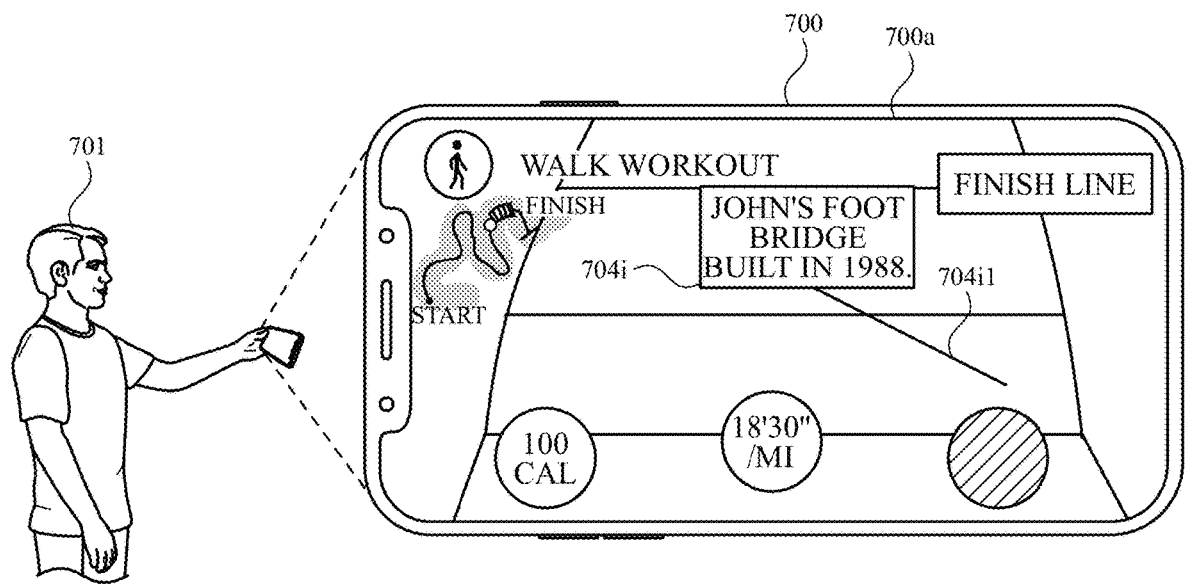
Figure 8:
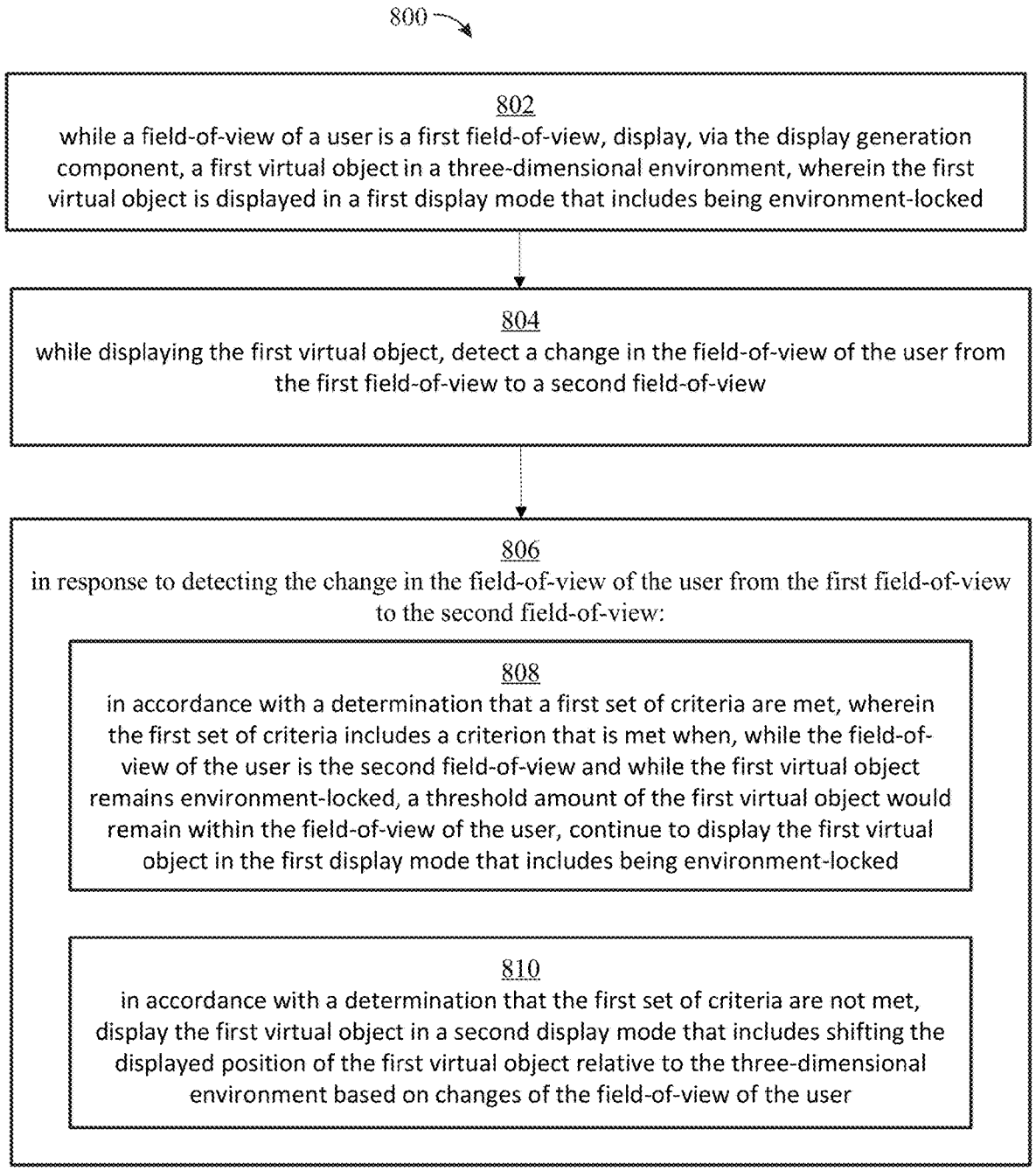
FIG. 8 is a flow diagram of a method of interacting with virtual objects in an extended reality environment, including repositioning virtual objects relative to the environment, in accordance with various embodiments.
Figure 10:
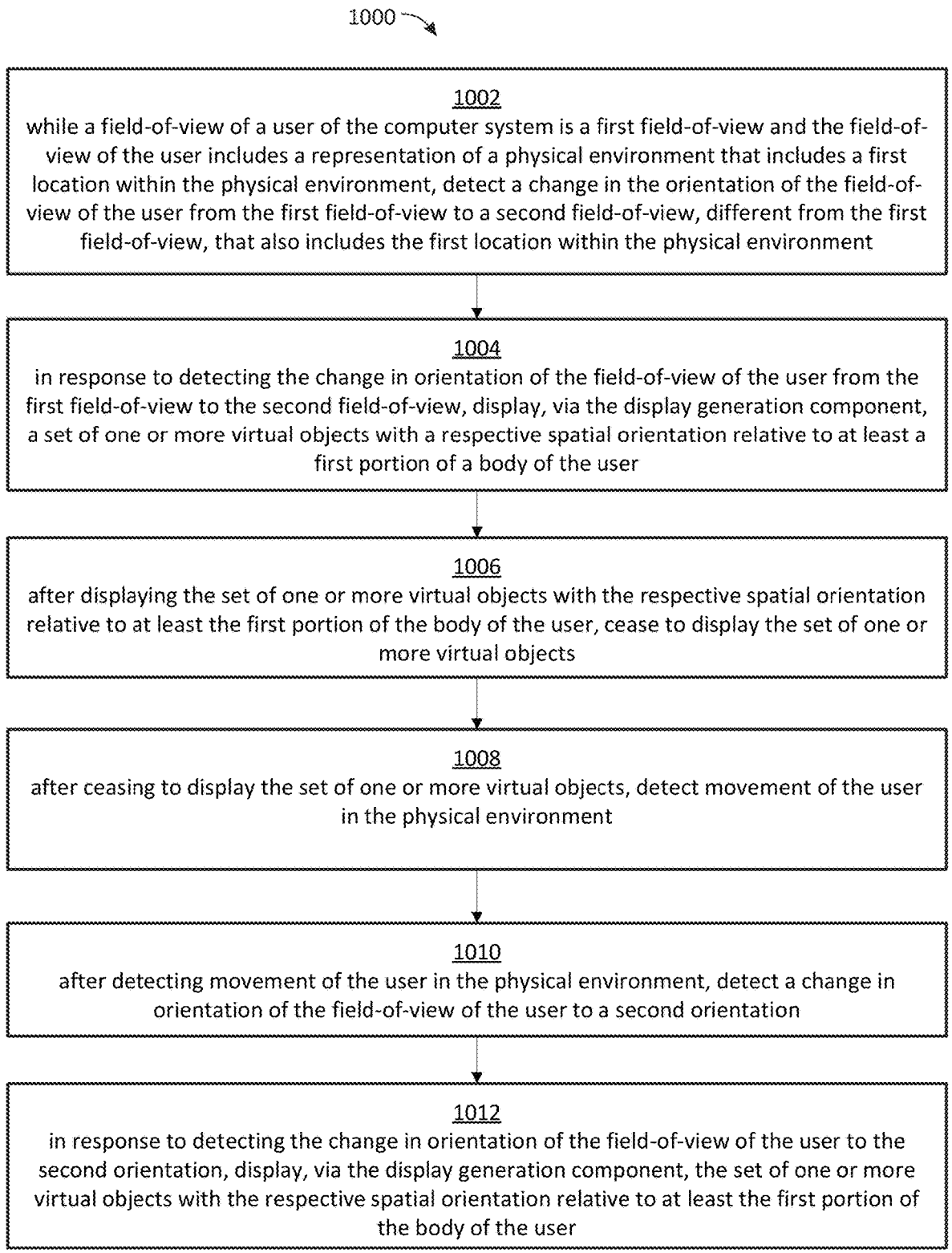
FIG. 10 is a flow diagram of a method of interacting with virtual objects, including objects displayed based on changes in a field-of-view of a user, in an extended reality environment, including repositioning virtual objects relative to the environment, in accordance with various embodiments.
Figure 11:
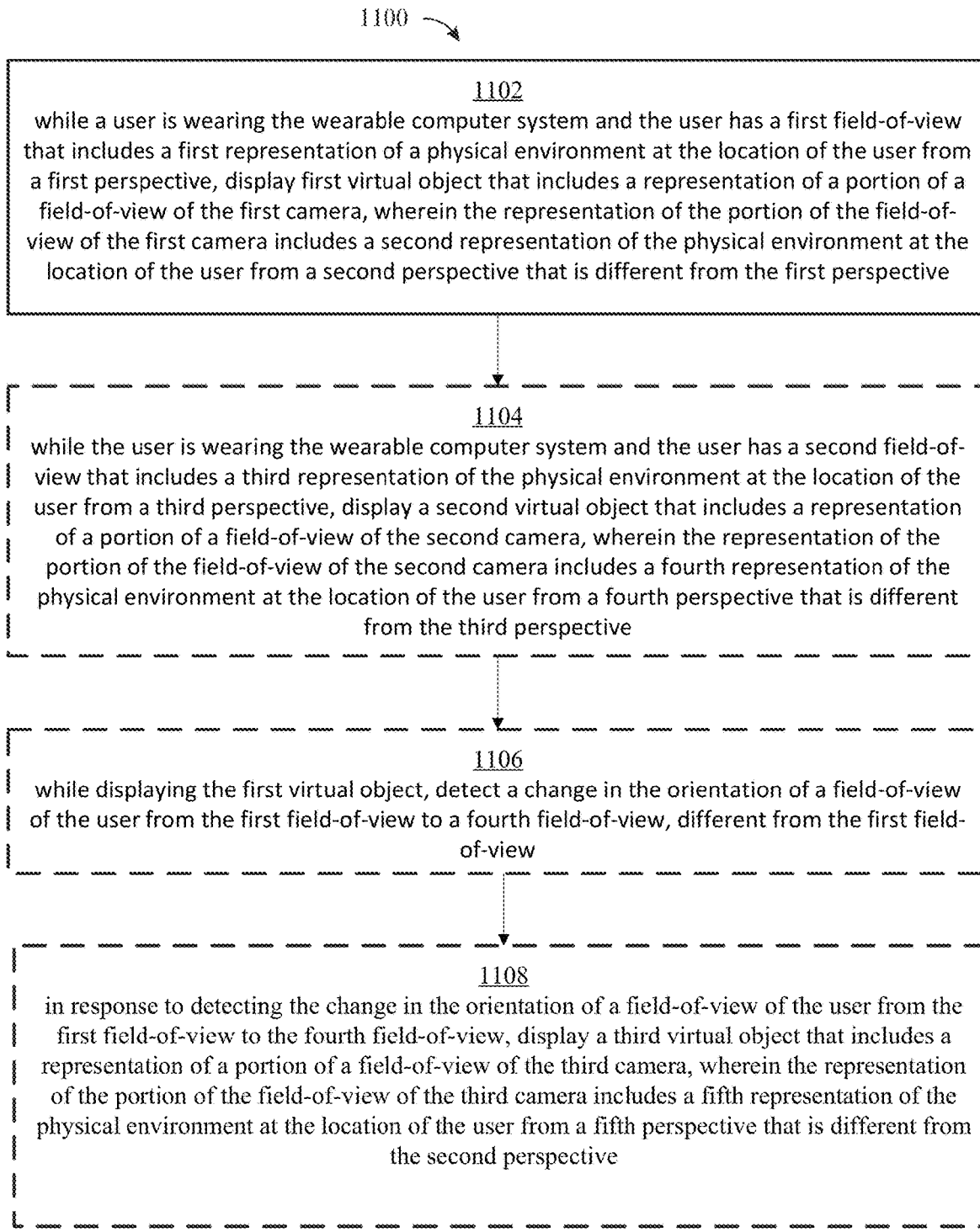
FIG. 11 is a flow diagram of a method of interacting with virtual objects in an extended reality environment, including virtual objects that provide a different perspective on the environment, in accordance with various embodiments.

FIGS. 1-6 provide a description of example computer systems for providing XR experiences to users. FIGS. 7A-7Y illustrate example techniques for interacting with virtual objects in an extended reality environment, in accordance with some embodiments. FIG. 8 is a flow diagram of a method of interacting with virtual objects in an extended reality environment, including reposition virtual objects relative to the environment, in accordance with various embodiments. FIG. 9 is a flow diagram of a method of interacting with virtual objects, in an extended reality environment, including virtual objects that aid a user in navigating within the environment, in accordance with various embodiments. FIG. 10 is a flow diagram of a method of interacting with virtual objects, including objects displayed based on changes in a field-of-view of a user, in an extended reality environment, including reposition virtual objects relative to the environment, in accordance with various embodiments. FIG. 11 is a flow diagram of a method of interacting with virtual objects in an extended reality environment, including virtual objects that provide a different perspective on the environment, in accordance with various embodiments. The user interfaces in FIGS. 7A-7Y are used to illustrate the processes in FIGS. 8-11.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
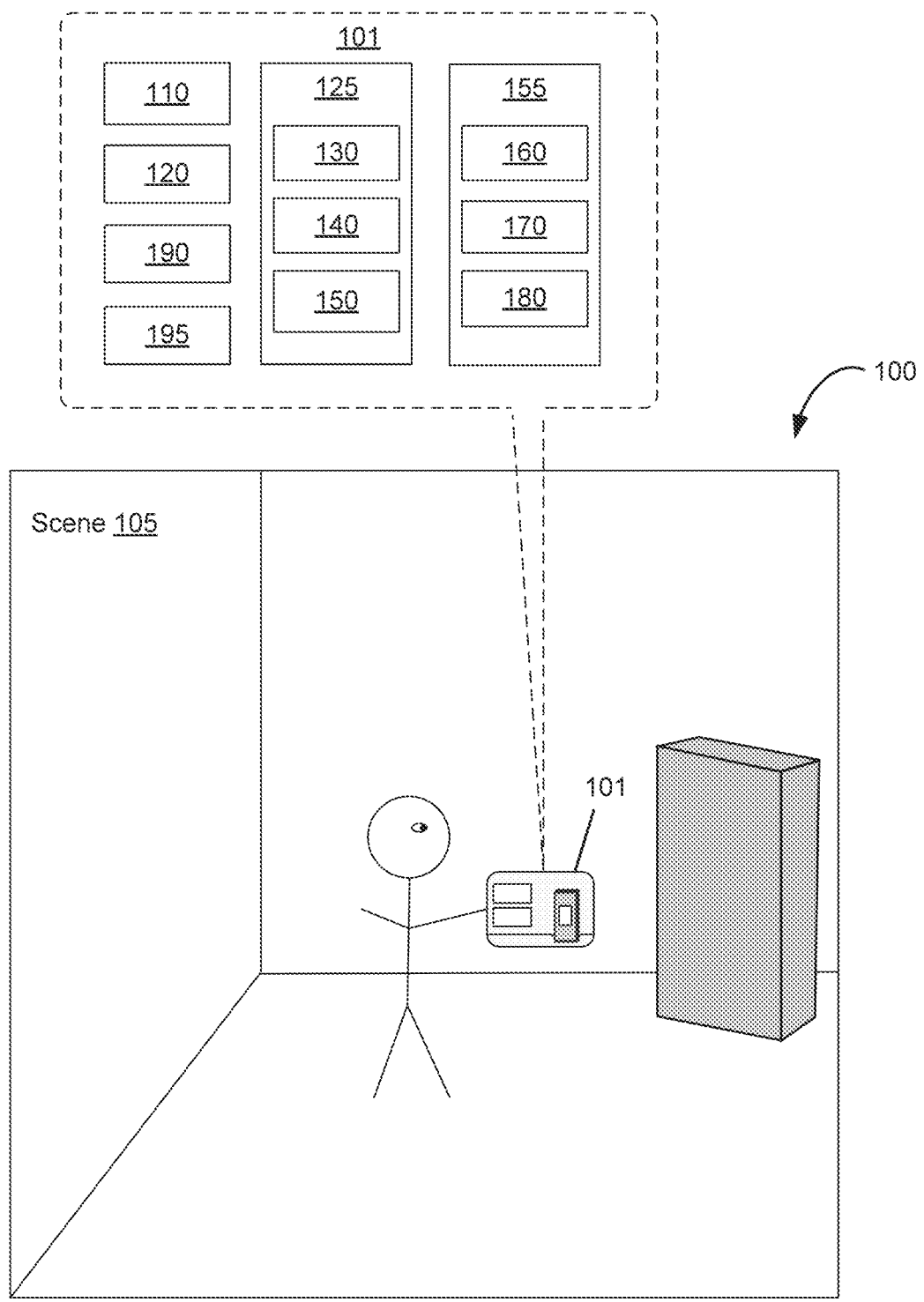
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
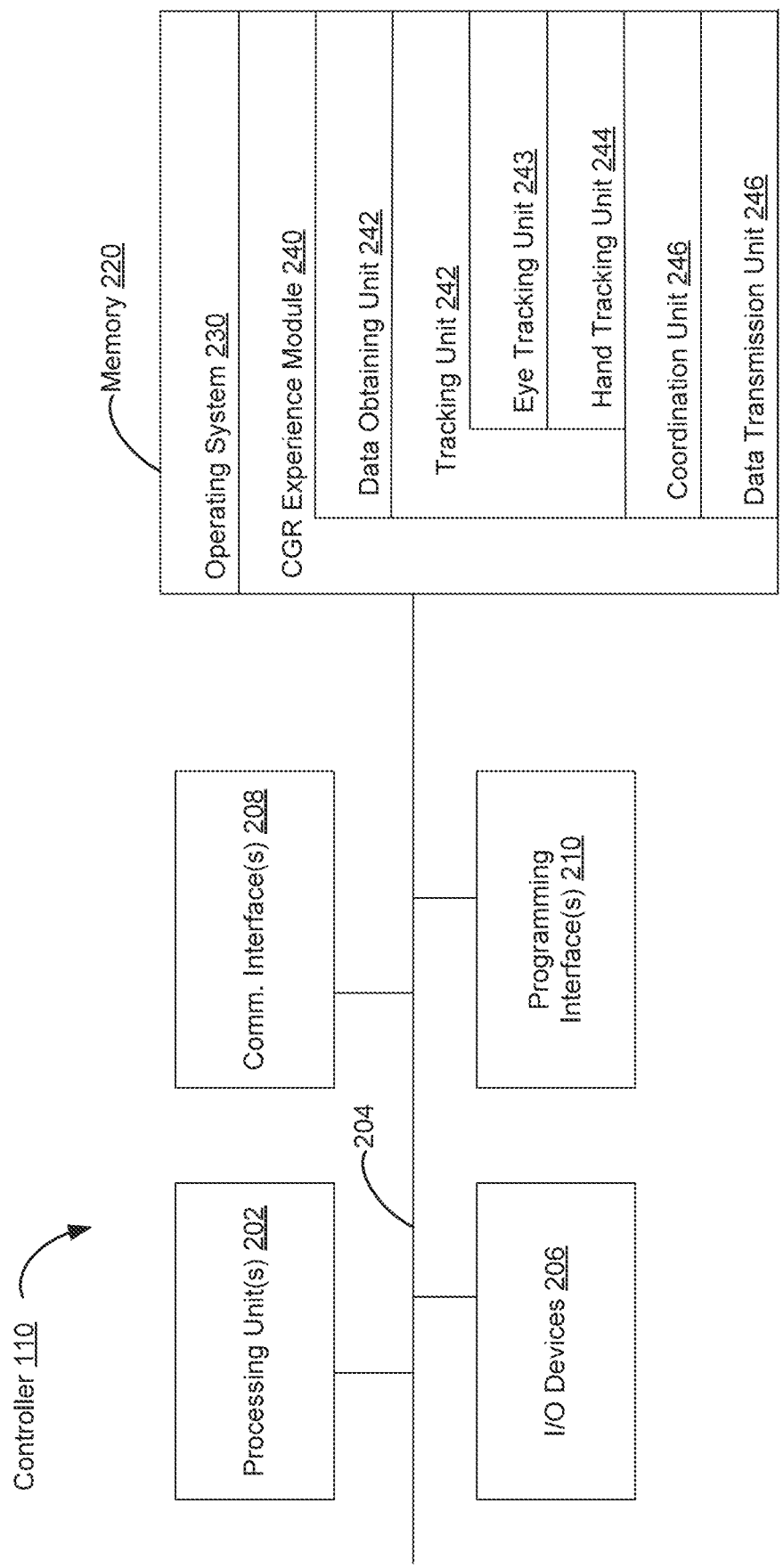
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
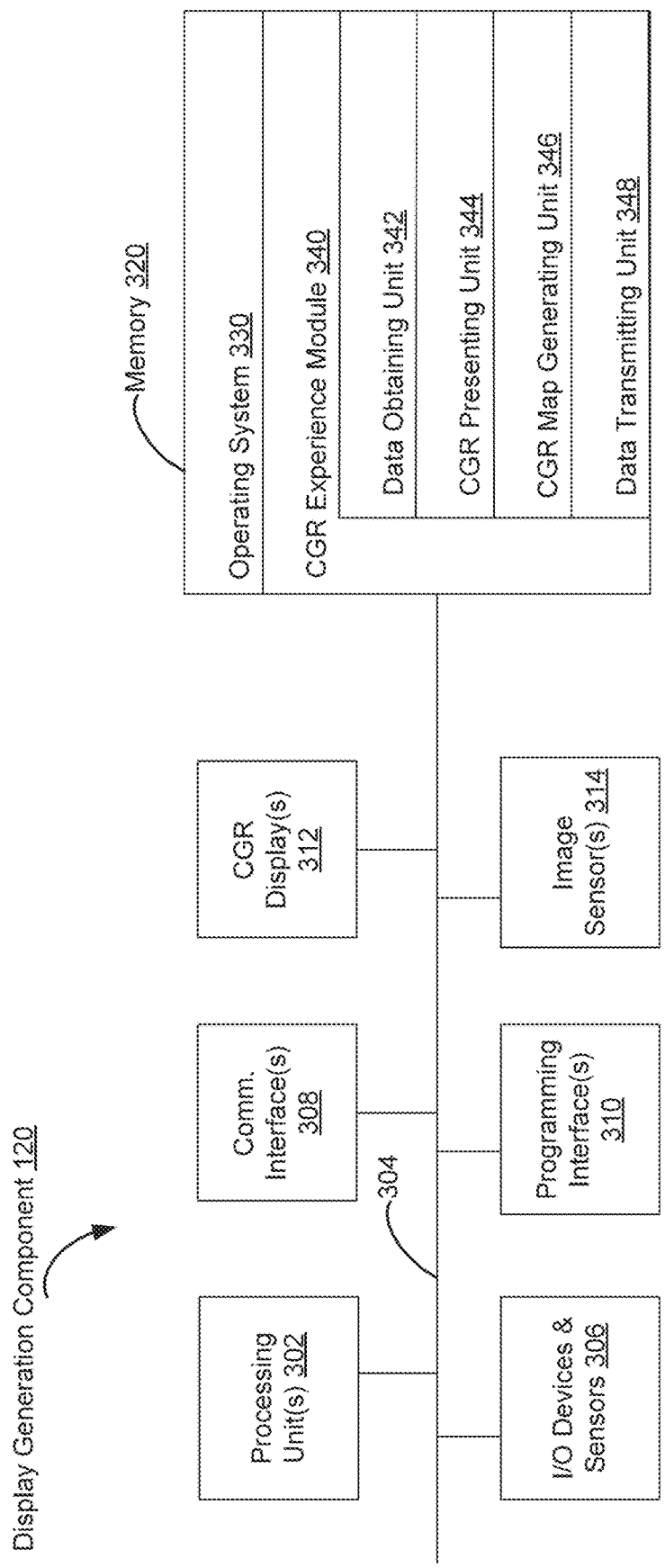
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data.

To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
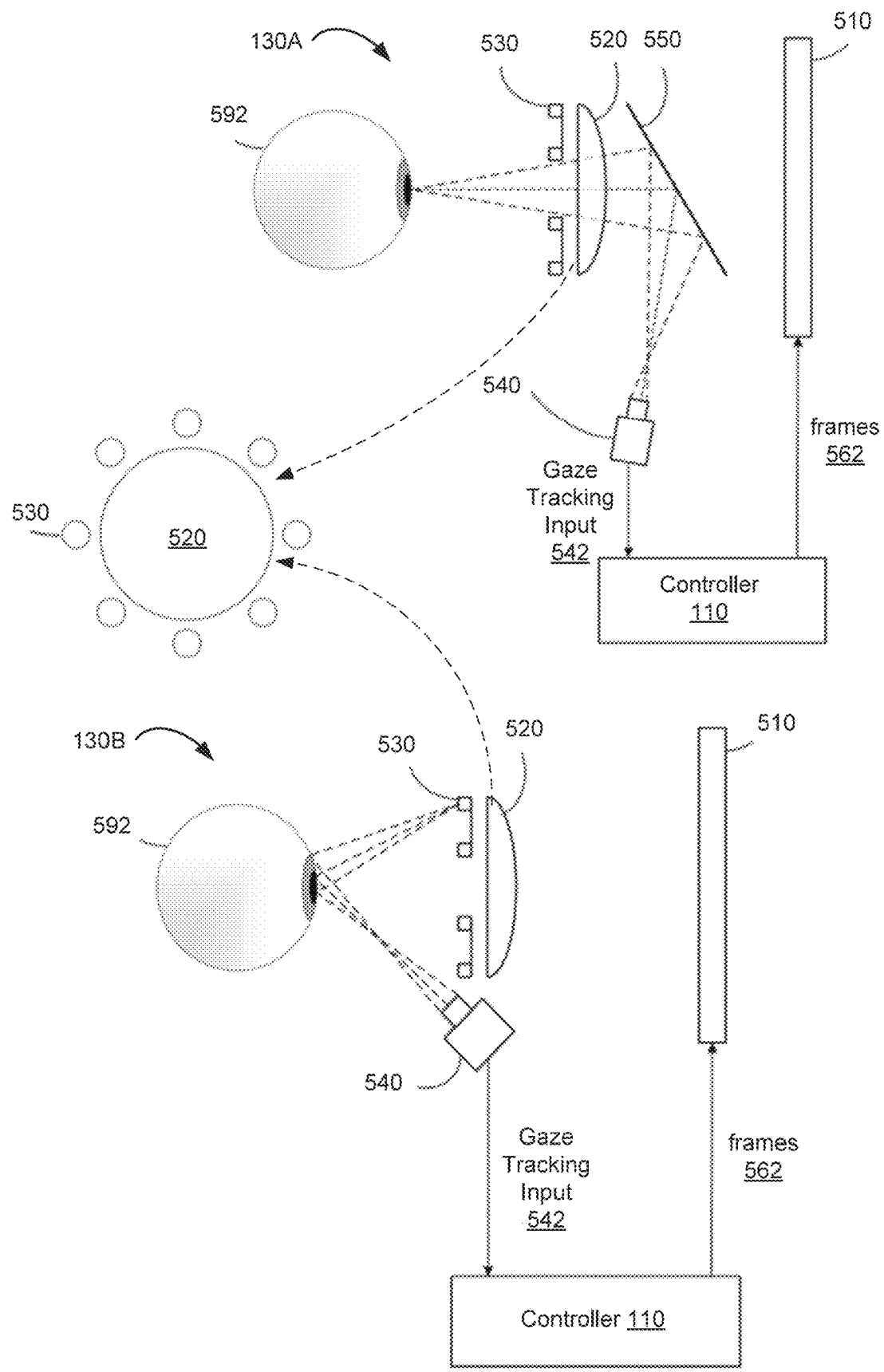
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
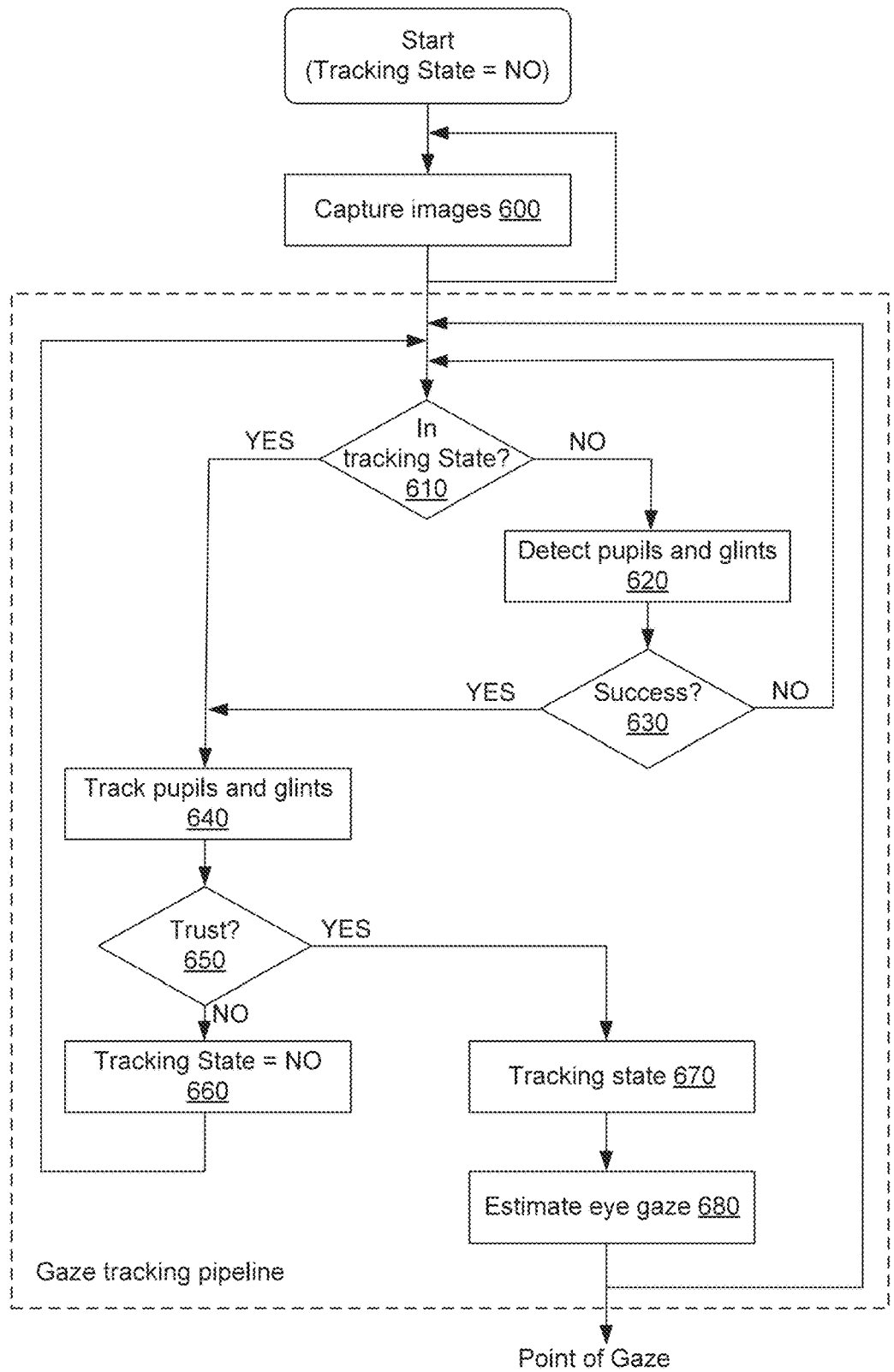
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and (optionally) one or cameras.

FIGS. 7A-7Y illustrate examples of interacting with virtual objects in an extended reality environment. FIG. 8 is a flow diagram of methods of interacting with virtual objects in an extended reality environment, including reposition virtual objects relative to the environment, in accordance with various embodiments. FIG. 9 is a flow diagram of methods of interacting with virtual objects, in an extended reality environment, including virtual objects that aid a user in navigating within the environment, in accordance with various embodiments. FIG. 10 is a flow diagram of methods of interacting with virtual objects, including objects displayed based on changes in a field-of-view of a user, in an extended reality environment, including reposition virtual objects relative to the environment, in accordance with various embodiments. FIG. 11 is a flow diagram of methods of interacting with virtual objects in an extended reality environment, including virtual objects that provide a different perspective on the environment, in accordance with various embodiments. The user interfaces in FIGS. 7A-7Y are used to illustrate the processes described below, including the processes in FIGS. 8-11.

At FIG. 7A, user 701 is holding and interacting with device 700, a smart phone, while in a physical environment 703 that includes tree 703a, road 703b, and flower 703c. Device 700 includes display 700a, which can be seen in FIG. 7B. In some embodiments, device 700 includes one or more features of computer system 101, such as an accelerometer for detecting movement of device 700 and/or eye tracking device 130. In some embodiments, device 700 is a head-mounted system or display (e.g., an HMD) and device 700 detects motion of the user and/or changes in orientation of the viewpoint (e.g., the field-of-view ("FOV")) of the user (e.g., via detecting movement of the user's head) while operating device 700 that is an HMD. In such embodiments, user 701 can control certain operations of device 700 via changes in the user's viewpoint (e.g., via head movement), without having to make contact (e.g., provide touch inputs) to device 700. Control via changes in orientation of the user's viewpoint can be especially useful for an HMD as hardware elements (e.g., buttons or touch-sensitive surfaces) of the HMD may not be visible to the user while wearing the HMD and/or may be difficult to operate due to their position and/or lack of visibility.

Figure 7B:
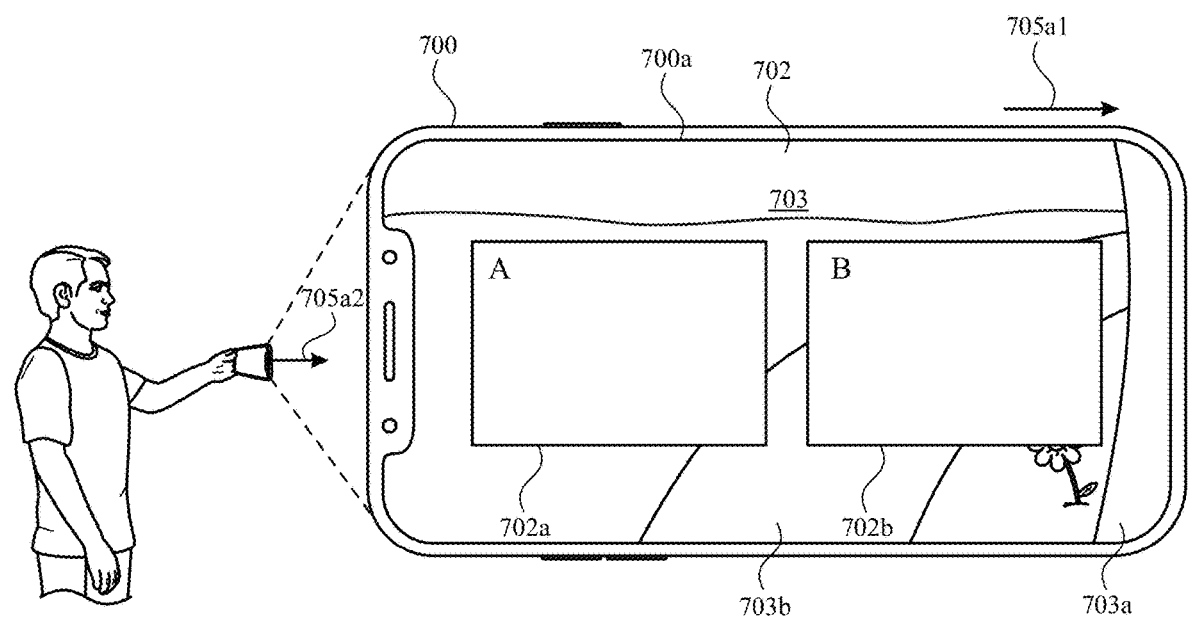

At FIG. 7B, device 700 displays user interface 702 that is overlaid on a passthrough representation of physical environment 703, which includes portions of tree 703a, road 703b, and flower 703c that is based on a viewpoint of a rear-facing camera of device 700. In some embodiments, the representation of physical environment 703 is an optical passthrough representation that is visible through a transparent portion of device 700. User interface 702 includes virtual object 702a and virtual object 702b, which are in a predefined spatial layout. In some embodiments, virtual object 702a and virtual object 702b are referred to as sub-portions of the user interface and/or sub portions of a single, composite virtual object. In some embodiments, virtual objects 702a and 702b are previews of application user interfaces (e.g., a workout application, a navigation application, and/or a camera application). In some embodiments, virtual objects 702a and 702b are XR experiences and/or previews of XR experiences that can be provided by device 700. At FIG. 7B, virtual objects 702a and 702b are displayed in a first mode, which includes displaying the virtual objects with a first level of opacity and displaying the virtual objects as environment-locked virtual objects. At FIG. 7B, while virtual objects 702a and 702b are being displayed in the first mode, device 700 detects device 700 being moved to the right, as indicated by arrows 705a1 and 705a2.

Figure 7C:
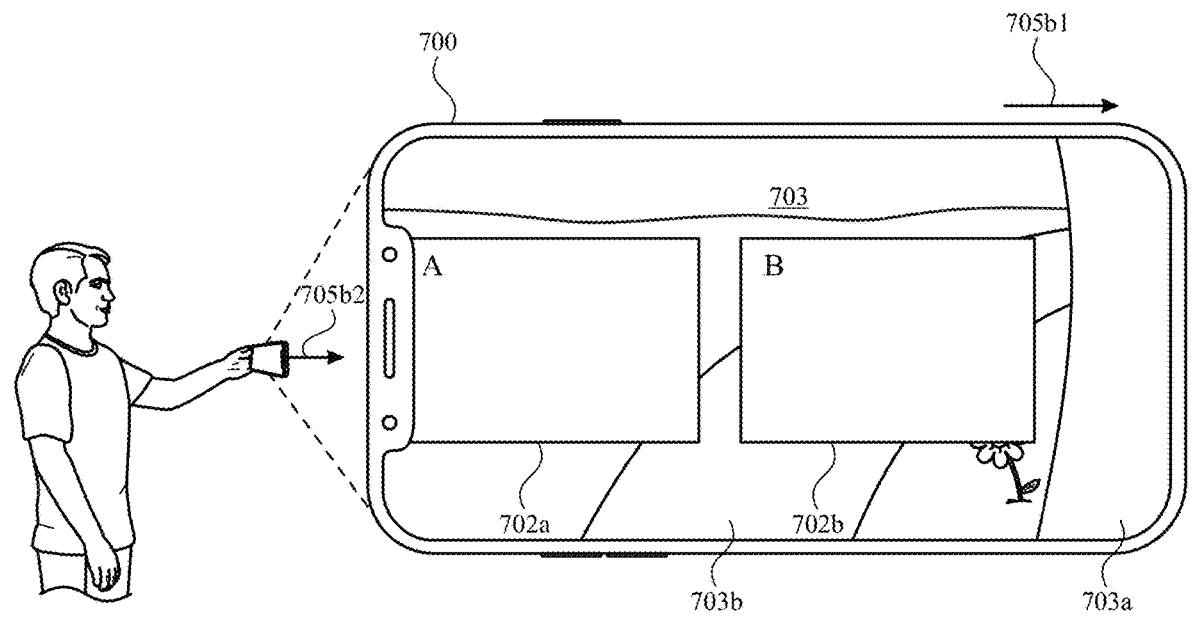

At FIG. 7C, in response to the rightward motion indicated by arrows 705a1 and 705a2, device 700 shifts virtual objects 702a and 702b leftwards on display 700a, as the representation of physical environment 703 shifts to left, due to the rightward motion of the device. At FIG. 7C, virtual objects 702a and 702 remain in the first display mode, including remaining environment-locked, as seen by their positions relative to portions of tree 703a and road 703b. Due to virtual object 702a shifting leftwards on display 700a, a leftmost portion of virtual object 702a that amounts to approximately 5% of the virtual object (e.g., as determined by area and/or by length) is no longer displayed, while the remainder (e.g., 95%) of virtual object 702a continues to be displayed. At FIG. 7B, while virtual objects 702a and 702b continue to be displayed in the first mode, device 700 detects device 700 being moved further to the right, as indicated by arrows 705b1 and 705b2.

Figure 7D:
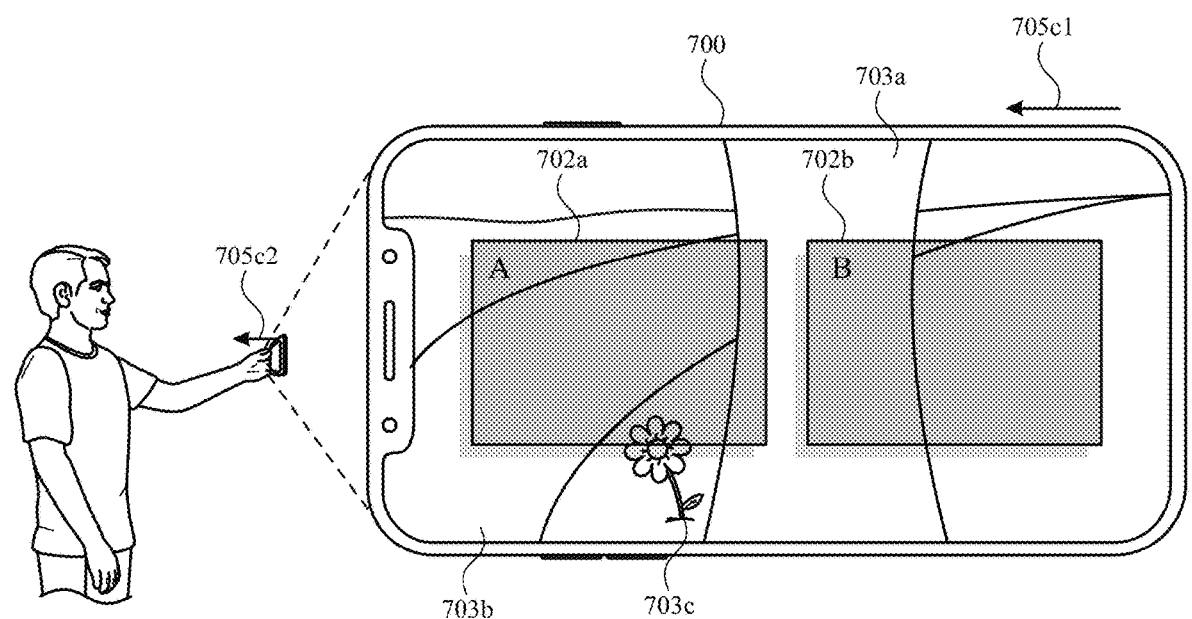

At FIG. 7D, in response to the rightward motion indicated by arrows 705b1 and 705b2 and in response to a determination that less than a threshold amount (e.g., less than 95%, 90%, 80%, 70%, 60%, or 50%) of virtual object 702a would remain on display 700a (in some embodiments, would remain in the viewpoint of the user (e.g., remain visible to the user)) if virtual object 702a continued to be environment-locked in the first display mode, device 700 displays virtual objects 702a and 702b in a second mode that includes transitioning virtual objects 702a and 702b to being viewpoint-locked virtual objects, displaying virtual objects 702a and 702b at the center of display 700 (in some embodiments, at the center of the viewpoint of the user), and modifying the visual appearance of virtual objects 702a and 702b by making the virtual objects more opaque and displaying drop shadows for the virtual objects, as seen in FIG. 7D. Had the further leftwards movement been less dramatic, such that greater than 90% of the virtual object 702a remained on display 700a based on the movement, virtual objects 702a and 702b would have continued being displayed in the first mode. In some embodiments, the second mode of display for virtual objects 702a and 702b is referred to as a repositioning mode, as the user can use the mode to reposition the virtual objects within, or with respect to, the representation of physical environment 703. In some embodiments, displaying virtual objects 702a and 702b in the second mode includes providing additional information (e.g., textual (e.g., "reposition the virtual objects by moving the device") and/or graphical information) that informs the user that the virtual objects can be repositioned (e.g., relative to the environment) via a combination of device movement and device stability, as discussed in more detail below. At FIG. 7D, while virtual objects 702a and 702b are displayed in the second mode, device 700 detects device 700 being moved to the left, as indicated by arrows 705c1 and 705c2.

Figure 7E:
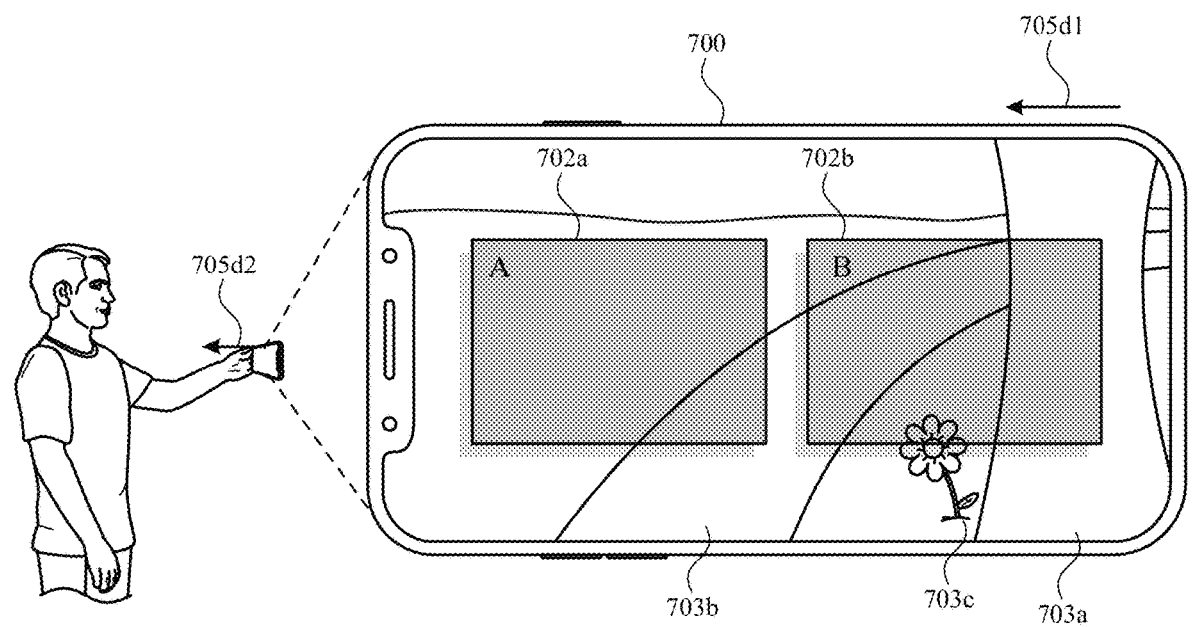

At FIG. 7E, in response to the leftward motion indicated by arrows 705c1 and 705c2, device 700 continues to display virtual objects 702a and 702b in the second mode, including displaying the objects as viewpoint-locked objects. Accordingly, the position at which virtual objects 702a and 702b are displayed relative to physical environment has changed, as indicated by the positions of tree 703a, road 703b, and flower 703c relative to virtual objects 702a and 702b. In some embodiments, while virtual objects 702a and 702b are viewpoint-locked while in the second mode, the virtual objects exhibit lazy follow behavior (as described above) while the objects are responding to movement of device 700 and the virtual objects are in motion. At FIG. 7E, while virtual objects 702a and 702b are still displayed in the second mode, device 700 detects device 700 being moved further to the left, as indicated by arrows 705d1 and 705d2.

Figure 7F:
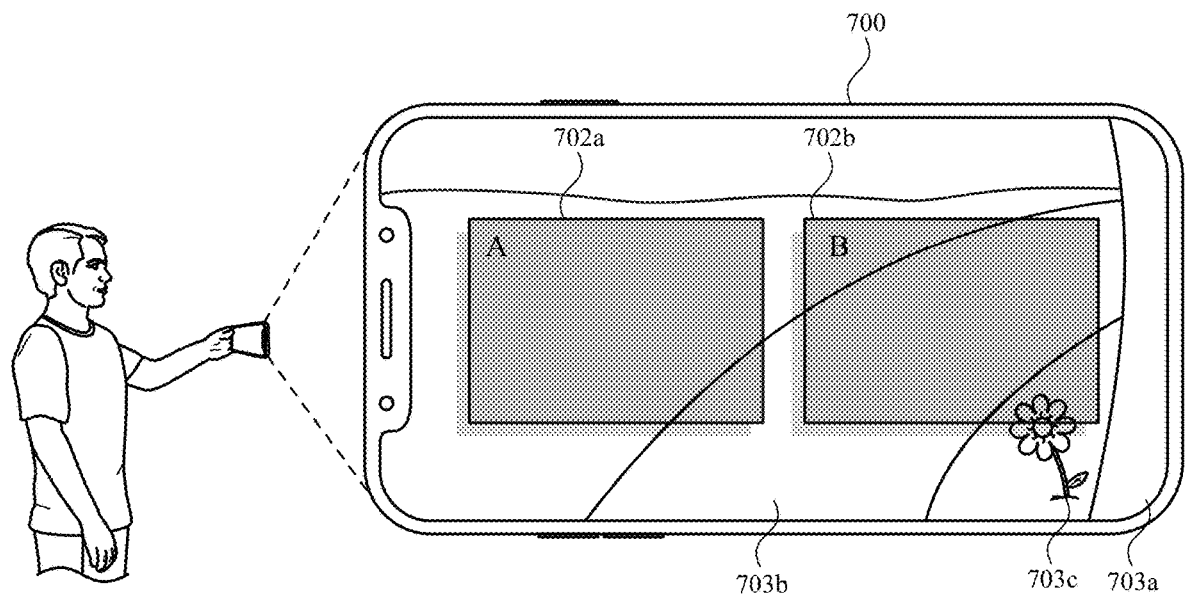

At FIG. 7F, in response to the leftward motion indicated by arrows 705d1 and 705d2, device 700 continues to display virtual objects 702a and 702b in the second mode, including displaying the objects as viewpoint-locked objects. The leftward motion indicated by arrow 705d also causes device 700 to be positioned relative to physical environment 703 in the same manner as shown FIG. 7B, as indicated by the positions of tree 703a, road 703b, and flower 703c. At FIG. 7F, device 700 detects that device 700 has remained stable for at least a predetermined period of time (e.g., has satisfied a set of stability criteria by remaining stable for 0.5 seconds, 1 second, 2 seconds, or 3 seconds; in some embodiments, that the viewpoint of the user (e.g., the head of the user) has satisfied the set of stability criteria).

Figure 7G:
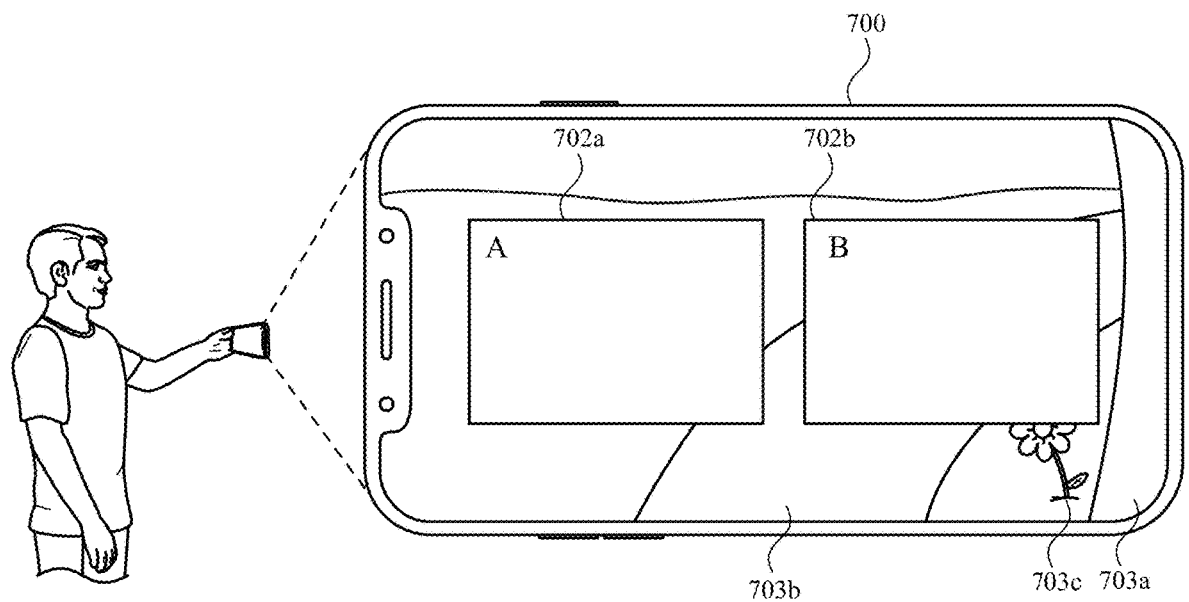

At FIG. 7G, in response to detecting that device 700 has remained stable for at least a predetermined period of time while virtual objects 702a and 702b are displayed in the second mode, device 700 transitions back to displaying virtual objects 702a and 702b in the first mode, including decreasing their opacity, removing their drop shadows, and displaying them as environment-locked virtual objects. Thus, in FIGS. 7B-7G, user 701 is able to transition the display mode of virtual objects 702a and 702b via a combination of movement and stability of device 700, without having to employ any manual input devices (e.g., a button and/or a touch-sensitive surface). In some embodiments in which device 700 is an HMD, the techniques discussed with reference to FIGS. 7B-7G enable a user to interact with a virtual object that remains environment-locked, while the field-of-view of the user (e.g., as determined by the orientation of the user's head) remains within a certain range of orientations (e.g., orientations that would not cause a threshold amount of the virtual object to transition out of the field-of-view of the user (e.g., as presented to the user via the display generation component of device 700)). This can be especially useful, for example, when the user is interacting with an XR experience and environment where it is expected that the user will primarily focus his or her attention in a general direction (e.g., at a concert, at certain sporting events, or at the theater). At the same time, the techniques discussed with reference to FIGS. 7B-7G provides the user with a user interface for repositioning the virtual object to be associated with a different portion of the physical environment, via changes in the field-of-view of the user (e.g., via movement of the user's head), without having to access manual controls.

Figure 7H:
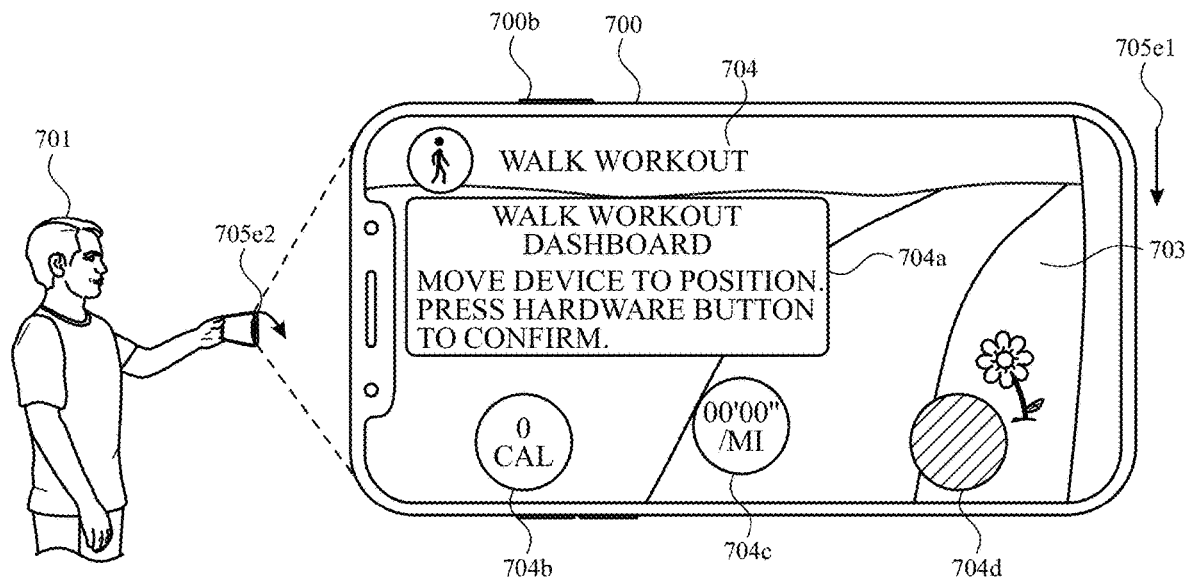

At FIG. 7H, device 700 displays user interface 704, which is a walk workout user interface. In some embodiments, user interface 704 is generated by a workout application of device 700. In some embodiments, user interface 704 is displayed in response to selecting (e.g., via a touch input, an air gesture, a hardware button press, a gaze input, or a combination thereof) virtual object 702a. User interface 704 includes guidance 704a and dashboard virtual objects 704b-704d. Guidance 704a instructs the user (e.g., user 701) to move device 700 (e.g., to change the user's viewpoint, as provided by device 700) in order to position dashboard virtual objects 704b-704d at a desired position (e.g., within the augmented reality environment) relative to a position and/or orientation of device 700 and/or relative to a position and/or orientation of a portion of the user's body (e.g., relative to the user's torso or head). Dashboard virtual object 704*b* indicates a current calorie count for the current walking workout, dashboard virtual object 704*c* indicates a current mile pace for the current walking workout, and dashboard virtual object 704*d* is a camera feed from a first camera that is in communication with device 700. In some embodiments, the first camera is a camera integrated into device 700 (e.g., a user and/or front facing camera of device 700 that has a viewpoint directed towards user 701). In some embodiments, the first camera is a remote camera that is in wireless communication with device 700, such as a stationary camera along road 703*b*. In some embodiments, user interface 704 is a user interface that is displayed while the user is operating a vehicle (e.g., a bicycle or an automobile) and the first camera is a camera integrated into the vehicle (e.g., a rear-view camera, a sideview and/or side mirror camera). In some embodiments, the representation of physical environment 703 that is displayed on display 700*a* and the camera feed of dashboard virtual object 704*d* provide different perspectives of the same general location (e.g., the location at which user 701 and/or device 700 is located) of the physical environment. In some embodiments, the two perspectives (e.g., a perspective facing towards tree 703*a* and a perspective facing away from tree 703*a*) are within close proximity to each other, though oriented differently (e.g., the two perspectives are within 0.1 feet, 0.2 feet, 0.5 feet, 1 foot, 2 feet, 5 feet, or 10 feet of each other). In FIG. 7H, dashboard virtual objects 704*b*-704*d* are positioned such that they appear approximately two feet in front of the user's torso, at approximately sternum level. At FIG. 7H, guidance 704*a* and dashboard virtual objects 704*b*-704*d* are displayed as viewpoint-locked objects and will continue to be displayed as viewpoint-locked objects until device 700 detects a press of hardware button 700*b*. At FIG. 7H, device 700 detects device 700 being angled downwards, as indicated by arrows 705*e*1 and 705*e*2.

Figure 7I:
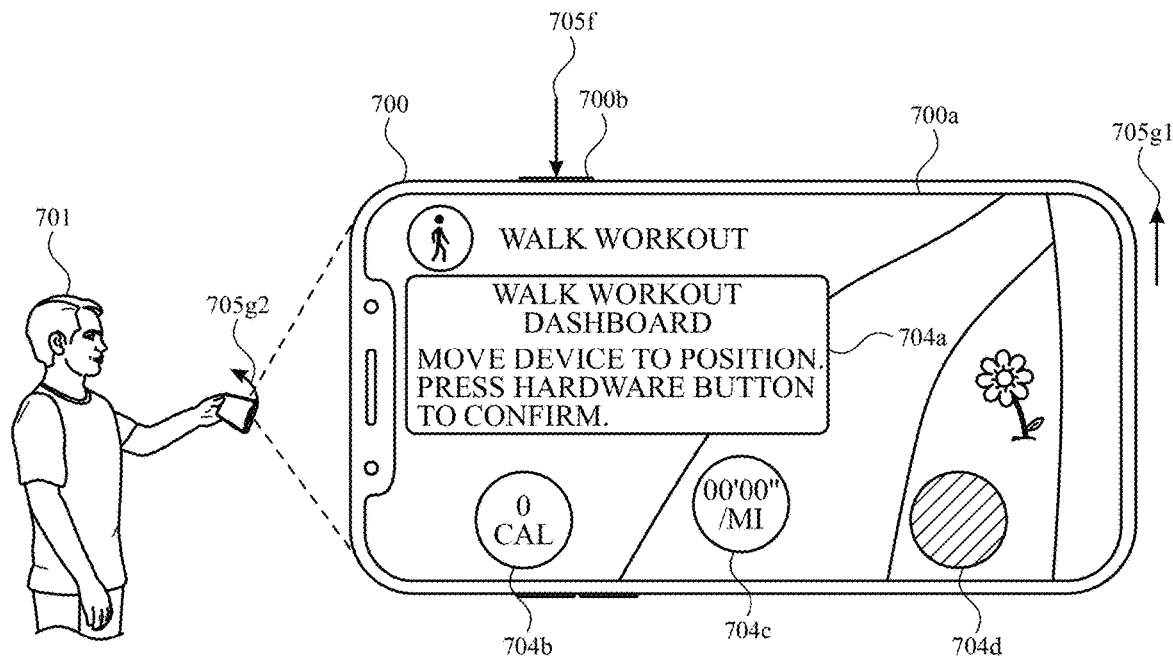

At FIG. 7I, in response to the downwards rotation indicated by arrows 705*e*1 and 705*e*2, a different portion of physical environment 703 is displayed on display 700*a*. Because guidance 704*a* and dashboard virtual objects 704*b*-704*d* are viewpoint-locked, guidance 704*a* and dashboard virtual objects 704*b*-704*d* continue to be displayed at the same locations on display 700*a*, but are now displayed at a different positions relative to the representation of physical environment 703 (e.g., further below flower 703*c* within the viewpoint of user 701, as compared to FIG. 7H). At FIG. 7I, device 700 maintains the display of dashboard virtual objects 704*b*-704*d* at the same predetermined distance of two feet from the user's torso. However, due to the downwards rotation indicated by arrows 705*e*1 and 705*e*2, dashboard virtual objects 704*b*-704*d* now appear approximately two feet in front of the user's torso, but at navel level, rather than sternum level. In other words, device 700 maintains the overall distance that dashboard virtual objects 704*b*-704*d* are away from the user's torso, while shifting their vertical position further downwards. At FIG. 7H, device 700 detects actuation (e.g., due to a finger press) of hardware button 700*b*, as indicated by arrow 705*f* In response to the actuation of hardware button 700*b*, device 700 ceases to display guidance 704*a* and transitions dashboard virtual objects 704*b*-704*d* from being view-point locked objects to being body-locked objects (in some embodiments, conditionally body-locked), as explained in more detail below. As used herein, a virtual object is body-locked when a computer system (e.g., device 700) displays the virtual object at a location and/or position in the viewpoint of the user that is based on (e.g., selected in reference to and/or anchored to) a portion of a user's body (e.g., the user's torso, the user's head, or the user's hand). As the viewpoint of the user shifts relative to the portion of the user's body, the body-locked virtual object is displayed at a different location and/or position in the viewpoint of the user, or not displayed at all if the viewpoint of the user does not include the locked position (e.g., a position corresponding to 2 feet in front of the user's navel). At FIG. 7I, virtual objects 704*b*-704*d* become body-locked to the user's torso, such that they will be displayed at a position within the viewpoint of the user that is based on the current position and/or orientation of the user's torso (e.g., they are displayed 2 feet from the user's navel). In some embodiments, dashboard virtual objects 704*b*-704*d* are conditionally, rather than fully, body-locked because while virtual objects 704*b*-704*d*, upon being initially displayed, are displayed based on the location and/or orientation of the torso of the user, shifts in the torso of the user that occur while virtual objects 704*b*-704*d* are being displayed do not cause the virtual objects to be repositioned (e.g., virtual objects 704*b*-704*d* are initially displayed at a position based on the position and/or orientation of the user's torso but then become world-locked to their displayed position, until dashboard virtual objects 704*b*-704*d* are no longer displayed (e.g., due to a change in the viewpoint of the user)). After no longer being displayed, dashboard virtual objects 704*b*-704*d* upon subsequent redisplay, are once again displayed at an initial position that is based on the position and/or orientation of the user's torso. An example of conditional body-locking is discussed in more detail, below, with reference to FIGS. 7M-7P. In some embodiments, each of dashboard virtual objects 704*b*-704*d* are individually body-locked to a different position relative to the user's torso. For example, dashboard virtual object 704*c* is displayed two feet directly in front of the user's navel, dashboard virtual object 704*b* is displayed at an angle of 30 degrees to the left of the user's navel and 2 feet away, and dashboard virtual object 704*d* is displayed at an angle of 30 degrees to the right of the user's navel and 2 feet away. Thus, in some embodiments, the dashboard virtual objects are displayed as a curved array of objects, centered on, and arrayed around (e.g., curving around) a portion of the user's body (e.g., the user's torso and/or navel). As seen in FIGS. 7H-7I, a user is able to customize the position (e.g., height) at which dashboard virtual objects 704*b*-704*d* are displayed through a combination of device/viewpoint movement and use of a hardware button. At FIG. 7I, after detecting the actuation of hardware button 700*b*, device 700 detects device 700 being angled upwards, as indicated by arrows 705*g*1 and 705*g*2.

Figure 7J:
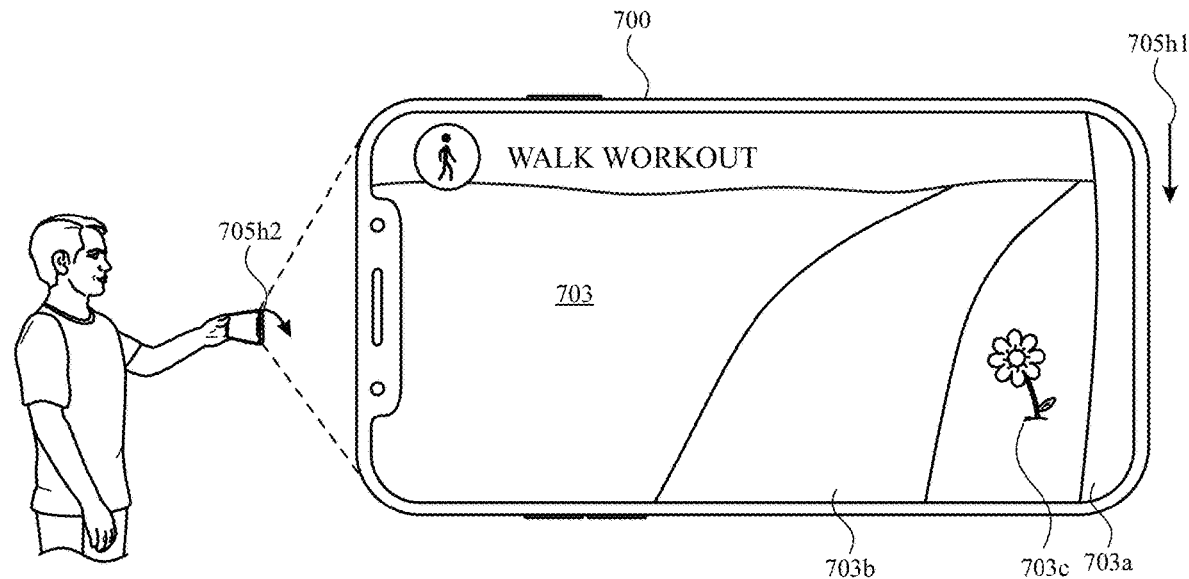

At FIG. 7J, in response to the upwards rotation indicated by arrows 705*g*1 and 705*g*2, the same portion of physical environment 703 that was displayed on display 700*a* in FIG. 7H is redisplayed. However, because the viewpoint of the user (e.g., via device 700) no longer includes the location 2 feet in front of the user's navel to which dashboard virtual objects 704*b*-704*d* are body-locked, dashboard virtual objects 704*b*-704*d* are no longer displayed. At FIG. 7J, device 700 detects device 700 being, once again, angled downwards, as indicated by arrows 705*h*1 and 705*h*2.

Figure 7K:
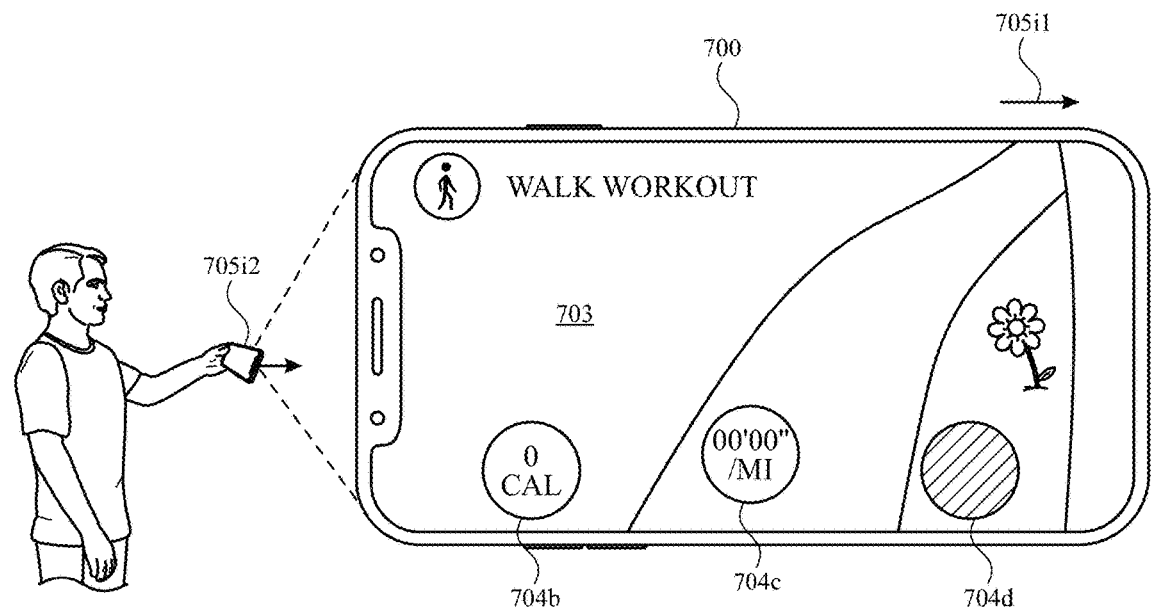

At FIG. 7K, in response to the downwards rotation indicated by arrows 705*h*1 and 705*h*2, the portion of physical environment 703 that was displayed on display 700*a* in FIG. 7I is redisplayed. Because the viewpoint of the user (e.g., via device 700) now includes the location 2 feet in front of the user's navel, body-locked dashboard virtual objects 704b-704d are redisplayed. At FIG. 7K, device 700 detects device 700 being moved to the right, as indicated by arrows 705i1 and 705i2.

Figure 7L:
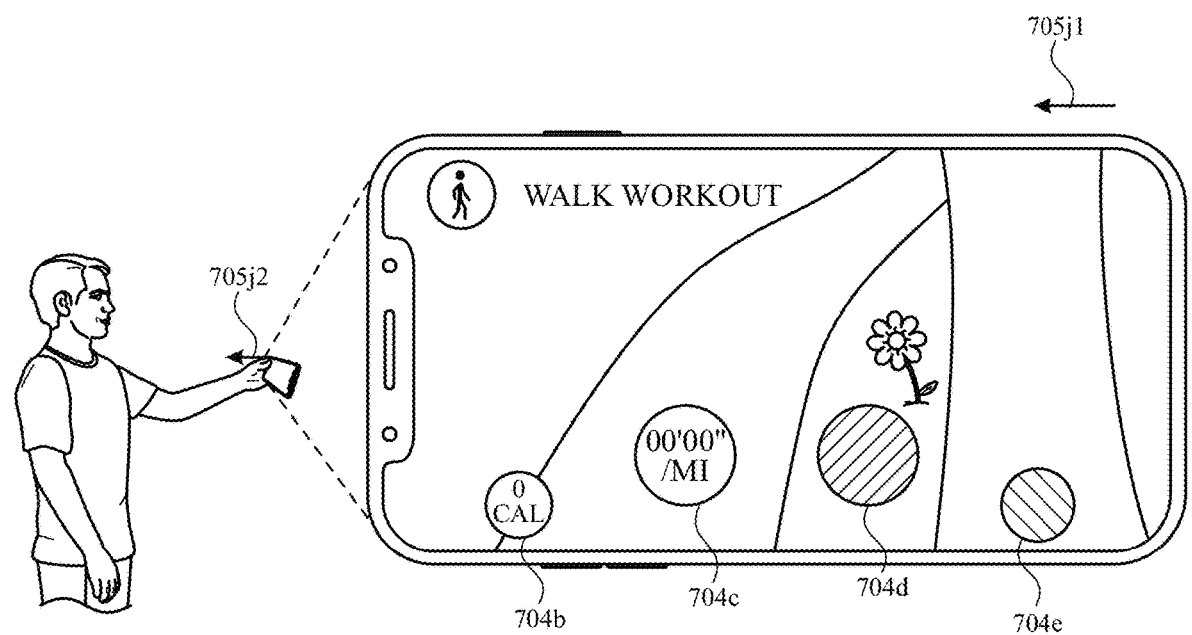

At FIG. 7L, in response to the rightward motion indicated by arrows 705i1 and 705i2, the representation of physical environment 703 has shifted on display 700a, dashboard virtual objects 704b-704d are displayed at different positions on display 700a, as they are body locked (e.g., the rightward motion did not include the user's torso moving and/or the objects are conditionally body-locked), and previously undisplayed dashboard virtual object 704e is now displayed. In FIG. 7L, dashboard virtual object 704e is body-locked to the torso of the user such that it is displayed 60 degrees to the right of the user's navel, at a distance of 2 feet; because that location was not within the viewpoint of the user in FIG. 7K, dashboard virtual object 704e was not displayed in FIG. 7K. In some embodiments, a plurality of dashboard virtual objects (e.g., 5, 7, 8, or 11) are arrayed around the user at predetermined angles relative to the user's torso, though not all of the dashboard virtual objects are visible from a given viewpoint. In some embodiments, this provides the user with scaleable user interfaces that can accommodate any number of dashboard virtual objects (e.g., with the most commonly accessed objects oriented towards the front of the user). In FIG. 7L, dashboard virtual object 704e is a feed of second camera that provides a different perspective on the physical environment than is provided by the feed of the first camera. For example, in some embodiments, the first camera feed is a rearwards facing feed from a vehicle being operated by the user and the second camera feed is a rightwards facing feed (or a right sideview feed) from the vehicle. Also in FIG. 7L, dashboard virtual object 704b has been reduced in size; reducing the size of the object avoids having a portion of the object move off-screen, had the object remained the same size. At FIG. 7L, device 700 detects device 700 being moved to the left, as indicated by arrows 705j1 and 705j2.

Figure 7M:
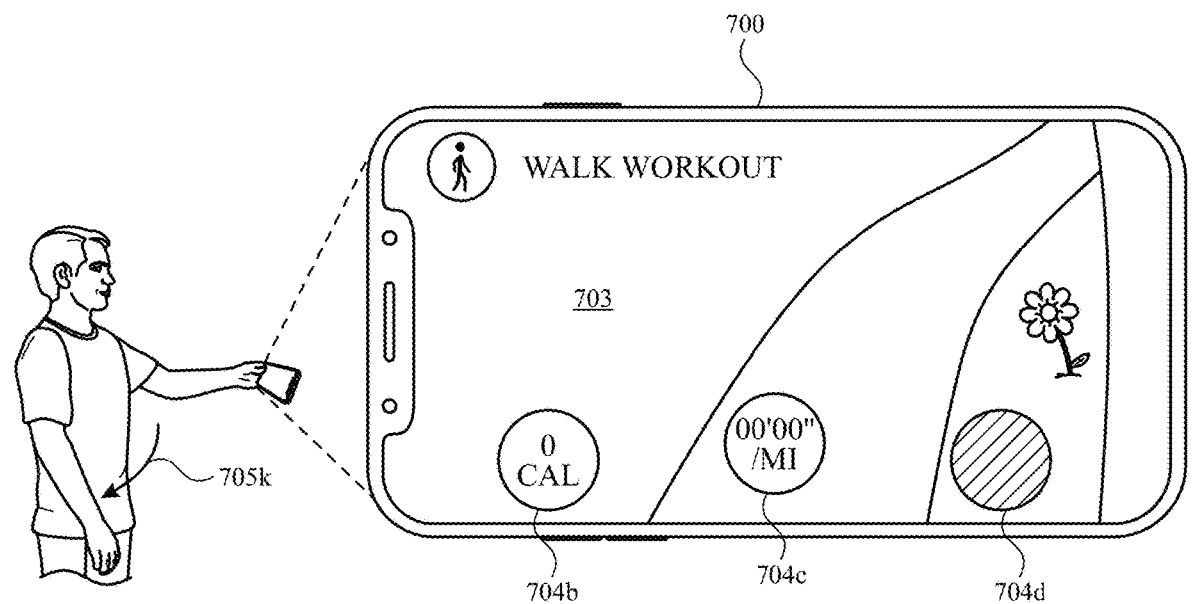

At FIG. 7M, in response to the leftward motion indicated by arrows 705j1 and 705j2, the representation of physical environment 703 and dashboard virtual objects 704b-704d return to being displayed as seen in FIG. 7K, including ceasing to display dashboard virtual object 704e. At FIG. 7M, device 700 detects user 701 turning his entire body to the right, as indicated by arrow 705k, while device 700 is maintained in the same position relative to the user's torso (e.g., device 700 is also being turned to the right, relative to the environment).

Figure 7N:
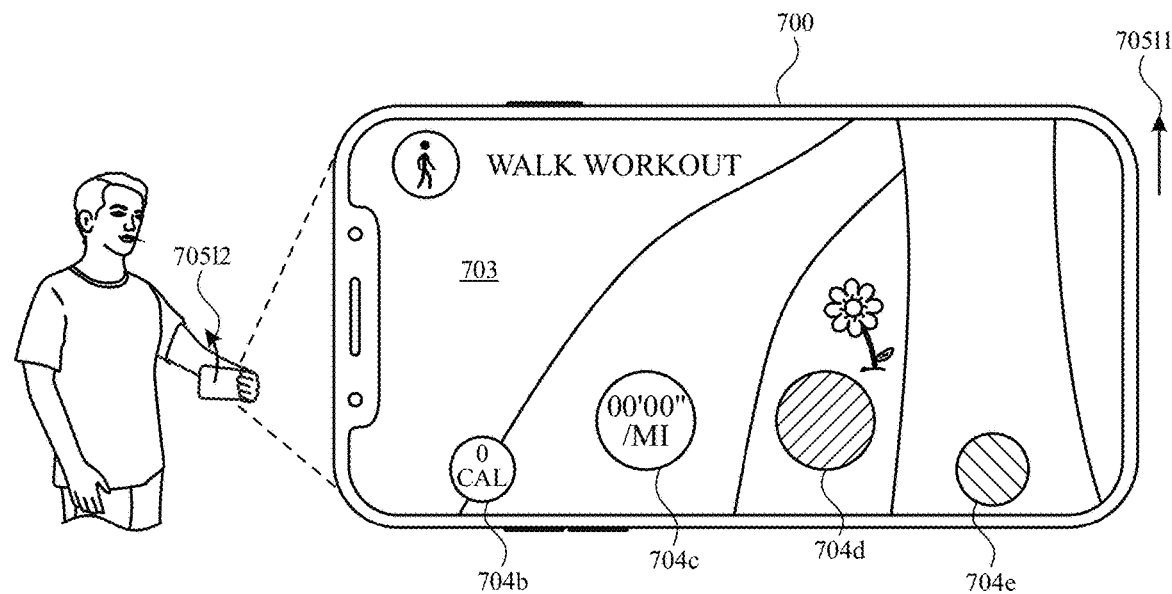

At FIG. 7N, in response to detecting user 701 turning his entire body to the right, device 700 displays the representation of physical environment 703 and dashboard virtual objects 704b-704e in the same manner as seen in FIG. 7L, because the dashboard virtual objects are conditionally body-locked, rather than being fully body-locked. Accordingly, the shift in the viewpoint of the user caused by movement of device 700 to the right (FIGS. 7K-7L) without movement of the user's torso has the same result as a movement of device 700 to the right due to the user's torso rotating to the right, because the dashboard virtual objects were already displayed, when the rotation of the user's torso occurred. At FIG. 7N, device 700 detects device 700 being angled upwards, as indicated by arrows 705l1 and 705l2.

Figure 7O:
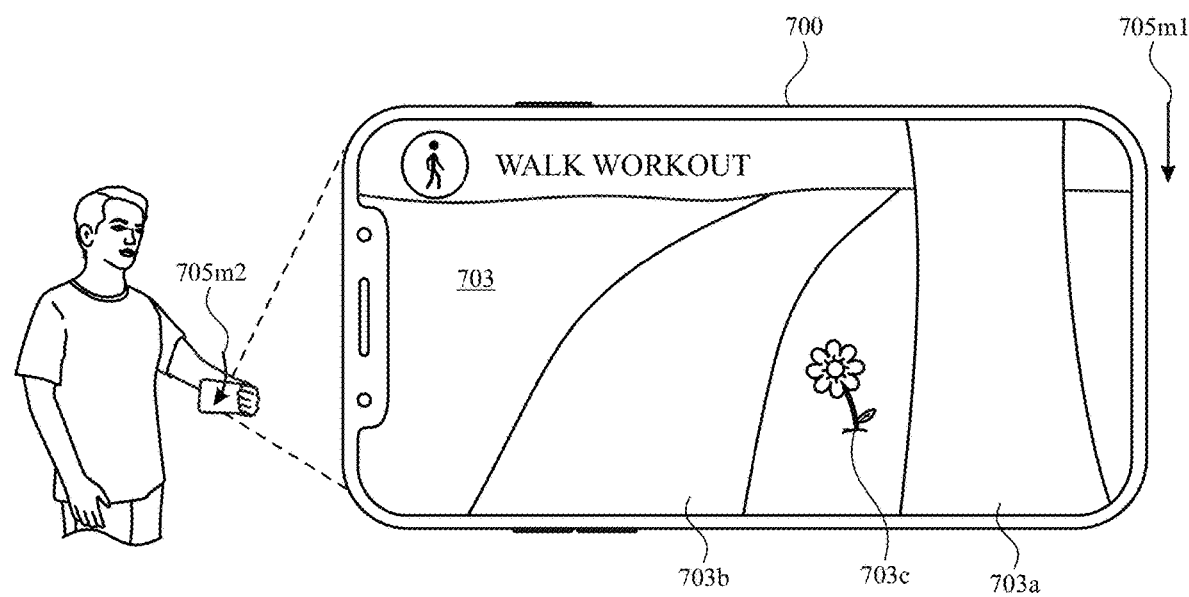

At FIG. 7O, in response to the upwards rotation indicated by arrows 705l1 and 705l2, device 700 ceases to display dashboard virtual objects 704b-e, as the viewpoint of the user (e.g., via device 700) no longer includes the location 2 feet in front of the navel of the user, similar to what was seen in FIG. 7J. Though in contrast to FIG. 7J, more of a rightwards portion of physical environment 703 is represented (e.g., as seen in comparing tree 703a in FIG. 7J to tree 703a in FIG. 7O) due to the rightward rotation of the user's body that occurred in FIG. 7M. At FIG. 7O, device 700 detects device 700 being angled downwards, as indicated by arrows 705m1 and 705m2.

Figure 7P:
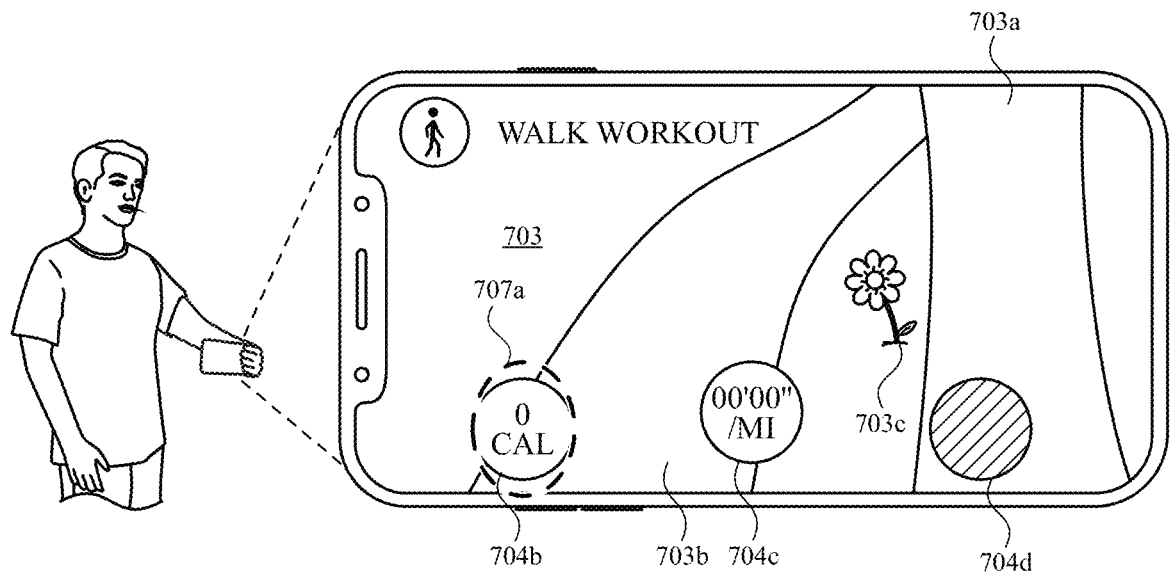

At FIG. 7P, in response to the downward rotation indicated by arrows 705m1 and 705m2, device 700 displays the representation of physical environment 703 as seen in FIG. 7N (e.g., as can be seen by the positions of tree 703a, road 703b, and flower 703c), but displays dashboard virtual objects 704b-d as, once again, being positioned 2 feet away from the user's navel, without displaying dashboard virtual object 704e (e.g., in contrast to FIG. 7N). Dashboard virtual object 704e is not displayed because the dashboard virtual objects are conditionally body-locked such that, on redisplay, their positions are again based on the current position and/or orientation of the user's torso. At FIG. 7P, device 700 detects the gaze of the user (as indicated by gaze indication 707a) being directed to dashboard virtual object 704b when a set of activation criteria are met (e.g., device 700 detects the user's gaze dwelling on the object for a predetermined period of time, device 700 detects an air gesture being performed while the user's gaze is directed to dashboard virtual object 704b, and/or hardware button 700b is actuated while the user's gaze is directed to dashboard virtual object 704b).

Figure 7Q:
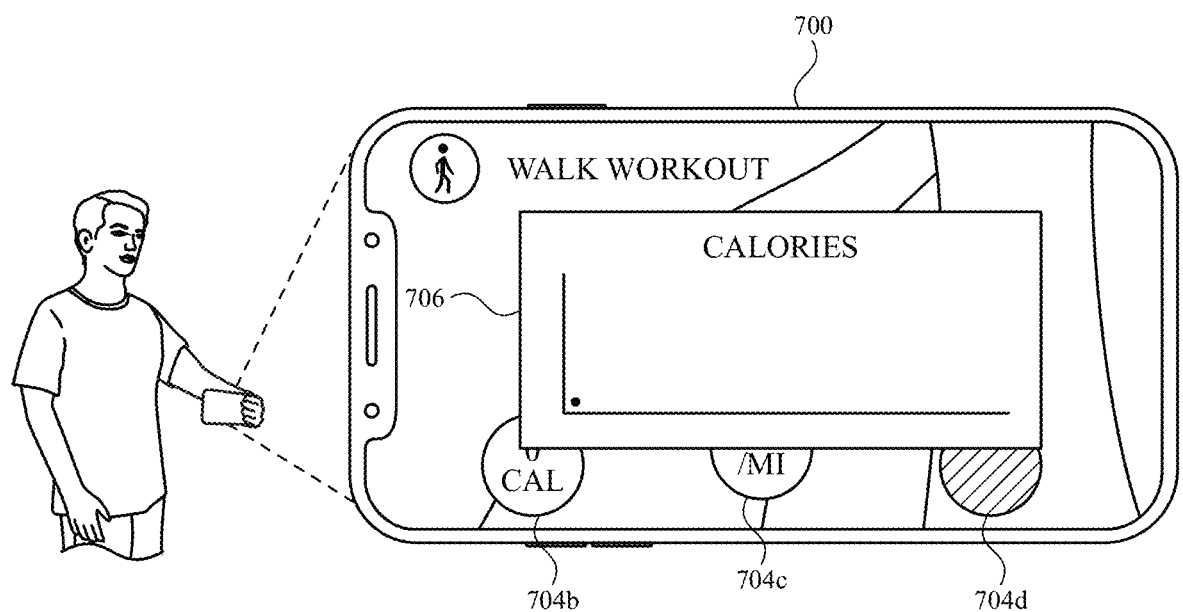

At FIG. 7Q, in response to detecting the gaze of the user being directed to dashboard virtual object 704b when a set of activation criteria are met, device 700 displays enlarged calorie information virtual object 706 overlayed on the representation of physical environment 703 and dashboard virtual objects 704b-d. Enlarged calorie information virtual object 706 includes a graph of the calories burned during the current walking workout. In some embodiments, one or more of dashboard virtual objects 704c-e are selectable to activate a corresponding function and/or to display corresponding information.

In some embodiments in which device 700 is an HMD, the techniques discussed with reference to FIGS. 7H-7Q provide a user with a set of virtual objects that are presented to the user when the user directs his or her field-of-view to a specific orientation. Doing so can provide the user with controls and/or information associated with the set of virtual objects that are readily accessible to the user, without having those objects constantly overlaid on the physical environment (e.g., as would be the case if the objects were viewpoint-locked). Thus, an HMD that employs the techniques discussed with reference to FIGS. 7H-7Q can provide a user with the ability to position the set of virtual objects at a desired spatial orientation relative to the user's body (e.g., the user's torso), so that the user can view the set of virtual objects by shifting his or her field-of-view so as to bring the objects in to view. In this way, a user of an HMD can access the objects when needed, without having to use manual controls to dismiss the objects and reinvoke them, as needed. For example, the set of virtual objects could be a set of dashboard controls and/or information for operating a vehicle or other machinery that requires a combination of a mostly unobstructed view and, conditionally, a large set of controls and/or information.

In some embodiments in which device 700 is an HMD, the techniques discussed with reference to FIGS. 7H-7Q provide the user with representations of multiple perspectives of the physical environment of the user, which can be particular useful when operating an HMD (e.g., that can block some portions of the user's peripheral vision). These techniques can also be useful for a user of an HMD by providing the user with enhanced perception of the local environment in circumstances such as operating a vehicle (e.g., providing both a front and rear view), monitoring a location (e.g., for security purposes), or observing changes within a large environment. The user is able to observe multiple perspectives of the physical environment, without having to constantly reposition the user's field-of-view (e.g., without having to constantly move his or her head).

Figure 7R:
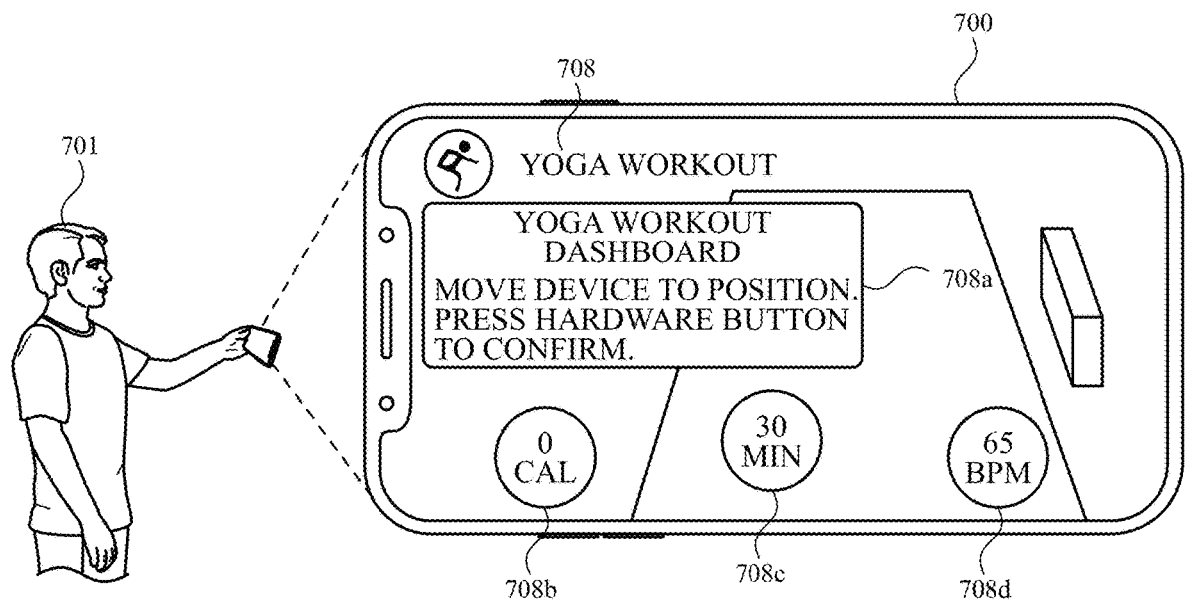

At FIG. 7R, device 700 displays user interface 708, which is a yoga workout user interface. User interface 708 includes guidance 708*a*, which is similar to guidance 704*a* of user interface 704. User interface 708 also include dashboard virtual objects 708*b-d*, which are customized to a yoga workout. For example, dashboard virtual object 708*b* indicates a current calorie count (similar to dashboard virtual object 704*a*) for the current yoga workout, dashboard virtual object 708*c* that includes a remaining time in the current yoga workout, and dashboard virtual object 708*d* that indicates a current heart rate for the user. Thus, in some embodiments, different dashboard virtual objects can be displayed for different applications, different functions, and/or different use cases (e.g., different workout types). In some embodiments, a user can customize (e.g., via setting menu) what dashboard virtual objects are associated with a given user interface and/or function. In some embodiments, while the user can select which dashboard virtual objects are displayed, the user cannot customize the manner in which the dashboard virtual objects are arrayed (e.g., their spacing and/or the distance from the user's torso at which they are displayed).

Figure 7S:
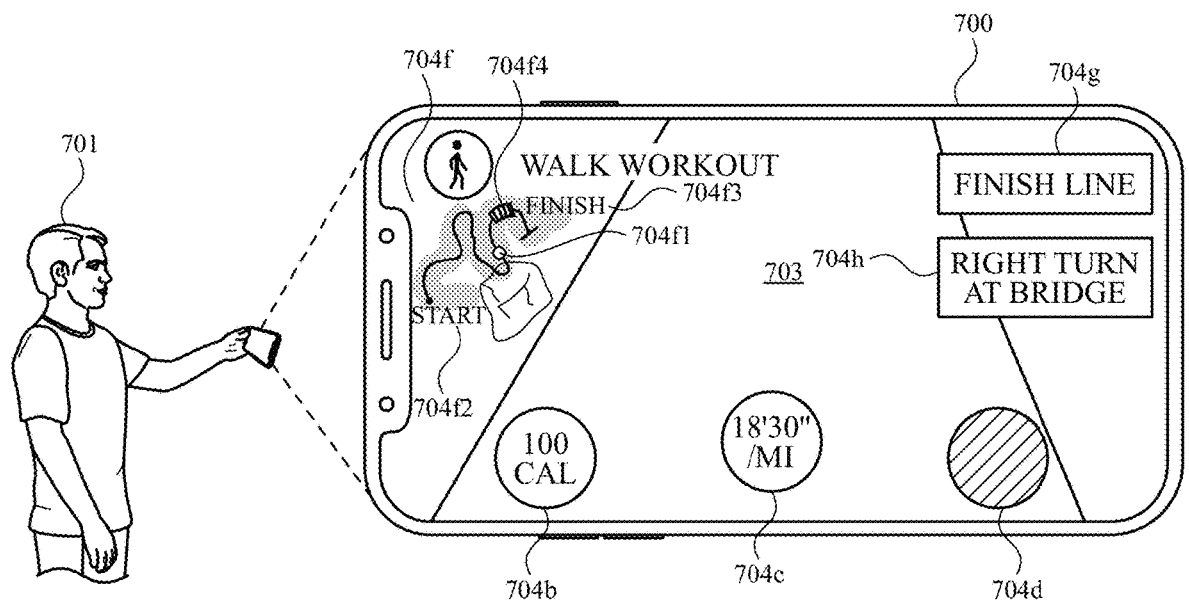

At FIG. 7S, device 700 is once again displaying user interface 704 that is a walk workout user interface. User interface 704 includes min-map virtual object 704*f* that indicates a selected walking route that user 701 has selected. Mini-map virtual object 704*f* includes current location indicator 704*f*1 that indicates the current location of user 701 and device 700 along the selected route (e.g., ⅔rds of the way), start position indicator 704*f*2, and finish position indicator 704*f*3, and bridge indicator 704*f*4 that indicates the location of a bridge (e.g., a predetermined landmark) along the route. At FIG. 7S, device 700 has updated calories count in dashboard virtual object 704*b* and the mile pace in dashboard virtual object 704*c*, based on user 701 having completed ⅔rds of the route. The representation of physical environment 703 now shows a portion of the physical environment that is in front of the user, at the current position along the route. At FIG. 7S, device 700 also displays navigation objects 704*g* and 704*h*, overlaid (in some embodiments, within) the representation of physical environment 703. Navigation objects 704*g* and 704*h* provide the user with indications of navigation points-of-interest, based on the currently selected route. For example, navigation object 704*g* indicates the finish line that corresponds to the location marked by finish position indicator 704*f*3 on min-map virtual object 704*f*; navigation object 704*h* indicates an upcoming turn navigation event in an upcoming portion of the route. Device 700 displays navigation objects 704*g* and 704*h* at locations on display 700*a* that are based on the relative locations and/or orientations of the associated navigation points-of-interest, relative to the location and/or orientation of device 700. At FIG. 7S, both of the associated navigation points-of-interest that correspond to navigation objects 704*g* and 704*h* are not within the current viewpoint of the user (e.g., the viewpoint as provided by device 700) and are to the right of the viewpoint of the user. Accordingly, device 700 displays navigation objects 704*g* and 704*h* at the righthand edge of display 700*a*, to indicate that they are outside of the user's viewpoint and to the right. Device 700 also displays navigation objects 704*g* and 704*h* as viewpoint-locked objects, while the navigation points-of-interest that they correspond to remain outside of the viewpoint of the user. In some embodiments, navigation objects 704*g* and 704*h* are at least partially transparent (e.g., their backgrounds are transparent so as to allow portions of the physical environment to be seen through the objects).

Figure 7T:
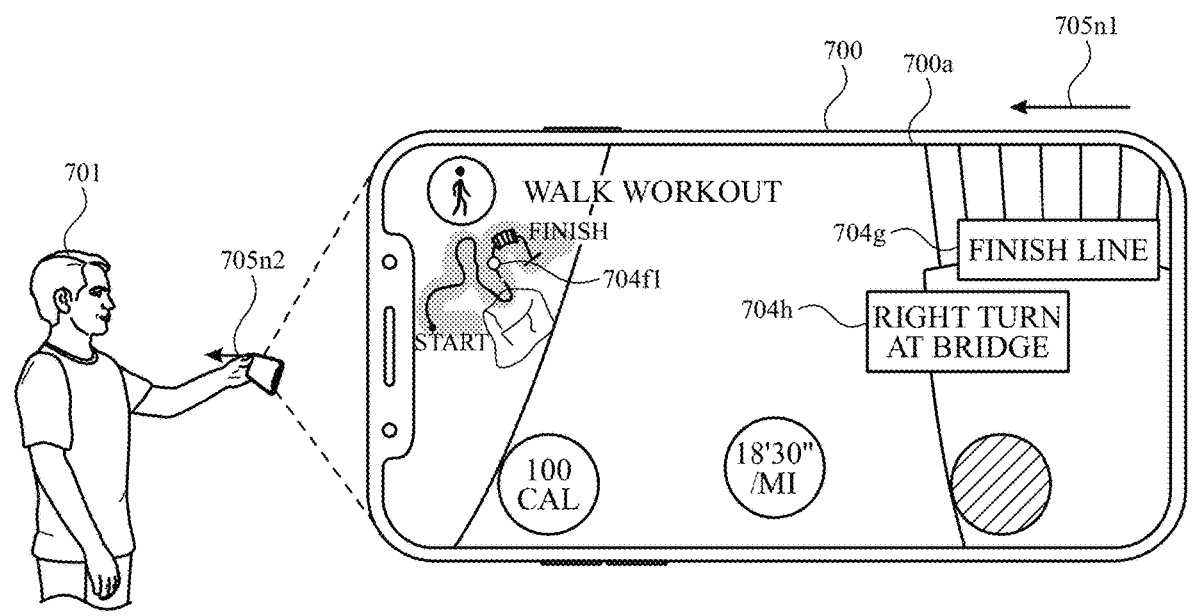

At FIG. 7T, user 701 and device 700 have progressed further along the route, as indicated by the updated position of current location indicator 704*f*1. The representation of physical environment 703 now includes a portion of the bridge that corresponds to bridge indicator 704*f*4. Because the location of the turn navigation event that corresponds to navigation object 704*h* is now within the viewpoint of the user (e.g., is within the representation of physical environment 703), device 700 displays navigation object 704*h* as an environment-locked object at a location on display 700*a* that indicates/marks the location of the turn navigation event. At FIG. 7T, the finish line continues to be outside to the right of the viewpoint of the user, so device 700 continues to display navigation object 704*g* at the righthand edge of display 700*a* and as a viewpoint-locked object. At FIG. 7T, device 700 detects device 700 being moved to the left, as indicated by arrows 705*n*1 and 705*c*2.

Figure 7U:
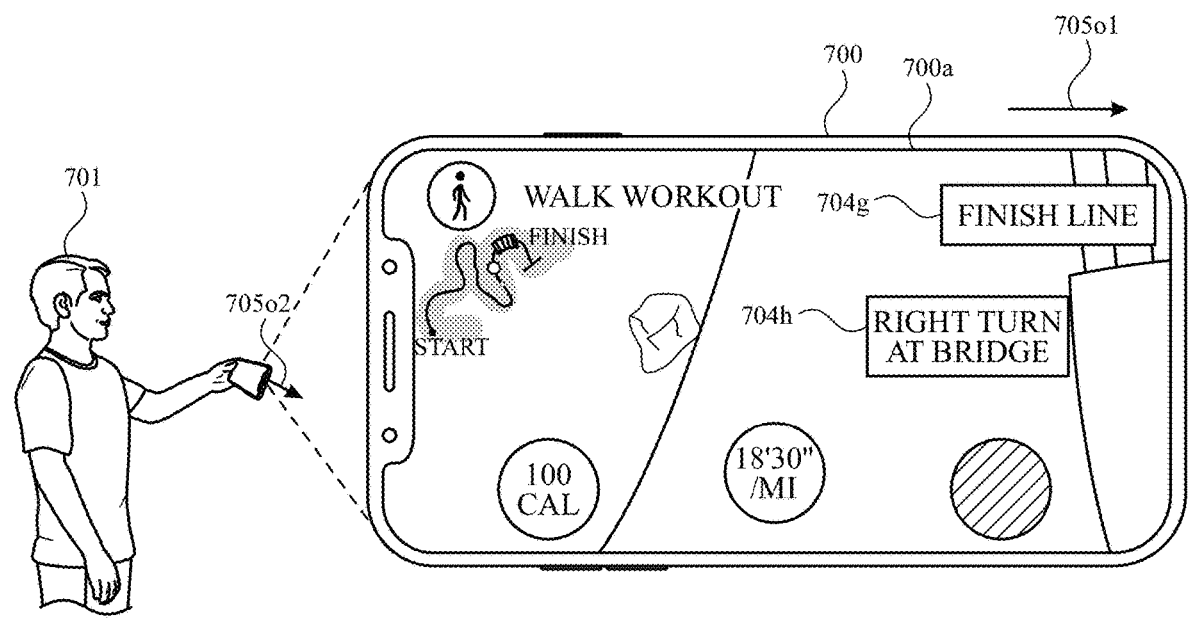

At FIG. 7U, in response to the leftward motion indicated by arrows 705*n*1 and 705*n*2, device 700 has shifted the representation of physical environment 703 to the right on display 700*a*. As a result, the location of turn navigation event is now further right on display 700*a* (but still within the viewpoint of the user), as compared to FIG. 7T, and navigation object 700*h* (which remains an environment-locked object) has also shifted right on display 700*a* so that the lefthand edge of navigation object 700*h* still indicates the location of the turn navigation event. The finish line continues to be outside to the right of the viewpoint of the user, so device 700 continues to display navigation object 704*g* at the righthand edge of display 700*a* and as a viewpoint-locked object. At FIG. 7U, device 700 detects device 700 being moved to the right, as indicated by arrows 705*o*1 and 705*o*2.

Figure 7V:
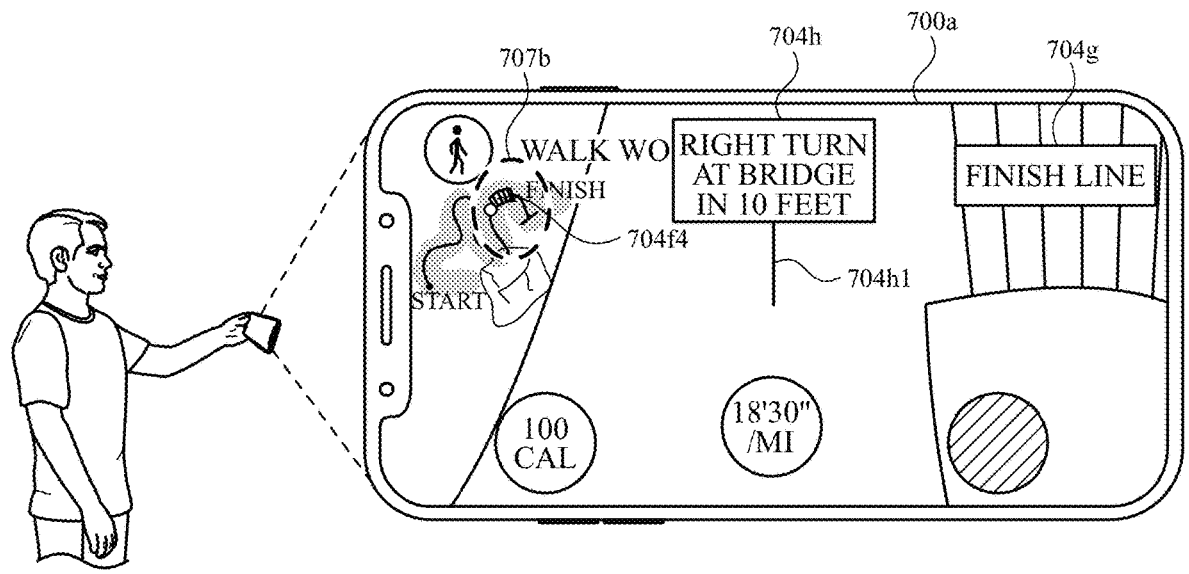

At FIG. 7V, user 701 and device 700 have progressed slightly further along the route, as indicated by the representation of physical environment 703 (e.g., a greater portion of the bridge is visible). In response to device 700 moving closer to the location of the turn navigation event, navigation object 704*h* includes additional information ("in 10 feet") about the turn navigation event. In some embodiments, navigation objects associated with points-of-interest that are within the viewpoint of the user (e.g., environment-locked navigation objects) are updated as the user approaches a threshold distance from the point-of-interest associated with the navigation objects. In some embodiments, navigation objects that are associated with points-of-interest outside of viewpoint of the user are not updated with addition information, as the device approaches closer to the points-of-interest. At FIG. 7V, in response to the rightward motion indicated by arrows 705*o*1 and 705*o*2, device 700 has shifted the representation of physical environment 703 to the left on display 700*a* to the same position. Navigation object 704*h* has now moved (e.g., moved slowly or floated) to the top edge of display 700*a* and now includes connector 704*h*1 that indicates the location of the navigation turn event such that at least one end of the connector 704*h*1 of navigation object 704*h* remains an environment-locked object that is locked to the location of the navigation turn event. Device 700 has moved navigation object 704*h* upwards (e.g., upwards over time) in order to avoid obscuring the center region of the viewpoint of the user for an extended period of time. In some embodiments, a navigation object that corresponds to a point-of-interest that is within the viewpoint of the user slowly floats upwards, over time, to avoid obscuring the center of the viewpoint of the user. At FIG. 7V, device 700 detects the gaze of the user (as indicated by gaze indication 707*b*) being directed to dashboard virtual object 704*b* bridge indicator 704*f*4.

Figure 7W:
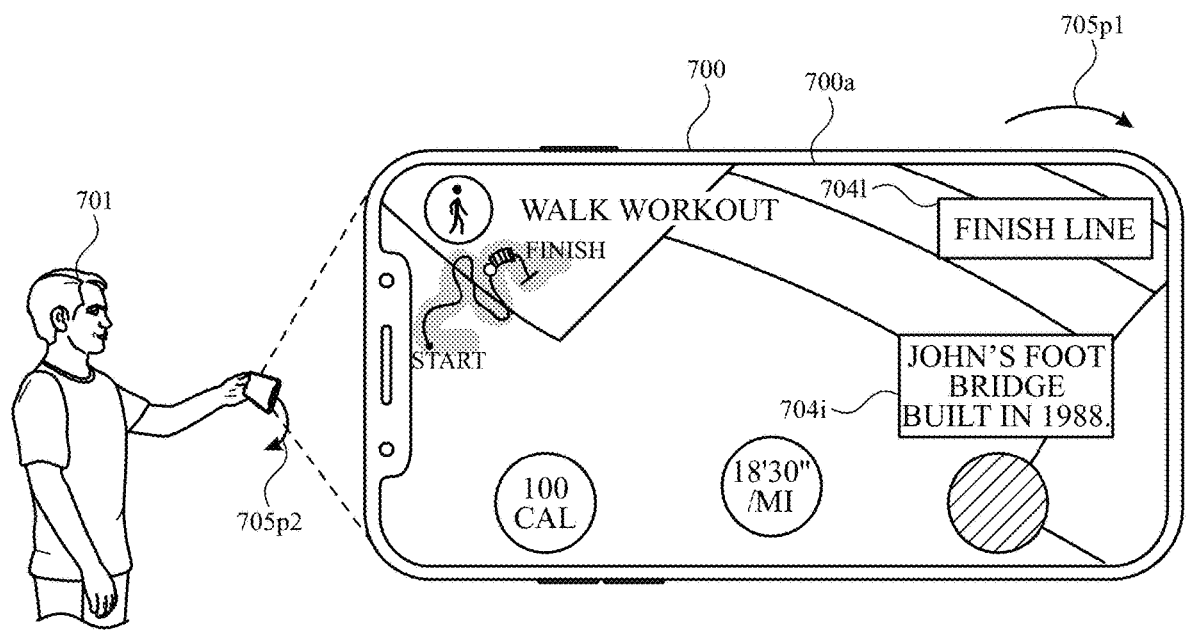

At FIG. 7W, user 701 and device 700 have progressed further along the route (e.g., the user has completed the turn that was indicated by navigation object 704*h*), as indicated by the updated position of current location indicator 704*f*1. The representation of physical environment 703 now includes a larger portion of the bridge that corresponds to bridge indicator 704*f*4. navigation object 704*h* is no longer displayed, since the turn has been completed. At FIG. 7W, device 700 displays point-of-interest object 704*i* that corresponds to the bridge and that includes information about the bridge point-of-interest. Device 700 displays point-of-interest object 704*i* as an environment-locked object that is locked to a righthand portion of the bridge. At FIG. 7W, device 700 detects device 700 being rotated clockwise, as indicated by rotation arrows 705*p*1 and 705*p*2.

Figure 7X:
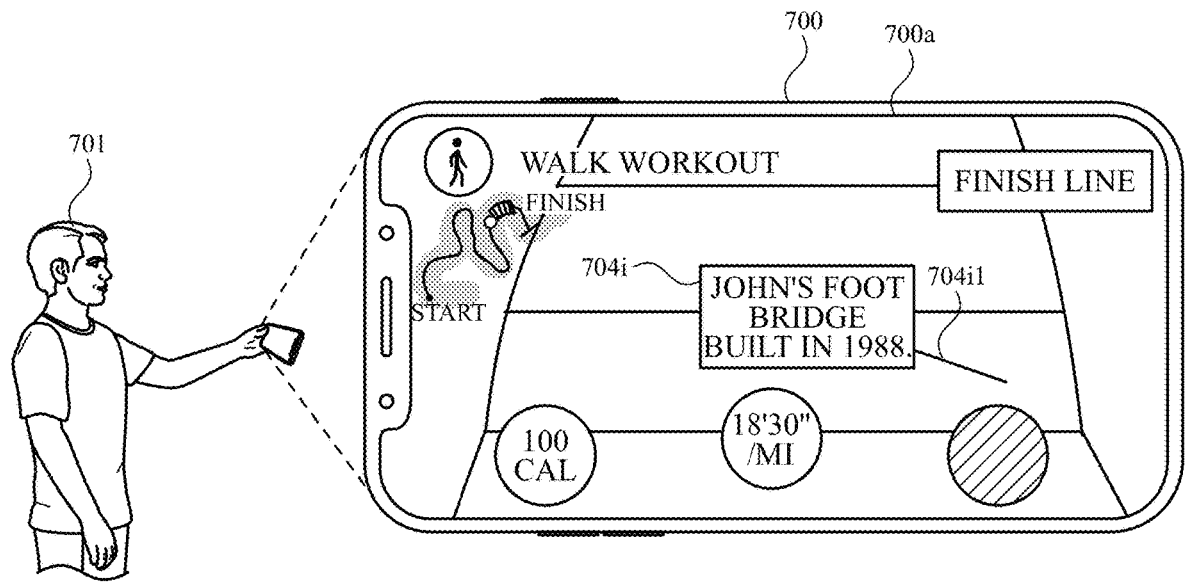

At FIG. 7X, in response to device 700 being rotated clockwise, as indicated by rotation arrows 705*p*1 and 705*p*2, the representation of physical environment is updated such that the bridge is more fully in view. Device 700 has also shifted the position of the point-of-interest object 704*i* further to left, to avoid point-of-interest object 704*i* moving (partially) off-screen, which would have occurred had the object not been shifted to the left, relative to the righthand portion of the bridge to which point-of-interest object 704*i* is environment-locked. Point-of-interest object 704*i* now includes connector 704*i*1 that has one end that remains environment-locked to the righthand portion of the bridge. At FIG. 7X, device 700 detects that user 701 and device 700 remain at the same position for a period of time.

At FIG. 7Y, in response to user 701 and device 700 remaining, at the same position for a period of time, device has moved point-of-interest object 704*i* upwards (e.g., upwards over time) in order to avoid obscuring the center region of the viewpoint of the user for an extended period of time, similar to the movement discussed above with reference to FIG. 7V. connector 704*i*1 of point-of-interest object 704*i* has increased in length so that it remains connected to the rest of point-of-interest object 704*i* and to the righthand portion of the bridge.

In some embodiments in which device 700 is an HMD, the techniques discussed with reference to FIGS. 7R-7Y provide the user with navigation virtual objects that are contextually environment-locked (e.g., when the location that an object is associated with is within the field-of-view user) or viewpoint-locked (e.g., when the location that the object is associated is not within the field-of-view of the user), depending at least on the orientation of the field-of-view of the user. Using these techniques while operating an HMD allows a user to navigate within an XR environment (e.g., navigate along a trail or a city with an XR guided tour) without having to adjust the manner in which navigation objects are displayed via manual controls. Doing so can free the user's hands to interact with other devices and/or the environment, while also avoiding the need to access controls on the HMD that may not be visible to the user.

Additional descriptions regarding FIGS. 7A-7Y are provided below in reference to methods 800, 900, 1000, and 1100, as described with respect to FIGS. 7A-7Y.

FIG. 8 is a flow diagram of an exemplary method 800 for interacting with virtual objects in an extended reality environment, including repositioning virtual objects relative to the environment, in accordance with some embodiments. In some embodiments, method 800 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

The computer system (e.g., 700), while a field-of-view of a user (e.g., a user of the computer system) (e.g., a field-of-view (e.g., viewpoint) of a user of the computer system (e.g., as determined by the computer system) and/or a field-of-view of a first camera that is in communication with the computer system and/or integrated into the computer system) (in some embodiments, an area within the viewpoint of the user in which the computer system can display one or more virtual objects) is a first field-of-view (e.g., a first orientation), displays (802), via the display generation component (e.g., 700*a*), a first virtual object (e.g., 702*a*, 702*b*, or a combination thereof) (e.g., a user interface element) (e.g., as part of an augmented reality user interface) in a three-dimensional environment (e.g., 703) (e.g., an environment of an extended reality environment, an augmented reality environment, and/or a virtual reality environment), wherein the first virtual object is displayed in a first display mode (e.g., the manner shown in FIG. 7B) (e.g., first manner) that includes being (e.g., currently and/or at a first time) environment-locked (e.g., to a first location and/or a first object of the three-dimensional environment (e.g., a real world location and/or object in the three-dimensional environment)). In some embodiments, the first virtual object includes one or more of a selectable control, a non-selectable user interface object, and a status indicator (e.g., that indicates the status of a hardware or software component of the system).

The computer system, while displaying the first virtual object, detects (804) (e.g., via one or more sensors (e.g., an accelerometer, an optical sensor (e.g., a camera)) a change in the field-of-view of the user from the first field-of-view (e.g., the field-of-view in FIG. 7B or FIG. 7C) to a second field-of-view (e.g., the field-of-view in FIG. 7C or 7D) (e.g., a position in which the first location and/or the first object is at a different portion of the first field-of-view as compared to when the field-of-view of the user is the first field-of-view); In some embodiments, when the change in the field-of-view of the user from the first field-of-view to the second field-of-view starts to be detected, the first virtual object is displayed in the first display mode.

In response (806) to detecting the change in the field-of-view of the user from the first field-of-view to the second field-of-view and in accordance with a determination that a first set of criteria are met (e.g., as discussed with reference to FIG. 7C), wherein the first set of criteria includes a criterion that is met when, while the field-of-view of the user is the second field-of-view and while the first virtual object remains environment-locked, a threshold amount (e.g., a percentage (e.g., 75%, 80%, 85%, 90%, or 95%) of the area of the first virtual object and/or a distance between an edge of the first virtual object and an edge of the first field-of-view (e.g., that a nearest edge of the first virtual object does not go beyond an edge of the FOV by more than a predetermined distance (e.g., no more than 5%, 10%, 15%, or 20% of the length of first virtual object extends beyond the FOV)) of the first virtual object would remain (e.g., remains) within the field-of-view of the user, the computer system continues to display (808) the first virtual object in the first display mode that includes being environment-locked.

In response (806) to detecting the change in the field-of-view of the user from the first field-of-view to the second field-of-view and in accordance with a determination that the first set of criteria are not met (e.g., as discussed with reference to FIG. 7D), the computer system displays (810) the first virtual object in a second display mode (e.g., as seen in FIG. 7D) (e.g., second manner) that includes shifting the displayed position (e.g., shifting to the center as seen in FIG. 7D) of the first virtual object relative to the three-dimensional environment based on changes (e.g., the change in the field-of-view of the user from the first field-of-view to the second field-of-view and/or further changes in the field-of-view of the user) of the field-of-view of the user (e.g., ceasing to display the first virtual object as being environment-locked). In some embodiments, the first set of criteria are not met when, while the field-of-view of the user is the second field-of-view, more than a threshold amount of the area that was previously occupied by the first virtual object is outside of the second field-of-view (e.g., if the first virtual object had remained environment-locked more than a threshold amount of the first virtual object would be outside of the field-of-view of the user when in the second field-of-view). Conditionally displaying the first virtual object in the first display mode or the second display mode based on whether a threshold amount would remain within the field-of-view of the user causes the display mode of the first virtual object to transition automatically, when the first set of criteria are met and also provides the user with feedback as to whether the threshold amount of the first virtual object would fall outside the field-of-view of the user, if the first visual object continued to be displayed in the first mode, which performs an operation when a set of conditions has been met without requiring further user input and provides improved visual feedback. Doing so also provides the user with the ability to change the display mode of the first virtual object through changes in the field-of-view of the user, which provides additional control options without cluttering the UI with additional displayed controls.

In some embodiments, displaying the first virtual object in the second display mode includes changing a visual appearance of the first virtual object from a first visual appearance that the first virtual object is displayed with while in the first display mode to a second visual appearance that is different from the first visual appearance (e.g., as seen in the difference between the appearance of 702a in FIG. 7B as compared to FIG. 7D) (e.g., differs from the first visual appearance in at least once visual characteristic such as color, opacity, shading, translucency, or transparency). Changing the visual appearance of the first object depending on the display mode provides the user with an indication as to whether the first visual object is in the first or the second display modes, which provides improved visual feedback.

In some embodiments, the first virtual object has a first level of opacity (e.g., as seen in FIG. 7B) when displayed with the first visual appearance and a second level of opacity (e.g., as seen in FIG. 7D) that is different from the first level of opacity when displayed with the second visual appearance (e.g., the second visual appearance is less opaque or opaquer than the first visual appearance). Changing the level of opacity of the first object depending on the display mode provides the user with an indication as to whether the first visual object is in the first or the second display modes and also provides, for the display mode with higher opacity, the user with an increased ability to see the portions of the three-dimensional environment that the first visual object overlays, which provides improved visual feedback.

In some embodiments, the first virtual object has a first type (in some embodiments, the first type of drop shadow is the absence of any drop shadow) of drop shadow (e.g., the visual effect/appearance of a shadow cast by the first virtual object as if the first virtual object is raised above a surface) when displayed with the first visual appearance (e.g., an absence of a drop shadow for 702a as seen in FIG. 7B) and a second type of drop shadow (e.g., the drop shadow for 702a seen in FIG. 7D) that is different from the first type of drop shadow when displayed with the second visual appearance. In some embodiments, the first virtual object has no drop shadow when displayed with the first visual appearance and has a drop shadow when displayed with the second visual appearance or vice versa. In some embodiments, the first virtual object has a more pronounced drop shadow when displayed with the second visual appearance as compared to the first visual appearance, or vice versa. Changing drop shadow of the first object depending on the display mode provides the user with an indication as to whether the first visual object is in the first or the second display modes, which provides improved visual feedback.

In some embodiments, while the first virtual object is being displayed in the second display mode, the computer system detects that a level of stability (e.g., the degree to which the field-of-view of the user remains unchanged or minimally changed within a period of time) of the field-of-view of the user satisfies a set of stability criteria (e.g., as discussed with reference to FIG. 7F) (e.g., less than a threshold amount of permissible within a predetermined period of time (e.g., a net shift of less than 10%, 5%, or 2% of the area of the FOV within a preceding period of 2 seconds, 1 seconds, or 0.5 seconds)) (in some embodiments, the field-of-view of the user is determined to be stable when it has not substantially shifted for a predetermined period of time). In response to detecting that the level of stability of the field-of-view of the user satisfied the set of stability criteria, the computer system displays (e.g., transitioning from the second display mode to the first display mode; transitioning the first virtual object to being environment-locked) the first virtual object in the first display mode (e.g., as seen in FIG. 7G). Transitioning the first virtual object to the first display mode that includes being environment-locked based on a detected level of stability of the FOV of the user performs an operation when a set of conditions has been met without requiring further user input, provides improved visual feedback as to the level of detected stability of the FOV of the user, and provides additional control options (e.g., for transitioning the first virtual object to the first display mode) without cluttering the UI with additional displayed controls.

In some embodiments, the level of stability of the field of view-of-the user is based on a determination of a level of stability of a head (e.g., the degree to which the head of the user shifts or does not shift during a period of time) of the user of the computer system (e.g., as discussed with reference to FIG. 7F). In some embodiments, the level of stability of the field-of-view of the user is determined without reference to the direction of gaze of the user. Basing the level of stability of the field of view-of-the user is based on a determination of a level of stability of a head of the user provides the user with the ability to use the user's head to affect a change in the display mode of the first virtual object, which reduces the number of inputs needed to perform an operation and providing additional control options without cluttering the UI with additional displayed controls.

In some embodiments, while the first virtual object is being displayed in the second display mode, the computer system displays a first indication (e.g., the drop shadow for 702*a* seen in FIG. 7D) (e.g., a textual and/or graphical indication) (in some embodiments, an indication that is not displayed when the first virtual object is being displayed in the first display mode) that the first virtual object can be transitioned to being displayed in the first display mode that includes being environment-locked. Displaying the first indication provides the user with feedback as to current display mode of the first virtual object and feedback as to the capability to transition the first virtual object back to the first display mode, which provides improved visual feedback.

In some embodiments, the first indication includes a second version of the first virtual object, wherein the second version of the first virtual object has a dimmer appearance than the first virtual object (e.g., a dimmed version of the first virtual object that is displayed along with the first virtual object). Displaying a second version of the first virtual object provides feedback as to which mode the first virtual object is being displayed in, which provides improved visual feedback.

In some embodiments, the first indication includes an outline of at least a portion of the first virtual object (in some embodiments, the first virtual object is displayed with an outline in the second display mode that is not present when the first virtual object is displayed in the first display mode). Displaying an outline of at least a portion of the first virtual object provides feedback as to which mode the first virtual object is being displayed in, which provides improved visual feedback.

In some embodiments, while the first virtual object is being displayed in the second display mode, the computer system detects (e.g., via one or more sensors (e.g., an accelerometer, an optical sensor (e.g., a camera)) a change in the field-of-view of the user from a third field-of-view (e.g., as seen in FIG. 7D) to a fourth field-of-view (e.g., as seen in FIG. 7F) that occurs at a first speed and in a first direction; and in response to detecting the change in the field-of-view of the user from the third field-of-view to the fourth field-of-view, the computer system shifts a position at which the first virtual object is displayed in the field-of-view of the user in a second direction that is based on the first direction (in some embodiments, that is opposite the first direction) and at a second speed that is different than the first speed (e.g., as discussed with reference to the movement of 702*a* in FIG. 7E) (e.g., slower than the first speed). In some embodiments, the first virtual object is displayed at a first position in the field-of-view of the user just prior to detecting the change in the field-of-view from the third field-of-view to the fourth field-of-view and is, after the field-of-view of the user ceases to change, re-displayed at the first position within the field-of-view of the user. In some embodiments, the second direction is opposite the first direction and the first virtual object is shifted in the first direction after being shifted in the second direction such that it appears as if the first virtual object catches up to the change in the field-of-view of the user after a brief period of time in which the first virtual object lags behind the change in the field-of-view of the user. In some embodiments, the first virtual object is referred to as being environment locked with lazy follow behavior, when it is displayed in the second display mode, in that it is ultimately displayed at the same position in the field-of-view of the user absent periods of change in the of the field-of-view of the user, during which time the position of the first virtual object in the field-of-view of the user lags behind, briefly, the change in the field-of-view of the user. Shifting the position of the first virtual object in a direction based on the direction of movement of the field-of-view and at speed that is different than the speed of movement of the field-of-view helps to address discomfort from rapid shifts in the displayed position of the first virtual object relative to the three-dimensional environment, which provides more sustainable user engagement with the computer system. Providing more sustainable user engagement improves user-computer system interaction, reduces power usage and improves battery life of the device by enabling the user to use the device more sustainably and efficiently (e.g., due to less errors caused by discomfort), while improving the ergonomics of the device. Doing so also provides improved visual feedback as to changes in the field-of-view of the user.

In some embodiments, continuing to display the first virtual object in the first display mode that includes being environment-locked in response to detecting the change in the field-of-view of the user from the first field-of-view to the second field-of-view includes ceasing to display a first sub-portion of the first virtual object (e.g., the left hand portion of 702*a* that is no longer displayed in FIG. 7C) (e.g., a sub-portion that extends outside of the displayable area of the display generation component (in some embodiments, that extends outside of the field-of-view of the user)) while continuing to display a second sub-portion (in some embodiments, the remainder of the first virtual object, absent the first sub-portion) of the first virtual object. In some embodiments, the change in the field-of-view of the user causes a first sub-portion of the environment-locked first virtual object to no longer be displayed as that first sub-portion transitions to being outside of the displayable area of the display generation component. Ceasing to display the first sub-portion of the first virtual object while continuing to display a second sub-portion of the first virtual object provides feedback as to changes in the field-of-view of the user, which provides improved visual feedback.

In some embodiments, while displaying the second sub-portion of the first virtual object without displaying the first sub-portion of the first virtual object (e.g., lefthand portion of 702*a* not shown in FIG. 7C), the computer system detects a change in the field-of-view of the user from the second field-of-view to a fifth field-of-view (e.g., a field-of-view different than the second field-of-view). In response to detecting the change in the field-of-view of the user from the second field-of-view to the fifth field-of-view and in accordance with a determination that the first set of criteria are not met, the computer system displays the first virtual object in the second display mode, including displaying (e.g., re-displaying) the first sub-portion (e.g., the lefthand portion of 702*a* not shown in FIG. 7C is shown in FIG. 7D) of the first virtual object. In some embodiments, displaying the first virtual object in the second mode includes positioning the first virtual object (in some embodiments, centering the first virtual object in the field-of-view of the user) in the field-of-view of the user so that the entirety of the first virtual object is displayed (e.g., is visible within the field-of-view of the user). Re-displaying the first sub-portion of the first virtual object when transitioning to the second display mode provides feedback as to the display mode, which provides improved visual feedback. Doing so also assists the user in visualizing how the entirety of the first virtual object will appear within the field-of-view of the user prior to transitioning back to the first display mode that includes environment-locking the object, which assists the user in properly positioning the first virtual object for environment-locking, which enhances the operability of the system and makes the user-system interface more efficient (e.g., by helping the user to provide proper inputs and reducing user mistakes when operating/interacting with the system) and therefore reducing power usage and improving battery life of the system by enabling the user to use the system more quickly and efficiently.

In some embodiments, the first virtual object is displayed concurrently with a plurality of virtual objects that includes a second virtual object (e.g., 702b) and a third virtual object; and the first virtual object, the second virtual object, and the third virtual object have a predetermined spatial relationship (e.g., the relationship between 702a and 702b in FIGS. 7B-7G) (e.g., a predetermined fixed spatial relationship/pattern) with respect to each other that is maintained as the first virtual object, the second virtual object, and third virtual object continue to be displayed within the field-of-view of the user (e.g., as the positions of the first virtual object, the second virtual object, and the third virtual object are shifted in the field-of-view of the user). In some embodiments, the first, second, and third virtual objects have a first predetermined spatial relationship prior to a shift in the field-of-view of the user, maintain the first predetermined spatial relationship as the field-of-view of the user shifts, and have the first predetermined relationship after the shift of the field-of-view of the user has shifted.

In some embodiments, aspects/operations of methods 800, 900, 1000, and/or 1100 may be interchanged, substituted, and/or added between these methods. For example, the techniques discussed above with respect to the first virtual object of method 800 can be applied to modify the display mode of or reposition one or more virtual objects discussed with respect to methods 900, 1000, and/or 1100. For brevity, these details are not repeated here.

FIG. 9 is a flow diagram of an exemplary method 900 for interacting with virtual objects, in an extended reality environment, including virtual objects that aid a user in navigating within the environment, in accordance with some embodiments. In some embodiments, method 900 is performed at a computer system (e.g., 700) (e.g., computer system 101 in FIG. 1) including a display generation component (e.g., 700a) (e.g., display generation component 120 in FIGS. 1, 3, and 4) (e.g., a heads-up display, a display, a touchscreen, a projector, etc.). In some embodiments, method 900 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 900 are, optionally, combined and/or the order of some operations is, optionally, changed.

The computer system (e.g., 700) displays (902), via the display generation component (e.g., 700a), a first virtual object (e.g., 704g or 704h) (e.g., as part of an augmented reality user interface) in a three-dimensional environment (e.g., 703) (e.g., an environment of an extended reality environment, an augmented reality environment, and/or a virtual reality environment), wherein the first virtual object indicates a first element (e.g., 704f3) (e.g., a turn, a point-of-interest, a location marker) of a route (e.g., 704f) (e.g., a projected route, a recommended route, a route of a navigation application and/or function) to a destination (e.g., a travel destination) and wherein the first virtual object corresponds to a first location (e.g., the location that corresponds to 704f4) in the three-dimensional environment (e.g., a location at which a turn is to be performed, a location of a point-of-interest).

The computer system displaying the first virtual object includes, in accordance with a determination that the first location is a location that is within a field-of-view of a user (e.g., as seen for 704h in FIG. 7T) (e.g., a user of the computer system) (e.g., a field-of-view (e.g., viewpoint) of a user of the computer system (e.g., as determined by the computer system) and/or a field-of-view of a first camera that is in communication with the computer system and/or integrated into the computer system) (in some embodiments, an area within the viewpoint of the user in which the computer system can display one or more virtual objects), the computer system displaying (904) the first virtual object as an environment-locked object (e.g., as seen in FIGS. 7T-7V) (e.g., locked to the first location and/or a first object of the three-dimensional environment (e.g., a real world location and/or object in the three-dimensional environment)) (in some embodiments, displaying at least a portion (e.g., a first end of a connector portion of the first virtual object) of the first virtual object as being environment locked).

The computer system displaying the first virtual object includes, in accordance with a determination that the first location is a location that is not within the field-of-view of the user (e.g., 704g and 704h in FIG. 7S) (e.g., is outside the field-of-view of the user), the computer system displaying (906) the first virtual object as a viewpoint-locked object (e.g., 704g in FIG. 7S) (e.g., viewpoint-locked to a point along the outer edge of the display generation component and/or the field-of-view of the user that is closest to the first location). Displaying the first virtual object as an environment-locked object or a viewpoint-locked object depending on whether the corresponding first location is within the field-of-view of the user performs the operation of changing the display state of the first virtual object when the required conditions are met, which performs an operation when a set of conditions has been met without requiring further user input. Doing so also provides feedback as to whether the first location is within the field-of-view of the user, which provides improved visual feedback.

In some embodiments, the computer system, while displaying the first virtual object, detects (e.g., via one or more sensors (e.g., an accelerometer, an optical sensor (e.g., a camera)) a change in the field-of-view of the user from a first field-of-view (e.g., an initial field-of-view) to a second field-of-view that is different from the first field-of-view (e.g., the change corresponding to arrow 705n1)); and the computer system, while displaying the first virtual object and in response to detecting the change in the field-of-view of the user from the first field-of-view to the second field-of-view: in accordance with a determination that the first virtual object is currently an environment-locked object (e.g., as is the case for 704h in FIGS. 7T-7U) (in some embodiments, and in accordance with a determination that the first location is a location that is currently within the second field of view), shifts the displayed position of the first virtual object so that the first virtual object maintains a substantially fixed position with respect to (e.g., relative to) a first portion of the three-dimensional environment and/or first object in the three-dimensional environment (e.g., to which the first virtual object is currently environment-locked); and in accordance with a determination that the first virtual object is currently a viewpoint-locked object (e.g., as is the case for 704g in FIGS. 7T-7U) (e.g., and is not an environment-locked object) (in some embodiments, and in accordance with a determination that the first location is a location that is not currently within the second field of view), maintains the displayed position of the first virtual object within the field-of-view of the user (e.g., even as the field-of-view of the user changes). Shifting or maintaining the position of the first virtual object in the field-of-view of the user in response to changes in the field-of-view of the user provides feedback as to the current lock state of the first virtual object, which provides improved visual feedback.

In some embodiments, the computer system detects a first change (in some embodiments, via one or more sensors (e.g., a GPS sensor, a WiFi sensor, an accelerometer) in a distance between the computer system (in some embodiments, a distance between the user of the computer system) and the first location in the three-dimensional environment (e.g., the changes shown between FIG. 7S to 7T and 7U to 7V). In response to detecting the first change in the distance between the computer system and the first location in the three-dimensional environment: in accordance with a determination that a first set of one or more criteria are met, wherein the first set of one or more criteria includes a first criterion that is met when a determination is made that the first change in the distance between the computer system and the first location in the three-dimensional environment reduced the distance between the computer system and the first location in the three-dimensional environment and wherein the first set of one or more criteria includes a second criterion that is met when the first location is a location that is currently within the field-of-view of a user, modifying (e.g., changing) a visual appearance of the first virtual object from a first visual appearance (e.g., an appearance that the first virtual object has when the distance between the computer system and the first location in the three-dimensional environment is above a threshold distance) to a second visual appearance different from the first visual appearance (e.g., as seen for 704h in FIG. 7V); and in accordance with a determination that the first set of one or more criteria are not met, forgoing modifying the visual appearance of the first virtual object from the first visual appearance to the second visual appearance (e.g., as seen for 704g in FIG. 7V) (in some embodiments, maintaining the first virtual object with the first visual appearance). Modifying the visual appearance of the first virtual object when the first set of one or more criteria are satisfied performs the modification of the first virtual object without requiring input from the user, which performs an operation when a set of conditions has been met without requiring further user input. Doing so also provides feedback as to the change in distance between the computer system and the first location, which provides improved visual feedback.

In some embodiments, modifying the visual appearance of the first virtual object from the first visual appearance to the second visual appearance includes modifying a size of the first virtual object from a first size to a second size (e.g., compare the size of 704h in FIGS. 7U and 7V) (e.g., a size that is larger or smaller than the first size). Changing the size of the first virtual object when the first set of one or more criteria are satisfied performs the change in size of the first virtual object without requiring input from the user, which performs an operation when a set of conditions has been met without requiring further user input. Doing so also provides feedback as to the change in distance between the computer system and the first location, which provides improved visual feedback.

In some embodiments, modifying the visual appearance of the first virtual object from the first visual appearance to the second visual appearance includes changing a visual characteristic (e.g., an appearance (e.g., a color and/or level of opacity, shading, translucency, and/or transparency)) of the first virtual object from a first value to a second value (e.g., changing a color of the first virtual object from a first color to a second color). Changing a visual characteristic the first virtual object when the first set of one or more criteria are satisfied performs the change in visual characteristic of the first virtual object without requiring input from the user, which performs an operation when a set of conditions has been met without requiring further user input. Doing so also provides feedback as to the change in distance between the computer system and the first location, which provides improved visual feedback.

In some embodiments, modifying the visual appearance of the first virtual object from the first visual appearance to the second visual appearance includes modifying text content of the first virtual object (e.g., 704h in FIG. 7V) (e.g., adding, removing, and/or changing text that is included in the first virtual object) (in some embodiments, additional text is added to existing text of the first virtual object). Modifying text content of the first virtual object when the first set of one or more criteria are satisfied performs the modification in text content of the first virtual object without requiring input from the user, which performs an operation when a set of conditions has been met without requiring further user input. Doing so also provides feedback as to the change in distance between the computer system and the first location, which provides improved visual feedback.

In some embodiments, the first change in the distance between the computer system and the first location in the three-dimensional environment decreased the distance between the computer system and the first location in the three-dimensional environment and wherein the first virtual object had the first visual appearance when the first change in the distance between the computer system and the first location in the three-dimensional environment was detected. The computer system, in response to detecting the first change in the distance between the computer system and the first location in the three-dimensional environment and in accordance with a determination that the first location is a location that is not within the field-of-view of the user, maintaining the first visual appearance of the first virtual object (e.g., as seen for 704g between FIGS. 7U and 7V). In some embodiments, the visual appearance of the first virtual object does not change even as the computer system gets closer to the first location, when the first location is not within the field-of-view of the user. Maintaining the first visual appearance of the first virtual object as the distance between the computer system and the first location decreases if the first location is not within the field-of-view of the user provides feedback as to absence of the first location in the field-of-view, which provides improved visual feedback.

In some embodiments, the computer displays, via the display generation component and concurrently with displaying the first virtual object, a map virtual object (e.g., 704f) (e.g., a mini-map or other map representation) that depicts at least a portion of the route to the destination.

In some embodiments, the map virtual object is a viewpoint-locked object (e.g., as seen in FIGS. 7S-7Y). Displaying the map virtual object as viewpoint-locked assists the user by associating the map virtual object with a fixed location within the field-of-view of the user, which assists the user in interacting with the map virtual object, which enhances the operability of the system and make the user-system interface more efficient.

In some embodiments, the map virtual object includes a location virtual object that corresponds to the first location. The computer system detects (e.g., via an input device (e.g., a touch-sensitive surface, a gaze-detection sensor, a camera, a motion sensor, a hardware button)) a first input (e.g., 707*b*) (e.g., a tap, a sustained gaze, an air gesture (e.g., while the location virtual object is selected and/or in focus), or a hardware button press (e.g., while the location virtual object is selected and/or in focus)) corresponding to the location virtual object; and in response to detecting the first input, the computer system displays, via the display generation component (in some embodiments, concurrently with the first virtual object; In some embodiments, as part of the first virtual object), a second virtual object (e.g., 704*i*) that includes information (e.g., textual and/or graphical information) about the first location.

In some embodiments, the first location is within the field-of-view of the user and the second virtual object is initially environment-locked to the first location. The computer system, while displaying the second virtual object is environment-locked to the first location, detects a change in the field-of-view of the user from a first field-of-view to a second field-of-view (e.g., the change indicated by 705*n*1). In response to detecting the change in the field-of-view of the user: in accordance with a determination that a second set of one or more criteria are met, wherein the second set of one or more criteria includes a third criterion that is met when, while the field-of-view of the user is the second field-of-view and while the second virtual object remains environment-locked, a threshold amount (e.g., a percentage (e.g., 75%, 80%, 85%, 90%, 95%, 100%) of the area of the second virtual object and/or a distance between an edge of the second virtual object and an edge of the field-of-view of the user (e.g., that a nearest edge of the second virtual object does not go beyond an edge of the FOV by more than a predetermined distance (e.g., no more than 0%, 5%, 10%, 15%, or 20% of the length of first virtual object extends beyond the FOV)) of the second virtual object would remain (e.g., remains) within the field-of-view of the user, the computer system continues to display the second virtual object as being environment-locked to the first location; and in accordance with a determination that the second set of one or more criteria are not met, the computer system shifts the displayed position of the second virtual object relative to the three-dimensional environment based on the change in the field of the user so that at least the threshold amount of the second virtual object remains within the field-of-view of the user (e.g., as seen between FIGS. 7T and 7U) (e.g., ceasing to display the first virtual object as being environment-locked, at least during the period of detected change in the field-of-view of the user). In some embodiments, the second set of one or more criteria are not met when, while the field-of-view of the user is the second field-of-view, more than a threshold amount of the area that was previously occupied by the second virtual object is outside of the second field-of-view (e.g., if the second virtual object had remained environment-locked to the first location more than a threshold amount of the second virtual object would be outside of the field-of-view of the user when in the second field-of-view). Shifting the position of the second virtual object, as needed, to maintain at least a threshold amount of the second virtual object in the field-of-view of the user causes the second virtual object to remain within the field-of-view of the user without requiring user input, which performs an operation when a set of conditions has been met without requiring further user input.

In some embodiments, the second virtual object is concurrently displayed with a connector virtual object (e.g., 704*h*1 or 704*i*1) (e.g., a connecting line, a pin, and/or a sign post) having a first end that is environment-locked to the first location and a second end that is connected to the second virtual object (e.g., connected to 704*h* or 704*i*). In some embodiments, shifting the displayed position of the second virtual object relative to the three-dimensional environment based on the change in the field of the user includes maintaining the first end of the connector virtual object as environment-locked to the first location (in some embodiments, and shifting the position of the second end of the connector virtual object relative to the three-dimensional environment). Maintaining the first end of the connector virtual object as environment-locked even as the second virtual object shifts position relative to the environment helps to maintain the connection between the second virtual object and the first location without requiring user input, which performs an operation when a set of conditions has been met without requiring further user input and provides improved visual feedback.

In some embodiments, the map virtual object has one or more visual characteristics (e.g., level of transparency and/or translucency; an amount, color, and/or pattern of a background portion of the map virtual object) that reduce (e.g., that were selected to reduce) an amount of the three-dimensional environment that is partially and/or completely obstructed by the map virtual object (e.g., 704*g* and/or 704*h* can be partially transparent). In some embodiments, the map virtual object can be displayed in at least two modes, a first mode in which the map virtual object is displayed with the first virtual object (e.g., while the computer system is actively in a navigation, riding, and/or driving mode) and a second mode (e.g., while the computer system is not actively in a navigation, riding, and/or driving mode). In the second mode, the map virtual object partially and/or completely obstructs a greater percentage of the three-dimensional environment as compared to the first mode (e.g., the second mode does not have the same one or more visual characteristics that are present in the first mode). Reducing an amount of the three-dimensional environment that is partially and/or completely obstructed by the map virtual object provides the user with greater awareness of the three-dimensional environment, which can improve user safety while operating the computer system, which enhances the operability of the system and makes the user-system interface more efficient and safer to operate.

In some embodiments, the computer system, while displaying the first virtual object at a first displayed position in the field-of-view of the user (in some embodiments, and in the absence of any changes in the field-of-view of the user) and in accordance with a determination that the first displayed position satisfies a set of repositioning criteria that includes a fourth criterion that is satisfied when the first displayed position is not a first predetermined display position (e.g., a position in the upper region and/or along an upper edge of the field-of-view of the user (in some embodiments, of the displayable area of the display generation component)), shifts the displayed position of at least a portion of the first virtual object towards the first predetermined display position (e.g., 704*h* as described in FIG. 7V) (in some embodiments, shifting to the first predetermined display position); and In some embodiments, the first virtual object includes a second connector virtual object that has a third end that remains environment-locked to a location (e.g., the first location) and/or object in the three-dimensional environment even as the displayed position of at least a portion of the first virtual object is shifted. In some embodiments, the second connector virtual object increases in length as the displayed position of at least a portion of the first virtual object is shifted. in accordance with a determination that the first displayed position does not satisfy the set of repositioning criteria (in some embodiments, the set of repositioning criteria are not satisfied when the first displayed position is the first predetermined display position), maintaining display of the first virtual object at the first displayed position. Shifting the position of at least a portion of the first virtual object towards the first predetermined display position when the set of repositioning criteria are satisfied performs the shifting without requiring user input, which performs an operation when a set of conditions has been met without requiring further user input.

In some embodiments, first element of the route is selected from the group consisting of a navigation operation (e.g., 704*h*) (e.g., a point at which to perform a turn or a stop) and a place-of-interest (e.g., 704*g*) (e.g., a start of the route, the end of the route, a location of interest on or near the route) (in some embodiments, a predetermined point-of-interest and/or a point-of-interest that is not determined by the user (e.g., a landmark, a construction site, or an accident location).

In some embodiments, the computer system displays, via the display generation component and concurrently with displaying the first virtual object, a speed virtual object (e.g., 704*c*) that includes an indication of a movement speed (e.g., a current movement speed of the computer system and/or of the user of the computer system).

In some embodiments, the speed virtual object is viewpoint-locked. Displaying the speed virtual object as viewpoint-locked assists the user by associating the speed virtual object with a fixed location within the field-of-view of the user, which assists the user in interacting with the speed virtual object, which enhances the operability of the system and make the user-system interface more efficient.

In some embodiments, aspects/operations of methods 800, 900, 1000, and/or 1100 may be interchanged, substituted, and/or added between these methods. For example, the navigation virtual objects of method 900 can be displayed concurrently with the set of one or more virtual objects of method 1000, described below. For brevity, these details are not repeated here.

FIG. 10 is a flow diagram of an exemplary method 1000 for interacting with virtual objects, including objects displayed based on changes in a field-of-view of a user, in an extended reality environment, including repositioning virtual objects relative to the environment, in accordance with some embodiments. In some embodiments, method 1000 is performed at a computer system (e.g., 700) (e.g., computer system 101 in FIG. 1) including a display generation component (e.g., 700*a*) (e.g., display generation component 120 in FIGS. 1, 3, and 4) (e.g., a heads-up display, a display, a touchscreen, a projector, etc.). In some embodiments, method 900 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

The computer system (e.g., 700), while a field-of-view (e.g., a viewpoint of a user of the computer system (e.g., as determined by the computer system) and/or a field-of-view of a first camera that is in communication with the computer system and/or integrated into the computer system that is being presented to the user) (in some embodiments, an area within the full field-of-view of the user in which the computer system can display one or more virtual objects) of a user of the computer system is a first field-of-view (e.g., FOV in FIG. 7J) and the field-of-view of the user includes a representation of a physical environment (e.g., 703) (e.g., a representation and/or view of the real world and/or a three-dimensional environment (e.g., an environment of an extended reality environment, an augmented reality environment, and/or a virtual reality environment)) (in some embodiments, the representation of the physical environment is generated by the computer system (e.g., as a pass-through representation) (in some embodiments, the representation of the physical environment is a portion of the real world seen by the user through a transparent portion of the computer system and/or the display generation component) that includes a first location within the physical environment, detects (1002) a change in the orientation of the field-of-view of the user from the first field-of-view to a second field-of-view (e.g., change corresponding to 705*h*1), different from the first field-of-view, that also includes the first location within the physical environment (e.g., at a different location in the field-of-view of the user due to the change in orientation) (in some embodiments, the change in orientation is a tilt of greater than 15 degrees, 30 degrees, 45 degrees, or 50 degrees (e.g., with respect to an original orientation and/or with respect to a horizon line and/or surface of the Earth)) (in some embodiments, the change in orientation is in a downwards or upwards direction).

The computer system, in response to detecting the change in orientation of the field-of-view of the user from the first field-of-view to the second field-of-view (in some embodiments, and in accordance with a determination that the change in orientation and/or the second field-of-view satisfies a first set of orientation criteria (in some embodiments, that includes a criterion that is satisfied when the change in orientation is a downwards tilt of greater than a predetermined amount (e.g., greater than 30 degrees, 40 degrees, or 45 degrees)), displays (1004) (e.g., initially displaying), via the display generation component, a set of one or more virtual objects (e.g., 704*b*-704*d*) with a respective spatial orientation relative to at least a first portion of a body of the user (e.g., the torso of user 701) (e.g., the set of one or more virtual objects are body-locked to a portion of the user's body (e.g., to the user's torso, hand, or shoulder) (e.g., user interface elements) (in some embodiments, one or more user interactive virtual objects).

The computer system, after displaying the set of one or more virtual objects with the respective spatial orientation relative to at least the first portion of the body of the user, ceases (1006) to display the set of one or more virtual objects (e.g., in response to a change in orientation of the field-of-view of the user away from the second orientation) (e.g., as seen in FIG. 7O).

The computer system, after ceasing to display the set of one or more virtual objects, detects (1008) movement of the user in the physical environment (e.g., as indicated by 705*m*1).

The computer system, after detecting movement of the user in the physical environment, detects (1010) a change in orientation of the field-of-view of the user to a second orientation (e.g., the orientation of FIG. 7P) (e.g., from the first field-of-view or another orientation different from the second orientation) (in some embodiments, the second orientation is downwards tilt of the field-of-view of the user).

The computer system, in response to detecting the change in orientation of the field-of-view of the user to the second orientation, displays (1012) (e.g., re-displaying), via the display generation component, the set of one or more virtual objects (e.g., as seen in FIG. 7P) with the respective spatial orientation relative to at least the first portion of the body of the user (e.g., user interface elements) (in some embodiments, one or more user interactive virtual objects). Displaying the set of one or more virtual objects with a respective spatial orientation relative to at least the first portion of the body of the user assists the user by associating the set of one or more virtual objects with the respective spatial orientation, which assists the user in interacting with the set of one or more virtual objects, which enhances the operability of the system and make the user-system interface more efficient. Displaying the set of one or more virtual objects in response to the change in the field-of-view of the user performs the display action without requiring user input, which performs an operation when a set of conditions has been met without requiring further user input.

In some embodiments, the set of one or more virtual objects includes a first virtual object that corresponds to a system control (e.g., as seen in FIGS. 7P-7Q in an embodiment in which 706 is system-generated) (e.g., a control that is associated with a system (e.g., an operating system of the computer system; a control that is not generated by an application (e.g., a third party application) function) (in some embodiments, the first virtual object is a selectable virtual object that, when selected, causes the operating system of the computer system to perform a function).

In some embodiments, the set of one or more virtual objects are displayed at a first position (e.g., as seen in FIG. 7K) in the field-of-view of the user that corresponds to the first location within the physical environment (e.g., the set of one or more virtual objects are displayed in the field-of-view of the user at a position that corresponds to the first location that was in both the first field-of-view and the second field-of-view). Displaying the set of one or more virtual objects at the first position in the field-of-view of the user that corresponds to the first location within the physical environment in response to the change in field-of-view from the first field-of-view to the second field-of-view allows the first position to be unobstructed by the set of one or more objects when the field-of-view is the first field-of-view, without requiring user input to remove the first set of virtual objects, which performs an operation when a set of conditions has been met without requiring further user input.

In some embodiments, the first portion of the body of the user is a torso of the user of the computer system (e.g., torso of user 701). In some embodiments, the computer system is an HMD and the computer system detects (e.g., via one or more sensors) and/or extrapolates the position of the torso of the user (e.g., relative to the position of the computer system/HMD) and displays the set of one or more virtual objects based on the position of the torso of the user (e.g., relative to the computer system/HMD). Displaying the set of one or more virtual objects with a respective spatial orientation relative to the torso of the user assists the user by associating the set of one or more virtual objects with the respective spatial orientation, which assists the user in interacting with the set of one or more virtual objects, which enhances the operability of the system and make the user-system interface more efficient.

In some embodiments, the first set of virtual objects, when displayed, are displayed at a location and/or position in the field-of-view that corresponds to a location in the physical environment that is determined to be (in some embodiments, based on sensor data; In some embodiments, based on an estimation or extrapolation based on the position of another portion (e.g., the head) of the user) a first predetermined distance (e.g., 0.5 feet, 1 foot, or 2 feet) from the first portion of the body of the user of the computer system (e.g., as described for 704b-704d in FIG. 7K). In some embodiments, the first set of virtual objects are body-locked at a predetermined distance from the second portion of the user. In some embodiments, while displaying the first set of virtual objects, the computer system detects a shift in the position (e.g., a rotation and/or a shift in space (e.g., in the x, y, and/or z direction) of the first portion of the body of the user (e.g., relative to the position of the computer system); in response to detecting the shift; the computer system shifts (e.g., dynamically shifts) the displayed position of the first set of virtual objects based on the detected shift in the position of the first portion of the body of the user. In some embodiments, while displaying the first set of virtual objects in a first position relative to the first portion of the body of the user, ceasing to display the first set of virtual objects (e.g., movement of the computer system that causes the first position to fall outside the field-of-view of the user); after ceasing to display the first set of one or more virtual objects, receiving a request to redisplay the first set of virtual objects (e.g., movement of the computer system that causes the first position to fall within the field-of-view of the user); in response to receiving the request, redisplaying the first set of virtual objects in the first position relative to the first portion of the body of the user (e.g., including when the first portion of the body of the user shifts in space while the first set of virtual objects was not displayed). In some embodiments, while the first set of virtual objects is displayed at a respective distance (e.g., a distance based on a detected and/or extrapolated position of the of the first portion of the body of the user) from the first portion of the body of the user of the computer system; while the first portion of the body of the user is in a first position in space, detecting a shift in the position (e.g., a rotation and/or a shift in space (e.g., in the x, y, and/or z direction) of the of the first portion of the body of the user (e.g., relative to the position of the computer system) away from the first position in space; in response to detecting the shift in the position of the first portion of the body of the user away from the first position in space: in accordance with a determination that the first portion of the body of the user is at a second position in space, displaying the first set of virtual objects at the respective distance from the first portion of the body of the user; and in accordance with a determination that the first portion of the body of the user is at a third position in space, different from the second position, displaying the first set of virtual objects at the respective distance from the first portion of the body of the user. Displaying the set of one or more virtual objects at a predetermined distance from the first portion of the body of the user assists the user by associating the set of one or more virtual objects with the respective distance from the body of the user, which assists the user in interacting with the set of one or more virtual objects, which enhances the operability of the system and make the user-system interface more efficient.

In some embodiments, the first set of one or more virtual objects, when displayed in response to detecting the change in orientation of the field-of-view of the user from the first field-of-view to the second field-of-view, are displayed at a second position in the field-of-view of the user that corresponds to a second location in the physical environment and with the respective spatial orientation relative to the first portion of the body of the user (in some embodiments, and at a second predetermined distance (e.g., 0.1, 0.25, 0.5 feet, 1 foot, or 2, 3, 5, 10 feet) from the first portion of the body of the user). The first set of one or more virtual objects, when displayed in response to detecting movement of the user in the physical environment, are displayed at a third position in the field-of-view of the user that corresponds to a third location in the physical environment that is different from the second location and with the respective spatial orientation relative to the first portion of the body of the user (e.g., compare the displayed positions of the 704*b*-704*d* with respect to the physical environment in FIG. 7K compared to 7P) (in some embodiments, and at the second predetermined distance from the first portion of the body of the user). In some embodiments, the first set of one or more virtual objects are displayed at different positions relative to the physical environment when the user moves, but are displayed with the same respective orientation and/or at the same distance from the body of the user. Resetting the position of the first set of one or more virtual objects with respect to the physical environment on re-display, while maintaining the respective spatial orientation relative to the first portion of the body of the user assists the user by associating the set of one or more virtual objects with the respective orientation with respect to the body of the user, which assists the user in interacting with the set of one or more virtual objects, which enhances the operability of the system and make the user-system interface more efficient.

In some embodiments, the computer system, while the field-of-view of the user is orientated to the second field-of-view and while displaying the set of one or more virtual objects, detects a change in orientation of the field-of-view of the user from the second field-of-view to a third field-of-view (e.g., change indicated by 705*i*1) (in some embodiments, the change in orientation is a turn to the left or to the right). The computer system, in response to detecting the change in orientation of the field-of-view of the user from the second field-of-view to a third field-of-view, displays, via the display generation component, a second set of one or more virtual objects (e.g., 704*e*) while maintaining display of at least a second virtual object of the first set of one or more virtual objects. In some embodiments, the second set of virtual objects includes one or more of the properties and/or characteristics discussed herein with respect to the first set of one or more virtual objects. In some embodiments, the first set of one or more virtual objects and the second set of one or more virtual objects are both a part of a super-set of virtual objects having shared characteristics that are not all displayed together at any given time.

In some embodiments, while displaying the first set of one or more virtual objects are displayed at a third position in the field-of-view of the user that corresponds to a third location in the physical environment, detecting a change (e.g., the change indicated by 705*m*1) in the orientation of the first portion of the body of the user (e.g., a rotation of the user's torso) that causes a change in the field-of-view of the user to a fourth field-of-view. In response to detecting the change in the orientation of the first portion of the body of the user (e.g., a rotation of the user's torso) that causes the change in the field-of-view of the user to the fourth field-of-view: the computer system displays the first set of one or more virtual objects at a fourth position in the field-of-view of the user that is different from the third position and that corresponds to the third location in the physical environment (e.g., compare the displayed positions of the 704*b*-704*d* with respect to the physical environment in FIG. 7K compared to 7P). In some embodiments, while the first set of virtual objects remain displayed, the first set of virtual objects is environment-locked. In some embodiments, while the first set of one or more virtual objects are initially displayed with the respective spatial orientation relative to at least the first portion of the body of the user, movements of the user's body that occur while the first set of virtual objects remain displayed can cause the first set of one or more virtual objects to no longer have the respective spatial orientation relative to at least the first portion of the body of the user.

In some embodiments, while the first set of one or more virtual objects are displayed at the fourth position in the field-of-view of the user, the first of one or more virtual objects do not have the respective spatial orientation relative to at least the first portion of the body of the user (e.g., as seen in FIG. 7L). In some embodiments, after displaying the first set of one or more virtual objects at the fourth position in the field-of-view of the user (e.g., a seen in FIG. 7K), the computer system ceases to display the first set of one or more virtual objects. While the first set of one or more virtual objects are not displayed, the computer system detects a change in the field-of-view of the user to a fifth field-of-view. The computer system, in response to detecting the change in the field-of-view of the user to the fifth field-of-view, displays the set of one or more virtual objects with the respective spatial orientation relative to at least the first portion of the body of the user and at a fifth position in the field-of-view of the user that does not correspond to the third location in the physical environment (e.g., compare the displayed positions of the 704*b*-704*d* with respect to the physical environment in FIG. 7K compared to 7P) (e.g., the position of the first set of one or more virtual objects can shifted relative to the physical environment upon re-display). Resetting the position of the first set of one or more virtual objects so that they are displayed with the respective spatial orientation relative to at least the first portion of the body of the user on re-display assists the user by associating the set of one or more virtual objects with the respective orientation with respect to the body of the user, which assists the user in interacting with the set of one or more virtual objects, which enhances the operability of the system and make the user-system interface more efficient.

In some embodiments, while the first set of one or more virtual objects includes (in some embodiments, consists of) a first set of control virtual objects (e.g., virtual objects that, when selected, cause the computer system to perform one or more functions; a set of control virtual objects that do not include a respective control), the computer system detects (e.g., via one or more input devices), a request to customize the first set of one or more virtual objects (e.g., as discussed with reference to FIG. 7R). In response to detecting the request to customize the first set of one or more virtual objects, the computer system customizes the first set of one or more virtual objects by updating the first set of one or more virtual objects to include a second set of control virtual objects (e.g., a second set of control virtual objects that includes the respective control (e.g., replacing a control virtual object of the first set of one control virtual objects with the respective control), wherein the second set of control virtual objects is different from the first set of control virtual objects (in some embodiments, the first and second set of control virtual objects have one or more control virtual objects in common). In some embodiments, one or more of the appearance, the content, and/or the functionality of the first set of one or more virtual objects are user-customizable. In some embodiments, the computer system provides a process and/or a user interface for customizing one or more aspects of the first set of one or more virtual objects.

In some embodiments, the composition (e.g., which control virtual objects are included or not included in the set) of the of first set of control virtual objects is user-customizable and wherein the relative positions of control virtual objects in the first set of control virtual objects is not user-customizable (e.g., as discussed with reference to FIG. 7R) (e.g., the relative positioning of the virtual objects in the set of one or more virtual objects are predetermined).

In some embodiments, the first set of one or more virtual objects are orientated so as to be substantially perpendicular to a direction of view (e.g., viewing direction, viewpoint, and/or perspective) of the user of the computer system (e.g., as seen in FIG. 7K). In some embodiments, when the first set of one or more virtual objects are positioned in a lower portion of the field-of-view of the user and at a distance in front of the user in the physical environment, the first set of one or more virtual objects are tilted/oriented at an upward angle so that the first set of one or more virtual objects are oriented to improve viewability from the perspective of the user. Orienting the first set of one or more virtual objects so as to be substantially perpendicular to a direction of view of the user of the computer system improves the visibility of the first set of one or more virtual objects, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system, while displaying the first set of one or more virtual objects, detects a first input (e.g., 707a) (e.g., a tap on a touch-sensitive surface, a sustained gaze, an air gesture (e.g., while third virtual object is selected and/or in focus), or a hardware button press (e.g., while the third virtual object is selected and/or in focus)) that corresponds to a third virtual object of the first set of one or more virtual objects. The computer system, in response to detecting the first input, performing a first operation (e.g., displaying 706) (e.g., selecting the third virtual object and/or performing a function associated with the third virtual object). In some embodiments, the method further comprises: detecting a second input that is directed to the first set of one or more virtual objects; in response to detecting the second input: in accordance with a determination that the second input is directed to a fourth virtual object of the first set of one or more virtual objects (e.g., via gaze and/or the location of the input; while the fourth virtual object is in focus), performing a second operation; and in accordance with a determination that the second input is directed to a fifth virtual object that is different from the fourth virtual object, performing a third operation that is different from the first operation.

In some embodiments, the first set of one or more virtual objects includes a fourth virtual object (e.g., 704b). The computer system, while displaying the first set of one or more virtual objects and while the fourth virtual object is environment-locked, detects a change in the field-of-view of the user to a sixth field-of-view (e.g., as indicated by 705i1). In response to detecting a change in the field-of-view of the user to a sixth field-of-view and in accordance with a determination that a first set of criteria are met, wherein the first set of criteria includes a criterion that is met when the change in the field-of-view of the user to a sixth field-of-view would cause at least a threshold amount of the fourth virtual object (e.g., any amount, 1%, 5%, or 10%) to fall outside of the sixth field-of-view (e.g., the change in the field-of-view of the user causes a location to which the fourth virtual object is environment-locked to move at least partially outside of the sixth field-of-view), the computer system reduces a displayed size of the fourth virtual object (e.g., 704b in FIG. 7L) (in some embodiments, while maintaining the entirety of the fourth virtual object within the field-of-view of the user). In some embodiments, in response to detecting a change in the field-of-view of the user to a sixth field-of-view and in accordance with a determination that a first set of criteria are not met, forgoing reducing the displayed size of the fourth virtual object (in some embodiments, reducing the displayed size of the fourth virtual object by a lesser amount than when the first set of criteria are met). Reducing the size of the fourth virtual object when the first set of criteria are met helps to avoid the fourth virtual object (or portions thereof) from moving outside of the field-of-view of the user, without requiring user input to do so, which performs an operation when a set of conditions has been met without requiring further user input.

In some embodiments, displaying the first set of one or more virtual objects with the respective spatial orientation relative to at least the first portion of the body of the user in response to detecting the change in the field-of-view of the user from the first field-of-view to the second field-of-view includes displaying the first set of one or more virtual objects at a first height relative to a height in the physical environment of the viewpoint of the user (e.g., the height seen in FIG. 7K) (e.g., the viewpoint of the user is 6 feet up from the ground and the first height is 2 feet below the viewpoint of the user, which is 4 feet up from the ground)) (in some embodiments, the first height is a height relative to the physical environment (e.g., 4 feet up from the ground). In some embodiments, prior to displaying the first set of one or more virtual objects in response to detecting the change in the field-of-view of the user from the first field-of-view to the second field-of-view, the computer system receives a first set of one or more inputs that includes an input (e.g., 705f) (e.g., a hardware button press while the height of the first set of one or more virtual objects is positioned at a target height) that sets a value for the first height. In some embodiments, the user can provide a set of inputs to set/establish the height at which the first set of one or more objects will be displayed.

In some embodiments, the computer system, while displaying the first set of virtual objects at the first height relative to the height in the physical environment of the viewpoint of the user and at a second height relative to the physical environment (e.g., the viewpoint of the user is 6 feet above ground level, the first height is 2 feet below the viewpoint of the user, and the second height is four feet above ground level), detects a change in the height in the physical environment of the viewpoint of the user (e.g., change indicated by 705e1) (e.g., the user's head moves up or down in the physical environment). In response to detecting the change in the height in the physical environment of the viewpoint of the user, the computer system changes a height at which the first set of virtual objects are displayed in the physical environment to a third height, different from the second height, wherein changing the height at which the first set of virtual objects are displayed in the physical environment to the third height causes the first set of one or more virtual objects to be displayed at the first height relative to the height in the physical environment of the viewpoint of the user (e.g., compare height at which 704b-704d are displayed in FIGS. 7H and 7I) (e.g., the user's head moves down a foot to be 5 feet above ground level, the first set of one or more virtual objects would also move down a foot to be displayed three feet above ground level). Adjusting the height at which the set of one or more virtual objects are displayed relative to the physical environment as the height of the head of the user changes relative to the height of the physical environment assists the user by maintaining the relative height of the first set of one or more virtual objects to the height of the head of the user and associating the set of one or more virtual objects that relative height, which assists the user in interacting with the set of one or more virtual objects, which enhances the operability of the system and make the user-system interface more efficient.

In some embodiments, displaying the first set of one or more virtual objects with the respective spatial orientation relative to at least the first portion of the body of the user in response to detecting the change in the field-of-view of the user from the first field-of-view to the second field-of-view includes: in accordance with a determination that the user of the computer system is performing a first type of activity (e.g., walk workout in FIG. 7H) (e.g., running, walking, or biking) when the change in the field-of-view of the user from the first field-of-view to the second field-of-view was detected, the first set of one or more virtual objects includes a first set of content (e.g., content in FIG. 7H); and in accordance with a determination that the user of the computer system is performing a second type of activity (e.g., yoga workout in FIG. 7R), different from the first type of activity, when the change in the field-of-view of the user from the first field-of-view to the second field-of-view was detected, the first set of one or more virtual objects includes a second set of content (e.g., content in FIG. 7R), different from the first set of content (e.g., the contents of the first set of one or more virtual objects is selected based on a current activity of the user) (e.g., when the second activity is walking, the content includes a count of steps per minute and/or a mile pace; when the second activity is biking, the content includes a change in elevation, a tire pressure value, and/or a level of incline or decline). Displaying difference content within the first set of one or more virtual objects based on the type of activity being performed by the user customizes the content without requiring user input, which performs an operation when a set of conditions has been met without requiring further user input.

In some embodiments, aspects/operations of methods 800, 900, 1000, and/or 1100 may be interchanged, substituted, and/or added between these methods. For example, the set of virtual objects of method 1000 can be displayed in conjunction with the first virtual object of method 800. For brevity, these details are not repeated here.

FIG. 11 is a flow diagram of an exemplary method 1100 for interacting with virtual objects in an extended reality environment, including virtual objects that provide a different perspective on the environment, in accordance with some embodiments. In some embodiments, method 1100 is performed at a wearable computer system (e.g., a computer system (e.g., 700)) (e.g., computer system 101 in FIG. 1) including a display generation component (e.g., 700a) (e.g., display generation component 120 in FIGS. 1, 3, and 4) (e.g., a heads-up display, a display, a touchscreen, a projector, etc.) and set of one or more cameras that includes a first camera (e.g., image sensor 404). In some embodiments, method 1100 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 900 are, optionally, combined and/or the order of some operations is, optionally, changed.

While a user is wearing the wearable computer system (in some embodiments, the computer system detects and/or determines that the user is wearing the computer system) and the user has a first field-of-view (e.g., a field-of-view of a user of the computer system (e.g., as determined by the computer system) and/or a field-of-view of a second camera that is in communication with the computer system and/or integrated into the computer system that is being presented to the user) (in some embodiments, an area within the full viewpoint of the user in which the computer system can display one or more virtual objects) that includes a first representation of a physical environment at the location of the user (e.g., a representation and/or view of the real world and/or a three-dimensional environment (e.g., an environment of an extended reality environment, an augmented reality environment, and/or a virtual reality environment) in the vicinity of the user, from the perspective of the user) (in some embodiments, the representation of the physical environment is generated by the computer system (e.g., as a pass-through representation) (in some embodiments, the representation of the physical environment is a portion of the real world seen by the user through a transparent portion of the computer system and/or the display generation component) from a first perspective (e.g., the perspective shown for 703 in FIG. 7K) (e.g., the perspective of the user), the wearable computer system (e.g., 700), displays (1102), via the display generation component, a first virtual object (e.g., 704d) that includes a representation of a portion (in some embodiments, the entirety of) of a field-of-view of the first camera, wherein the representation of the portion of the field-of-view of the first camera includes a second representation of the physical environment at the location of the user from a second perspective that is different from the first perspective (e.g., as described in FIG. 7K). In some embodiments, the second perspective has a different orientation (e.g., facing direction) than the orientation of the first perspective (e.g., the first perspective is forward facing with respect to the user and the second perspective is rearward facing). In some embodiments, the first and second perspective are from point-of-views that are at approximately the same location (e.g., that are less than a certain distance from each other (e.g., the first camera is positioned within 10 feet, 5 feet, or 3 feet of the user). Displaying a representation of the physical environment at the location of the user from a second perspective that is different from the first perspective provides the user with greater awareness of the physical environment at the location of the user, which can improve safety while operating the wearable computer system, which improves the user's safety and enhances the operability of the system. Doing so also provides improved visual feedback with respect to what is within the field-of-view of the first camera.

In some embodiments, the first field-of-view is oriented in a first direction (e.g., in front of user 701) (e.g., forwards, relative to the user) and wherein the field-of-view of the first camera is oriented in a second direction (e.g., to the rear of user 701) (e.g., rearwards, relative to the user) that is different from the first direction (e.g., a different direction in a horizontal and/or vertical plane). In some embodiments, the second direction differs from the first direction by at least 45°, 90°, 135°, 180° (e.g., the field-of-view of the user is directed to the front of the user and the field-of-view of the first camera is directed to the rear of the user). Displaying a representation of the physical environment at the location of the user from a second perspective that is oriented in a different direction from the first perspective provides the user with greater awareness of the physical environment at the location of the user, which can improve safety while operating the wearable computer system, which improves the user's safety and enhances the operability of the system. Doing so also provides improved visual feedback with respect to what is within the field-of-view of the first camera.

In some embodiments, the second perspective is from the perspective of a primary direction of motion of a first vehicle (e.g., a vehicle being occupied by and/or operated by the user of the computer system) and the second direction is rearwards of the primary direction of motion of the first vehicle (e.g., as discussed with reference to FIG. 7K) (e.g., the first camera provides a rear view of the first vehicle). In some embodiments, the field-of-view of the user is oriented forwards of the first vehicle such that the first and second directions are substantially 180° apart. Displaying a representation of the physical environment at the location of the user from a second perspective that is rearwards facing with respect to the first vehicle provides the user with greater awareness of the physical environment at the location of the user and the vehicle, which can improve safety while operating the wearable computer system and/or the first vehicle, which improves the user's safety and enhances the operability of the system. Doing so also provides improved visual feedback with respect to what is within the field-of-view of the first camera.

In some embodiments, the second perspective is substantially at the same position or near the same position in the physical environment as the first perspective (e.g., as discussed with reference to FIG. 7K) (e.g., the first and second perspectives are within 0.1, 0.2, 0.5 feet, 1 foot, 2 feet, 5 feet, or 10 feet of each other).

In some embodiments, the set of one or more cameras includes a second camera (e.g., 404). In some embodiments, the wearable computer system, while the user is wearing the wearable computer system and the user has a second field-of-view (e.g., a field-of-view that is the same or different from the first field-of-view) that includes a third representation of the physical environment at the location of the user from a third perspective (e.g., the perspective of the user that is the same or different from the first perspective), displays (1104), via the display generation component, a second virtual object (e.g., 704e) that includes a representation of a portion (in some embodiments, the entirety of) of a field-of-view of the second camera, wherein the representation of the portion of the field-of-view of the second camera includes a fourth representation of the physical environment at the location of the user from a fourth perspective that is different from the third perspective. Displaying a third representation of the physical environment at the location of the user from a fourth perspective that is different from the first perspective provides the user with greater awareness of the physical environment at the location of the user, which can improve safety while operating the wearable computer system, which improves the user's safety and enhances the operability of the system. Doing so also provides improved visual feedback with respect to what is within the field-of-view of the second camera.

In some embodiments, the second virtual object is displayed concurrently with the first virtual object (e.g., 704d and 704e in FIG. 7L). Displaying the first and second virtual objects concurrently provides the user with multiple additional perspectives of the physical environment at the location of the user provides the user with greater awareness of the physical environment at the location of the user, which can improve safety while operating the wearable computer system, which improves the user's safety and enhances the operability of the system. Doing so also provides improved visual feedback with respect to what is within the fields-of-view of the first and second cameras.

In some embodiments, the second virtual object is displayed after ceasing to display the first virtual object. In some embodiments, the first virtual object ceases to be displayed in response to a first change in the field-of-view of the user and the second virtual object is displayed in response to the first change in the field-of-view of the user.

In some embodiments, the wearable computer system, prior to displaying the first virtual object and while the user has a third field-of-view, different from the first field-of-view, detects a change (e.g., change corresponding to 705h1) in the orientation of a field-of-view of the user from the third field-of-view to the first field-of-view (e.g., detecting that the user has tilted the user's field-of-view downwards to the first field-of-view), wherein displaying the first virtual object occurs in response to detecting the change in the orientation of a field-of-view of the user from the third field-of-view to the first field-of-view (e.g., 704d in FIG. 7K).

In some embodiments, the set of one or more cameras includes a third camera (e.g., 404). The wearable computer system, while displaying the first virtual object, detects (1106) a change (e.g., indicated by 705i1) in the orientation of a field-of-view of the user from the first field-of-view to a fourth field-of-view, different from the first field-of-view. In response to detecting the change in the orientation of a field-of-view of the user from the first field-of-view to the fourth field-of-view, the wearable computer system displays (1108), via the display generation component, a third virtual object (e.g., 704e) that includes a representation of a portion (in some embodiments, the entirety of) of a field-of-view of the third camera, wherein the representation of the portion of the field-of-view of the third camera includes a fifth representation of the physical environment at the location of the user from a fifth perspective that is different from the second perspective (e.g., the perspective of the first camera) (in some embodiments, different from a perspective of the fourth field-of-view). In some embodiments, the first virtual object is concurrently displayed with the third virtual object. In some embodiments, the first virtual object ceases to be displayed in response to detecting the change in the orientation of a field-of-view of the user from the first field-of-view to the fourth field-of-view. Displaying a fifth representation of the physical environment at the location of the user from a fifth perspective that is different from the first perspective provides the user with greater awareness of the physical environment at the location of the user, which can improve safety while operating the wearable computer system, which improves the user's safety and enhances the operability of the system. Doing so also provides improved visual feedback with respect to what is within the field-of-view of the third camera.

In some embodiments, the wearable computer system displays, concurrently with the first virtual object, a fourth virtual object (e.g., 704c) that includes first content. While displaying the first virtual object and the fourth virtual object, the wearable computer system detects a change (e.g., indicated by 705i1) in the orientation of a field-of-view of the user from the first field-of-view to a fifth field-of-view, different from the first field-of-view. In response to detecting the change in the orientation of a field-of-view of the user from the first field-of-view to the fifth field-of-view: the wearable computer system shifts a position at which the first virtual object is displayed within the field-of-view of the user (e.g., the first virtual object is displayed in a different portion of the first field-of-view as compared to where it is displayed in the fifth field-of-view); and the wearable computer system shifts a position at which the fifth virtual object is displayed within the field-of-view of the user (e.g., shift shown in FIG. 7K) (e.g., the fifth virtual object is displayed in a different portion of the first field-of-view as compared to where it is displayed in the fifth field-of-view). In some embodiments, the first virtual object and the fifth virtual object are displayed with a predetermined spatial relationship that is maintained as the first and fifth virtual objects are shifted. Displaying a fourth virtual object that shifts position along with shifts in position of the first virtual object assists the user with associating the fourth and first virtual objects, even as positions of the two virtual objects shift in the field-of-view of the user based on changes in the orientation of the user's field of view, which assists the user in interacting with the set of one or more virtual objects, which enhances the operability of the system and make the user-system interface more efficient.

In some embodiments, the first content includes map content (e.g., as discussed with reference to FIG. 7H) (e.g., map information regarding a navigation route and/or the physical environment at the location of the user, such as roads, budlings, parks, traffic information, and/or other map information). Providing map contents that shifts along with the representation of the physical environment at the location of the user from a second perspective that is different from the first perspective provides the user with additional information with which to orient the user in the physical environment, while operating the wearable computer system, which can improve safety while operating the wearable computer system, which improves the user's safety and enhances the operability of the system. Doing so also provides improved visual feedback with respect to the physical environment at the location of the user.

In some embodiments, the first content includes content (e.g., information, such as a direction of a turn, a distance to a turn, a name of a street on which to turn) corresponding to an element (e.g., a turn, a point-of-interest, or a location marker) of a route (e.g., a projected route, a recommended route, a route of a navigation application and/or function) to a destination (e.g., as discussed with reference to FIG. 7H) (e.g., a travel destination). Providing content corresponding to an element of a route to a destination that shifts along with the representation of the physical environment at the location of the user from a second perspective that is different from the first perspective provides the user with additional information with which to orient the user in the physical environment while navigating along the route and while operating the wearable computer system, which can improve safety while operating the wearable computer system, which improves the user's safety and enhances the operability of the system. Doing so also provides improved visual feedback with respect to the route.

In some embodiments, the first content includes an indication of a movement speed (e.g., as seen in 704*c*) (e.g., a current movement speed of the computer system and/or of the user of the computer system). Providing an indication of movement speed that shifts along with the representation of the physical environment at the location of the user from a second perspective that is different from the first perspective provides the user with additional information while the user moves in the physical environment, while operating the wearable computer system, which can improve safety while operating the wearable computer system, which improves the user's safety and enhances the operability of the system.

Doing so also provides improved visual feedback with respect to the user's movement.

In some embodiments, the first virtual object is displayed at a first height relative to a height in the physical environment of the viewpoint of the user (e.g., height of 704*d* in FIG. 7H) (e.g., of the first field-of-view). The wearable computer system receives a set of one or more inputs that correspond to a request to configure the computer system to display (e.g., upon subsequent display) the first virtual object at a second height, different than the first height, relative to a height in the physical environment of the viewpoint of the user (e.g., movement corresponding to 705*e*1 and input 705*f*) (e.g., at the time that the first virtual object is displayed). The wearable computer system, in response to the set of one or more inputs, configures the computer system to display the first virtual object at the second height relative to a height in the physical environment of the viewpoint of the user (e.g., height of 705*d* in FIG. 7I). After configuring the computer system to display the first virtual object at the second height relative to a height in the physical environment of the viewpoint of the user, the wearable computer system displays the first virtual object at the second height relative to a height in the physical environment of the viewpoint of the user (e.g., as seen in FIG. 7K). Displaying the first virtual object at the second height relative to a height in the physical environment of the viewpoint of the user, after configuring the computer system to display the first virtual object at the second height relative to a height in the physical environment of the viewpoint of the user, reduces the number of inputs required to position the virtual object at a target/desired height as the height of the viewpoint of the user changes in the physical environment. Doing so also automatically positions the first virtual object in a region of the user interface that is readily accessible to the user, improving the user's ability to interact with the first virtual object, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the first virtual object at the second height relative to a height in the physical environment of the viewpoint of the user and while the user has a sixth field-of-view, the wearable computer system detects a change (e.g., as indicated by 705*h*1) in the orientation of a field-of-view of the user from the sixth field-of-view to a seventh field-of-view, different from the sixth field-of-view, wherein displaying the first virtual object at the second height relative to a height in the physical environment of the viewpoint of the user occurs in response to detecting the change in the orientation of a field-of-view of the user from the sixth field-of-view to the seventh field-of-view (e.g., as seen in FIG. 7K). In some embodiments, after the user configures the computer system to display the first virtual object at a target height (e.g., at the waist level of the user), the user shifts his or her field-of-view from looking straight ahead to looking downwards towards the target height (e.g., towards the user's waist level); based on the change in view and the user's waist level coming into the user's field-of-view, the first virtual object is displayed at a predetermined distance from the user and at the target height (e.g., two feet away from the user, at the user's waist level).

In some embodiments, the first virtual object is a virtual object of the first set of one or more virtual objects discussed with respect to method 1000 and FIGS. 7H-7R, described above, and exhibits one or more of the features and/or behaviors discussed with respect to the first set of one or more virtual objects.

In some embodiments, the first virtual object of method 1100 is displayed concurrently with a first virtual object that indicates a first element of a route to a destination as discussed with respect to method 900 and FIG. 7S-7Y, described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve interacting with virtual objects in an extended reality environment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve interacting with virtual objects in an extended reality environment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

What is claimed is:

1. A computer system that is configured to communicate with a display generation component, the computer system comprising:
   one or more processors; and
   memory storing one or more programs configured to be executed by the one or more processors, the one or more programs including instructions for:

while a field-of-view of a user is a first field-of-view, displaying, via the display generation component, a first virtual object in a three-dimensional environment, wherein the first virtual object is displayed in a first display mode that includes being environment-locked;

while displaying the first virtual object, detecting a change in the field-of-view of the user from the first field-of-view to a second field-of-view; and in response to detecting the change in the field-of-view of the user from the first field-of-view to the second field-of-view:

in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met based on a determination that less than the threshold amount of the first virtual object would remain within the field-of-view of the user while the field-of-view of the user is the second field-of-view and while the first virtual object remains environment-locked, displaying the first virtual object in a second display mode that includes repositioning the first virtual object relative to the three-dimensional environment based on changes of the field-of-view of the user.

2. The computer system of claim 1, wherein displaying the first virtual object in the second display mode includes changing a visual appearance of the first virtual object from a first visual appearance that the first virtual object is displayed with while in the first display mode to a second visual appearance that is different from the first visual appearance.

3. The computer system of claim 2, wherein the first virtual object has a first level of opacity when displayed with the first visual appearance and a second level of opacity that is different from the first level of opacity when displayed with the second visual appearance.

4. The computer system of claim 2, wherein the first virtual object has a first type of drop shadow when displayed with the first visual appearance and a second type of drop shadow that is different from the first type of drop shadow when displayed with the second visual appearance.

5. The computer system of claim 1, wherein the one or more programs further include instructions for:
while the first virtual object is being displayed in the second display mode, detecting that a level of stability of the field-of-view of the user satisfies a set of stability criteria; and
in response to detecting that the level of stability of the field-of-view of the user satisfied the set of stability criteria, displaying the first virtual object in the first display mode.

6. The computer system of claim 5, wherein the level of stability of the field-of-view of the user is based on a determination of a level of stability of a head of the user of the computer system.

7. The computer system of claim 5, wherein the one or more programs further include instructions for:

while the first virtual object is being displayed in the second display mode, displaying a first indication that the first virtual object can be transitioned to being displayed in the first display mode that includes being environment-locked.

8. The computer system of claim 7, wherein the first indication includes a second version of the first virtual object, wherein the second version of the first virtual object has a dimmer appearance than the first virtual object.

9. The computer system of claim 7, wherein the first indication includes an outline of at least a portion of the first virtual object.

10. The computer system of claim 1, wherein the one or more programs further include instructions for:
while the first virtual object is being displayed in the second display mode:
detecting a change in the field-of-view of the user from a third field-of-view to a fourth field-of-view that occurs at a first speed and in a first direction; and
in response to detecting the change in the field-of-view of the user from the third field-of-view to the fourth field-of-view, shifting a position at which the first virtual object is displayed in the field-of-view of the user in a second direction that is based on the first direction and at a second speed that is different than the first speed.

11. The computer system of claim 1, wherein:
continuing to display the first virtual object in the first display mode that includes being environment-locked in response to detecting the change in the field-of-view of the user from the first field-of-view to the second field-of-view includes ceasing to display a first sub-portion of the first virtual object while continuing to display a second sub-portion of the first virtual object.

12. The computer system of claim 11, wherein the one or more programs further include instructions for:
while displaying the second sub-portion of the first virtual object without displaying the first sub-portion of the first virtual object, detecting a change in the field-of-view of the user from the second field-of-view to a fifth field-of-view; and
in response to detecting the change in the field-of-view of the user from the second field-of-view to the fifth field-of-view:
in accordance with a determination that the first set of criteria are not met, displaying the first virtual object in the second display mode, including displaying the first sub-portion of the first virtual object.

13. The computer system of claim 1, wherein:
the first virtual object is displayed concurrently with a plurality of virtual objects that includes a second virtual object and a third virtual object; and
the first virtual object, the second virtual object, and the third virtual object have a predetermined spatial relationship with respect to each other that is maintained as the first virtual object, the second virtual object, and third virtual object continue to be displayed within the field-of-view of the user.

14. A non-transitory computer-readable storage medium storing one or more programs configured to be executed by one or more processors of a computer system that is in communication with a display generation component, the one or more programs including instructions for:
while a field-of-view of a user is a first field-of-view, displaying, via the display generation component, a first virtual object in a three-dimensional environment, wherein the first virtual object is displayed in a first display mode that includes being environment-locked;

while displaying the first virtual object, detecting a change in the field-of-view of the user from the first field-of-view to a second field-of-view; and in response to detecting the change in the field-of-view of the user from the first field-of-view to the second field-of-view:

in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met based on a determination that less than the threshold amount of the first virtual object would remain within the field-of-view of the user while the field-of-view of the user is the second field-of-view and while the first virtual object remains environment-locked, displaying the first virtual object in a second display mode that includes repositioning the first virtual object relative to the three-dimensional environment based on changes of the field-of-view of the user.

15. The non-transitory computer-readable storage medium of claim 14, wherein displaying the first virtual object in the second display mode includes changing a visual appearance of the first virtual object from a first visual appearance that the first virtual object is displayed with while in the first display mode to a second visual appearance that is different from the first visual appearance.

16. The non-transitory computer-readable storage medium of claim 15, wherein the first virtual object has a first level of opacity when displayed with the first visual appearance and a second level of opacity that is different from the first level of opacity when displayed with the second visual appearance.

17. The non-transitory computer-readable storage medium of claim 15, wherein the first virtual object has a first type of drop shadow when displayed with the first visual appearance and a second type of drop shadow that is different from the first type of drop shadow when displayed with the second visual appearance.

18. The non-transitory computer-readable storage medium of claim 14, wherein the one or more programs further include instructions for:

while the first virtual object is being displayed in the second display mode, detecting that a level of stability of the field-of-view of the user satisfies a set of stability criteria; and in response to detecting that the level of stability of the field-of-view of the user satisfied the set of stability criteria, displaying the first virtual object in the first display mode.

19. The non-transitory computer-readable storage medium of claim 18, wherein the level of stability of the field-of-view of the user is based on a determination of a level of stability of a head of the user of the computer system.

20. The non-transitory computer-readable storage medium of claim 18, wherein the one or more programs further include instructions for:

while the first virtual object is being displayed in the second display mode, displaying a first indication that the first virtual object can be transitioned to being displayed in the first display mode that includes being environment-locked.

21. The non-transitory computer-readable storage medium of claim 20, wherein the first indication includes a second version of the first virtual object, wherein the second version of the first virtual object has a dimmer appearance than the first virtual object.

22. The non-transitory computer-readable storage medium of claim 20, wherein the first indication includes an outline of at least a portion of the first virtual object.

23. The non-transitory computer-readable storage medium of claim 14, wherein the one or more programs further include instructions for:

while the first virtual object is being displayed in the second display mode:

detecting a change in the field-of-view of the user from a third field-of-view to a fourth field-of-view that occurs at a first speed and in a first direction; and in response to detecting the change in the field-of-view of the user from the third field-of-view to the fourth field-of-view, shifting a position at which the first virtual object is displayed in the field-of-view of the user in a second direction that is based on the first direction and at a second speed that is different than the first speed.

24. The non-transitory computer-readable storage medium of claim 14, wherein:

continuing to display the first virtual object in the first display mode that includes being environment-locked in response to detecting the change in the field-of-view of the user from the first field-of-view to the second field-of-view includes ceasing to display a first sub-portion of the first virtual object while continuing to display a second sub-portion of the first virtual object.

25. The non-transitory computer-readable storage medium of claim 24, wherein the one or more programs further include instructions for:

while displaying the second sub-portion of the first virtual object without displaying the first sub-portion of the first virtual object, detecting a change in the field-of-view of the user from the second field-of-view to a fifth field-of-view; and in response to detecting the change in the field-of-view of the user from the second field-of-view to the fifth field-of-view:

in accordance with a determination that the first set of criteria are not met, displaying the first virtual object in the second display mode, including displaying the first sub-portion of the first virtual object.

26. The non-transitory computer-readable storage medium of claim 14, wherein:

the first virtual object is displayed concurrently with a plurality of virtual objects that includes a second virtual object and a third virtual object; and the first virtual object, the second virtual object, and the third virtual object have a predetermined spatial relationship with respect to each other that is maintained as the first virtual object, the second virtual object, and third virtual object continue to be displayed within the field-of-view of the user.

27. A method comprising:

at a computer system that is in communication with a display generation component:

while a field-of-view of a user is a first field-of-view, displaying, via the display generation component, a first virtual object in a three-dimensional environment, wherein the first virtual object is displayed in a first display mode that includes being environment-locked;

while displaying the first virtual object, detecting a change in the field-of-view of the user from the first field-of-view to a second field-of-view; and in response to detecting the change in the field-of-view of the user from the first field-of-view to the second field-of-view:

in accordance with a determination that a first set of criteria are met, wherein the first set of criteria includes a criterion that is met when, while the field-of-view of the user is the second field-of-view and while the first virtual object remains environment-locked, a threshold amount of the first virtual object would remain within the field-of-view of the user, continuing to display the first virtual object in the first display mode that includes being environment-locked; and in accordance with a determination that the first set of criteria are not met based on a determination that less than the threshold amount of the first virtual object would remain within the field-of-view of the user while the field-of-view of the user is the second field-of-view and while the first virtual object remains environment-locked, displaying the first virtual object in a second display mode that includes repositioning the first virtual object relative to the three-dimensional environment based on changes of the field-of-view of the user.

28. The method of claim 27, wherein displaying the first virtual object in the second display mode includes changing a visual appearance of the first virtual object from a first visual appearance that the first virtual object is displayed with while in the first display mode to a second visual appearance that is different from the first visual appearance.

29. The method of claim 28, wherein the first virtual object has a first level of opacity when displayed with the first visual appearance and a second level of opacity that is different from the first level of opacity when displayed with the second visual appearance.

30. The method of claim 28, wherein the first virtual object has a first type of drop shadow when displayed with the first visual appearance and a second type of drop shadow that is different from the first type of drop shadow when displayed with the second visual appearance.

31. The method of claim 27, further comprising:
while the first virtual object is being displayed in the second display mode, detecting that a level of stability of the field-of-view of the user satisfies a set of stability criteria; and
in response to detecting that the level of stability of the field-of-view of the user satisfied the set of stability criteria, displaying the first virtual object in the first display mode.

32. The method of claim 31, wherein the level of stability of the field-of-view of the user is based on a determination of a level of stability of a head of the user of the computer system.

33. The method of claim 31, further comprising:
while the first virtual object is being displayed in the second display mode, displaying a first indication that the first virtual object can be transitioned to being displayed in the first display mode that includes being environment-locked.

34. The method of claim 33, wherein the first indication includes a second version of the first virtual object, wherein the second version of the first virtual object has a dimmer appearance than the first virtual object.

35. The method of claim 33, wherein the first indication includes an outline of at least a portion of the first virtual object.

36. The method of claim 27, further comprising:
while the first virtual object is being displayed in the second display mode:
detecting a change in the field-of-view of the user from a third field-of-view to a fourth field-of-view that occurs at a first speed and in a first direction; and
in response to detecting the change in the field-of-view of the user from the third field-of-view to the fourth field-of-view, shifting a position at which the first virtual object is displayed in the field-of-view of the user in a second direction that is based on the first direction and at a second speed that is different than the first speed.

37. The method of claim 27, wherein:
continuing to display the first virtual object in the first display mode that includes being environment-locked in response to detecting the change in the field-of-view of the user from the first field-of-view to the second field-of-view includes ceasing to display a first sub-portion of the first virtual object while continuing to display a second sub-portion of the first virtual object.

38. The method of claim 37, further comprising:
while displaying the second sub-portion of the first virtual object without displaying the first sub-portion of the first virtual object, detecting a change in the field-of-view of the user from the second field-of-view to a fifth field-of-view; and
in response to detecting the change in the field-of-view of the user from the second field-of-view to the fifth field-of-view:
in accordance with a determination that the first set of criteria are not met, displaying the first virtual object in the second display mode, including displaying the first sub-portion of the first virtual object.

39. The method of claim 27, wherein:
the first virtual object is displayed concurrently with a plurality of virtual objects that includes a second virtual object and a third virtual object; and
the first virtual object, the second virtual object, and the third virtual object have a predetermined spatial relationship with respect to each other that is maintained as the first virtual object, the second virtual object, and third virtual object continue to be displayed within the field-of-view of the user.

* * * * *

UNITED STATES PATENT AND TRADEMARK OFFICE
CERTIFICATE OF CORRECTION

| | | |
|---|---|---|
| PATENT NO. | : 12,249,033 B2 | Page 1 of 1 |
| APPLICATION NO. | : 18/242948 | |
| DATED | : March 11, 2025 | |
| INVENTOR(S) | : Yiqiang Nie et al. | |

It is certified that error appears in the above-identified patent and that said Letters Patent is hereby corrected as shown below:

On the Title Page

Column 1 Item (72) (Inventors), Line 2: Delete "Giovanni Agnoli," and insert -- Giovanni M. Agnoli, --.

Column 1, Lines 4-5: Delete "Cupertino, CA (US);" and insert -- Tiburon, CA (US); --.

Signed and Sealed this
Twenty-second Day of April, 2025

Coke Morgan Stewart
*Acting Director of the United States Patent and Trademark Office*